(12) United States Patent
Sharp et al.

(10) Patent No.: US 6,667,784 B2
(45) Date of Patent: Dec. 23, 2003

(54) COLOR FILTERS, SEQUENCERS AND DISPLAYS USING COLOR SELECTIVE LIGHT MODULATORS

(75) Inventors: Gary D. Sharp, Boulder, CO (US); Kristina M. Johnson, Longmont, CO (US)

(73) Assignee: Colorlink, Inc., Boulder, CO (US)

( * ) Notice: Subject to any disclaimer, the term of this patent is extended or adjusted under 35 U.S.C. 154(b) by 0 days.

(21) Appl. No.: 10/100,023

(22) Filed: Mar. 19, 2002

(65) Prior Publication Data

US 2002/0101546 A1 Aug. 1, 2002

Related U.S. Application Data

(62) Division of application No. 09/362,497, filed on Jul. 30, 1999, now Pat. No. 6,417,892, which is a continuation-in-part of application No. 09/126,330, filed on Jul. 31, 1998, which is a continuation-in-part of application No. 08/853,468, filed on May 9, 1997, now Pat. No. 5,990,996, which is a continuation-in-part of application No. 08/645,580, filed on May 14, 1996, now Pat. No. 5,822,021, said application No. 09/126,330, is a continuation-in-part of application No. 08/855,716, filed on May 8, 1997, which is a continuation of application No. 08/447,522, filed on May 23, 1995, now Pat. No. 5,751,384.

(60) Provisional application No. 60/094,911, filed on Jul. 31, 1998.

(51) Int. Cl.$^7$ ............................................. G02F 1/1347
(52) U.S. Cl. ....................................................... 349/78
(58) Field of Search ............................ 349/119, 78, 79, 349/80

(56) References Cited

U.S. PATENT DOCUMENTS

| | | | |
|---|---|---|---|
| 2,493,200 A | 1/1950 | Land | 88/112 |
| 2,638,816 A | 5/1953 | Stolzer | 88/61 |
| 4,003,081 A | 1/1977 | Hilsum et al. | 358/64 |

(List continued on next page.)

FOREIGN PATENT DOCUMENTS

| | | | |
|---|---|---|---|
| DE | 4029838 | 3/1991 | 349/97 |
| JP | 56137307 A | 10/1981 | |
| JP | 0121379 | 5/1988 | |

(List continued on next page.)

OTHER PUBLICATIONS

US 4,917,464, 4/1990, Conner (withdrawn)
Scheffer, T.J., "New multicolor liquid crystal displays that use a twisted nematic electro–optical cell, "J., Appl. Phys. (1973) 44(11):4799–4803.
Carlsen, W.J. and Buhrer, C.F., "Flat Passband Birefringent Wavelength–Division Multiplexers," Electronics Letters (1987) 23(3):106–107.

(List continued on next page.)

Primary Examiner—Kenneth Parker
(74) Attorney, Agent, or Firm—Fleshner & Kim LLP

(57) ABSTRACT

The present invention provides a high brightness color selective light modulator (CSLM) formed by apolarization modulator positioned between two retarder stacks. The modulator changes the apparent orientation of one retarder stack relative to the other so that, in a first switching state of the modulator the two retarder stacks cooperate in filtering the spectrum of input light, and in a second switching state the two retarder stacks complement each other, yielding a neutral transmission spectrum. Two or more CSLM stages can be used in series, each stage providing independent control of a primary color. One preferred embodiment eliminates internal polarizers between CSLM stages, thereby providing an additive common-path full-color display with only two neutral polarizers. Hybrid filters can be made using the CSLMs of this invention, in combination with other active or passive filters. The CSLMs of this invention can be used in many applications, particularly in the areas of recording and displaying color images. They can be arranged in a multi pixel array by pixelating the active elements, and can be implemented as color filter arrays, using patterned passive retarders rather than active polarization modulators.

12 Claims, 69 Drawing Sheets

U.S. PATENT DOCUMENTS

| | | | |
|---|---|---|---|
| 4,019,808 A | 4/1977 | Scheffer | 350/160 LC |
| 4,025,164 A | 5/1977 | Doriguzzi et al. | 350/160 LC |
| 4,232,948 A | 11/1980 | Shanks | 350/347 |
| 4,367,924 A | 1/1983 | Clark et al. | 350/334 |
| 4,416,514 A | 11/1983 | Plummer | 350/335 |
| 4,448,823 A | 5/1984 | Clifford | 428/1 |
| 4,497,543 A | 2/1985 | Aoki et al. | 350/337 |
| 4,566,761 A | 1/1986 | Carlsen et al. | 350/401 |
| 4,575,193 A | 3/1986 | Greivenkamp, Jr. | 350/401 |
| 4,582,396 A | 4/1986 | Bos et al. | 350/347 |
| 4,635,051 A | 1/1987 | Bos et al. | 340/757 |
| 4,652,087 A | 3/1987 | Bos et al. | 350/332 |
| 4,668,086 A | 5/1987 | Redner | 356/33 |
| 4,685,773 A | 8/1987 | Carlsen et al. | 350/401 |
| 4,758,818 A | 7/1988 | Vatne | 340/701 |
| 4,759,612 A | 7/1988 | Nakatsuka et al. | 350/337 |
| 4,770,500 A | 9/1988 | Kalmanash et al. | 350/347 E |
| 4,770,525 A | 9/1988 | Umeda et al. | 353/122 |
| 4,786,146 A | 11/1988 | Ledebuhr | 350/33 IR |
| 4,786,964 A | 11/1988 | Plummer | |
| 4,796,978 A | 1/1989 | Tanaka et al. | 350/337 |
| 4,808,501 A | 2/1989 | Chiulli | |
| 4,834,508 A | 5/1989 | Fergason | 350/339 F |
| 4,867,536 A | 9/1989 | Pidsosny et al. | 350/337 |
| 4,917,465 A | 4/1990 | Conner et al. | 350/335 |
| 4,966,441 A | 10/1990 | Conner | 350/335 |
| 4,995,702 A | 2/1991 | Aruga | |
| 5,032,007 A | 7/1991 | Silverstein et al. | 350/335 |
| 5,033,825 A | 7/1991 | Ishikawa et al. | 350/339 |
| 5,050,965 A | 9/1991 | Conner et al. | 359/53 |
| 5,122,887 A | 6/1992 | Mathewson | 349/97 |
| 5,124,818 A | 6/1992 | Conner et al. | 359/53 |
| 5,126,864 A | 6/1992 | Akiyama et al. | 359/53 |
| 5,132,826 A | 7/1992 | Johnson et al. | |
| 5,164,821 A | 11/1992 | Tanaka et al. | 348/762 |
| 5,179,459 A | 1/1993 | Plesinger | 359/74 |
| 5,220,447 A | 6/1993 | Yokokura et al. | 359/93 |
| 5,231,432 A | 7/1993 | Glenn | |
| 5,237,435 A | 8/1993 | Kurematsu et al. | 359/41 |
| 5,243,455 A | 9/1993 | Johnson et al. | 359/93 |
| 5,249,071 A | 9/1993 | Yoshimizu et al. | 359/63 |
| 5,268,782 A | 12/1993 | Wenz et al. | 359/81 |
| 5,276,436 A | 1/1994 | Shaw et al. | |
| 5,298,986 A | 3/1994 | Owada et al. | 348/762 |
| 5,299,039 A | 3/1994 | Bohannon | 359/53 |
| 5,321,450 A | 6/1994 | Shapiro et al. | |
| 5,329,388 A * | 7/1994 | Yoshimizu | 349/159 |
| 5,337,103 A | 8/1994 | Gulick | |
| 5,337,174 A | 8/1994 | Wada et al. | 359/73 |
| 5,347,378 A | 9/1994 | Handschy et al. | 359/53 |
| 5,353,075 A | 10/1994 | Conner et al. | |
| 5,355,188 A | 10/1994 | Biles et al. | |
| 5,369,513 A | 11/1994 | Akatsuka et al. | 359/73 |
| 5,381,253 A | 1/1995 | Sharp et al. | |
| 5,387,920 A | 2/1995 | Bos et al. | 345/88 |
| 5,400,095 A | 3/1995 | Minich et al. | |
| 5,406,396 A * | 4/1995 | Akatsuka et al. | 349/118 |
| 5,422,756 A | 6/1995 | Weber | 359/487 |
| 5,469,279 A | 11/1995 | Sharp et al. | 359/53 |
| 5,481,320 A | 1/1996 | Konuma et al. | 348/751 |
| 5,500,523 A | 3/1996 | Hamanaka | 250/216 |
| 5,510,861 A | 4/1996 | Minich et al. | |
| 5,528,393 A | 6/1996 | Sharp et al. | 359/53 |
| 5,559,634 A | 9/1996 | Weber | 359/638 |
| 5,565,933 A | 10/1996 | Reinsch | 348/742 |
| 5,574,580 A | 11/1996 | Ansley | 359/41 |
| 5,585,950 A | 12/1996 | Nishino et al. | 349/118 |
| 5,608,551 A | 3/1997 | Biles et al. | 359/95 |
| 5,627,666 A | 5/1997 | Sharp et al. | 349/74 |
| 5,658,490 A | 8/1997 | Sharp et al. | 252/299.01 |
| 5,686,931 A | 11/1997 | Fünfschilling et al. | 345/88 |
| 5,689,317 A | 11/1997 | Miller | 349/97 |
| 5,739,881 A | 4/1998 | Xu et al. | 349/118 |
| 5,774,264 A | 6/1998 | Konno et al. | 359/497 |
| 5,777,709 A | 7/1998 | Xu | 349/120 |
| 6,078,363 A | 6/2000 | Masuda et al. | 348/752 |

FOREIGN PATENT DOCUMENTS

| | | |
|---|---|---|
| JP | 63182987 A | 7/1988 |
| JP | 03028823 A | 2/1991 |
| JP | 4022920 | 1/1992 |
| JP | 04207774 A | 7/1992 |
| JP | Hei 7-84218 | 3/1995 |
| WO | WO 90/09614 | 8/1990 |
| WO | WO95/26110 | 9/1995 |

OTHER PUBLICATIONS

Wright, H., et al., "Active filters enable color imaging," Laser Focus World (May 1996) 85–90.

Cambridge Research & Instrumentation, Inc., "Liquid Crystal Tunable Filter," Cambridge, MA, 2 pages.

Displaytech, Inc. (Jan., 1996), "Switchable Color Filter", Boulder, CO, 4 pages.

Title, A.M. and Rosenberg, W.J., "Tunable birefringment filters, "Opt. Eng., (1981) 20(6):815–823.

Solc, Ivan, "Birefringent Chain Filters, "J. Opt, Soc. Am. (1965) 55(6):621–625.

Wu, Shin–Tson, "Birefringence dispersions of liquid crystals, "Physical Review A, (1986) 33(2):1270–1274.

Harris, S.E., et al., "Optical Network Synthesis Using Birefringent Crystals, I. Synthesis of Lossless Networks of Equal–Length Crystal, "J. Opt. Soc. America (1964) 54(10):1267–1279.

Amman, E.O., "Optical Network Synthesis Using Birefringent Crystals, III., Some General Properties of Lossless Birefringent Networks, "J. Opt. Soc America (1966) 56(7):943–951.

Amman, E.O. and Yarborough, J.M., "Optical Network Synthesis Using Birefringent Crystals V. Synthesis of Lossless Networks Containing Equal–Length Crystals and Compensators, "J. Opt. Soc America (1966) 56(12):1746–1754.

Sharp, G.D., et al., "P–60: Color Switching Using Ferroelectric Liquid Crystals, "Society for Information Display International Symposium, Digest of Technical Papers, Vo., XXIV, Seattle, Washington, May 18–20, 1993.

Kondo, et al., "Ferroelectric Liquid Crystal Materials Applied to Guest–Host Type Displays," Ferroelectrics (1988) 85:361–373.

Billings, BH., "A Tunable Narrow–Band Optical Filter, "J., Opt. Soc. America (1947) 37:738–746.

Buhrer, Carl F., "Synthesis and tuning of high–order birefringent filters," Applied Optics (Apr. 20, 1994) 33(12):2249–2254.

"Achromatic phase–shifters: 2. A quantized ferroelectric liquid–crystal system", P. Hariharan et al., 2319 Optics Communications 117 (1995) May 15, Nos. 1/2, Amsterdam, NL, pp. 13–15.

"Achromatic retardation plates", Alan M. Title et al., SIPE vol. 307 Polarizers and Applications (1981), pp. 120–125.

"Improvement of Birefringent Filters. 2:Achromatic Waveplates", Alan M. Title, Jan. 1975/vol. 14, No.1/ Applied Optics, pp. 229–237.

Bernard M. Schiffman, et al., "Birefringent Filter For Millimeter Waves," IEEE Transactions on Microwave Theory and Techniques, vol. MIT–16, No. 6, Jun. 1968.

Sharp, Gary Dean, "Chiral smectic liquid crystal tunable optical filters and modulators", 1992.

* cited by examiner

| | Type | Stack Only Output | Stack Altered Output | Additive Primaries Switched | Stack Altered Behavior |
|---|---|---|---|---|---|
| 1 | RED/BLACK | RED | BLACK | 1 | Moderate loss in black density |
| 2 | RED/BLACK | BLACK | RED | 1 | High density black, nearly ideal red |
| 3 | RED/WHITE | RED | WHITE | 2 | Significant white loss (B,G) |
| 4 | RED/WHITE | WHITE | RED | 2 | Significant degradation in color coordinate |
| 5 | GREEN/BLACK | GREEN | BLACK | 1 | Moderate loss in black density |
| 6 | GREEN/BLACK | BLACK | GREEN | 1 | High density black, nearly ideal green |
| 7 | GREEN/WHITE | GREEN | WHITE | 3 | High white loss (B,R) |
| 8 | GREEN/WHITE | WHITE | GREEN | 3 | Severe degradation in color coordinate |
| 9 | BLUE/BLACK | BLUE | BLACK | 1 | Moderate loss in black density |
| 10 | BLUE/BLACK | BLACK | BLUE | 1 | High density black, nearly ideal blue |
| 11 | BLUE/WHITE | BLUE | WHITE | 2 | Significant white loss (G,R) |
| 12 | BLUE/WHITE | WHITE | BLUE | 2 | Significant degradation in color coordinate |
| 13 | CYAN/BLACK | CYAN | BLACK | 2 | Significant loss in black density |
| 14 | CYAN/BLACK | BLACK | CYAN | 2 | Significant passband loss (B,G) |
| 15 | CYAN/WHITE | CYAN | WHITE | 1 | Small ripple in red |
| 16 | CYAN/WHITE | WHITE | CYAN | 1 | Flat white, nearly ideal cyan |
| 17 | MAGENTA/BLACK | MAGENTA | BLACK | 3 | High loss in black density |
| 18 | MAGENTA/BLACK | BLACK | MAGENTA | 3 | High passband loss (B,R) |
| 19 | MAGENTA/WHITE | MAGENTA | WHITE | 1 | Small ripple in green |
| 20 | MAGENTA/WHITE | WHITE | MAGENTA | 1 | Flat white, nearly ideal magenta |
| 21 | YELLOW/BLACK | YELLOW | BLACK | 2 | Significant loss in black density |
| 22 | YELLOW/BLACK | BLACK | YELLOW | 2 | Significant passband loss(G,R) |
| 23 | YELLOW/WHITE | YELLOW | WHITE | 1 | Small ripple in blue |
| 24 | YELLOW/WHITE | WHITE | YELLOW | 1 | Flat white, nearly ideal yellow |

FIG. 2

| Design # | $\alpha_1$ | $\alpha_2$ | $\alpha_3$ |
| --- | --- | --- | --- |
| 1 | 7.5° | -37.5° | 22.5° |
| 2 | 7.5° | -30.0° | 30.0° |
| 3 | 7.5° | 52.5° | -67.5° |
| 4 | 15.0° | -45.0° | 7.5° |
| 5 | 15.0° | -37.5° | 15.0° |
| 6 | 15.0° | -30.0° | 22.5° |
| 7 | 15.0° | 60.0° | -67.5° |
| 8 | 22.5° | -30.0° | 15.0° |

FIG. 14

SO Filtered CSLM Designs

| Design # | $\alpha_1$ | $\alpha_2$ | $\alpha_3$ | $\alpha'_3$ | $\alpha'_2$ | $\alpha'_1$ |
|---|---|---|---|---|---|---|
| 1 | 37.5 | 22.5 | 7.5 | 82.5 | 67.5 | 52.5 |
| 2 | 22.5 | 75 | 75 | 15 | 15 | 67.5 |
| 3 | 30 | 82.5 | 75 | 15 | 7.5 | 60 |
| 4 | 22.5 | -82.5 | 52.5 | 37.5 | -7.5 | 67.5 |
| 5 | 45 | -15 | 52.5 | 37.5 | -75 | 45 |
| 6 | 7.5 | 37.5 | 7.5 | 82.5 | 52.5 | 82.5 |
| 7 | 30 | -75 | 52.5 | 37.5 | -15 | 60 |
| 8 | 7.5 | 67.5 | 82.5 | 7.5 | 22.5 | 82.5 |
| 9 | 7.5 | -75 | -60 | -30 | -15 | 82.5 |
| 10 | 15 | -67.5 | -60 | -30 | -22.5 | 75 |
| 11 | 22.5 | -60 | -60 | -30 | -30 | 67.5 |
| 12 | 45 | -30 | -52.5 | -37.5 | -60 | 45 |
| 13 | 7.5 | -22.5 | -7.5 | -82.5 | -67.5 | 82.5 |
| 14 | 15 | 60 | -67.5 | -22.5 | 30 | 75 |
| 15 | 45 | -22.5 | -45 | -45 | -67.5 | 45 |
| 16 | 45 | 15 | -52.5 | -37.5 | 75 | 45 |
| 17 | 22.5 | -7.5 | -7.5 | -82.5 | -82.5 | 67.5 |
| 18 | 30 | -15 | -67.5 | -22.5 | -75 | 60 |
| 19 | 37.5 | 0 | -60 | -30 | 90 | 52.5 |
| 20 | 45 | 7.5 | -60 | -30 | 82.5 | 45 |
| 21 | 7.5 | 15 | -15 | -75 | 75 | 82.5 |
| 22 | 30 | -22.5 | -75 | -15 | -67.5 | 60 |
| 23 | 37.5 | -7.5 | -67.5 | -22.5 | -82.5 | 52.5 |
| 24 | 45 | 0 | -67.5 | -22.5 | 90 | 45 |
| 25 | 15 | 75 | -52.5 | -37.5 | 15 | 75 |
| 26 | 7.5 | -37.5 | 22.5 | 67.5 | -52.5 | 82.5 |
| 27 | 15 | -37.5 | 15 | 75 | -52.5 | 75 |
| 28 | 15 | -30 | 22.5 | 67.5 | -60 | 75 |
| 29 | 22.5 | -37.5 | 7.5 | 82.5 | -52.5 | 67.5 |
| 30 | 7.5 | -7.5 | 7.5 | 82.5 | -82.5 | 82.5 |
| 31 | 30 | -30 | -82.5 | -7.5 | -60 | 60 |
| 32 | 30 | -67.5 | -75 | -15 | -22.5 | 60 |
| 33 | 22.5 | -82.5 | -82.5 | -7.5 | -7.5 | 67.5 |
| 34 | 30 | -75 | -82.5 | -7.5 | -15 | 60 |
| 35 | 45 | -60 | -82.5 | -7.5 | -30 | 45 |
| 36 | 45 | -15 | -82.5 | -7.5 | -75 | 45 |
| 37 | 37.5 | -67.5 | -82.5 | -7.5 | -22.5 | 52.5 |
| 38 | 37.5 | -22.5 | -82.5 | -7.5 | -67.5 | 52.5 |
| 39 | 15 | -82.5 | -75 | -15 | -7.5 | 75 |
| 40 | 22.5 | -60 | 75 | 15 | -30 | 67.5 |
| 41 | 7.5 | -75 | 75 | 15 | -15 | 82.5 |
| 42 | 15 | -67.5 | 75 | 15 | -22.5 | 75 |
| 43 | 7.5 | -67.5 | 82.5 | 7.5 | -22.5 | 82.5 |
| 44 | 15 | -60 | 82.5 | 7.5 | -30 | 75 |
| 45 | 30 | -45 | 82.5 | 7.5 | -45 | 60 |
| 46 | 15 | -45 | 7.5 | 82.5 | -45 | 75 |

FIG. 17

SO Neutral CSLM Designs

| Design # | $\alpha_1$ | $\alpha_2$ | $\alpha_3$ | $\alpha'_3$ | $\alpha'_2$ | $\alpha'_1$ |
|---|---|---|---|---|---|---|
| 1 | 37.5 | 22.5 | 7.5 | -82.5 | -67.5 | -52.5 |
| 2 | 22.5 | 75 | 75 | -15 | -15 | -67.5 |
| 3 | 30 | 82.5 | 75 | -15 | -7.5 | -60 |
| 4 | 22.5 | -82.5 | 52.5 | -37.5 | 7.5 | -67.5 |
| 5 | 45 | -15 | 52.5 | -37.5 | 75 | -45 |
| 6 | 7.5 | 37.5 | 7.5 | -82.5 | -52.5 | -82.5 |
| 7 | 30 | -75 | 52.5 | -37.5 | 15 | -60 |
| 8 | 7.5 | 67.5 | 82.5 | -7.5 | -22.5 | -82.5 |
| 9 | 7.5 | -75 | -60 | 30 | 15 | -82.5 |
| 10 | 15 | -67.5 | -60 | 30 | 22.5 | -75 |
| 11 | 22.5 | -60 | -60 | 30 | 30 | -67.5 |
| 12 | 45 | -30 | -52.5 | 37.5 | 60 | -45 |
| 13 | 7.5 | -22.5 | -7.5 | 82.5 | 67.5 | -82.5 |
| 14 | 15 | 60 | -67.5 | 22.5 | -30 | -75 |
| 15 | 45 | -22.5 | -45 | 45 | 67.5 | -45 |
| 16 | 45 | 15 | -52.5 | 37.5 | -75 | -45 |
| 17 | 22.5 | -7.5 | -7.5 | 82.5 | 82.5 | -67.5 |
| 18 | 30 | -15 | -67.5 | 22.5 | 75 | -60 |
| 19 | 37.5 | 0 | -60 | 30 | -90 | -52.5 |
| 20 | 45 | 7.5 | -60 | 30 | -82.5 | -45 |
| 21 | 7.5 | 15 | -15 | 75 | -75 | -82.5 |
| 22 | 30 | -22.5 | -75 | 15 | 67.5 | -60 |
| 23 | 37.5 | -7.5 | -67.5 | 22.5 | 82.5 | -52.5 |
| 24 | 45 | 0 | -67.5 | 22.5 | -90 | -45 |
| 25 | 15 | 75 | -52.5 | 37.5 | -15 | -75 |
| 26 | 7.5 | -37.5 | 22.5 | -67.5 | 52.5 | -82.5 |
| 27 | 15 | -37.5 | 15 | -75 | 52.5 | -75 |
| 28 | 15 | -30 | 22.5 | -67.5 | 60 | -75 |
| 29 | 22.5 | -37.5 | 7.5 | -82.5 | 52.5 | -67.5 |
| 30 | 7.5 | -7.5 | 7.5 | -82.5 | 82.5 | -82.5 |
| 31 | 30 | -30 | -82.5 | 7.5 | 60 | -60 |
| 32 | 30 | -67.5 | -75 | 15 | 22.5 | -60 |
| 33 | 22.5 | -82.5 | -82.5 | 7.5 | 7.5 | -67.5 |
| 34 | 30 | -75 | -82.5 | 7.5 | 15 | -60 |
| 35 | 45 | -60 | -82.5 | 7.5 | 30 | -45 |
| 36 | 45 | -15 | -82.5 | 7.5 | 75 | -45 |
| 37 | 37.5 | -67.5 | -82.5 | 7.5 | 22.5 | -52.5 |
| 38 | 37.5 | -22.5 | -82.5 | 7.5 | 67.5 | -52.5 |
| 39 | 15 | -82.5 | -75 | 15 | 7.5 | -75 |
| 40 | 22.5 | -60 | 75 | -15 | 30 | -67.5 |
| 41 | 7.5 | -75 | 75 | -15 | 15 | -82.5 |
| 42 | 15 | -67.5 | 75 | -15 | 22.5 | -75 |
| 43 | 7.5 | -67.5 | 82.5 | -7.5 | 22.5 | -82.5 |
| 44 | 15 | -60 | 82.5 | -7.5 | 30 | -75 |
| 45 | 30 | -45 | 82.5 | -7.5 | 45 | -60 |
| 46 | 15 | -45 | 7.5 | -82.5 | 45 | -75 |

FIG. 18

Crossed Polarizer CSLM Designs (22.5°)

| Design # | $\alpha_1$ | $\alpha_2$ | $\alpha_3$ | $\alpha_3'$ | $\alpha_2'$ | $\alpha_1'$ |
|---|---|---|---|---|---|---|
| 1 | 7.5 | -7.5 | 7.5 | -7.5 | 7.5 | -7.5 |
| 2 | 37.5 | 52.5 | 37.5 | -37.5 | -52.5 | -37.5 |
| 3 | 22.5 | -30 | -30 | 30 | 30 | -22.5 |
| 4 | 30 | -22.5 | -30 | 30 | 22.5 | -30 |
| 5 | 7.5 | -67.5 | 82.5 | -82.5 | 67.5 | -7.5 |
| 6 | 7.5 | -22.5 | -52.5 | 52.5 | 22.5 | -7.5 |
| 7 | 37.5 | -30 | 90 | 90 | 30 | -37.5 |
| 8 | 45 | -15 | -82.5 | 82.5 | 15 | -45 |
| 9 | 22.5 | -52.5 | 82.5 | -82.5 | 52.5 | -22.5 |
| 10 | 30 | -45 | 82.5 | -82.5 | 45 | -30 |
| 11 | 7.5 | 60 | 30 | -30 | -60 | -7.5 |
| 12 | 45 | -22.5 | 90 | 90 | 22.5 | -45 |
| 13 | 15 | -45 | -37.5 | 37.5 | 45 | -15 |
| 14 | 7.5 | -52.5 | -37.5 | 37.5 | 52.5 | -7.5 |
| 15 | 37.5 | -37.5 | 82.5 | -82.5 | 37.5 | -37.5 |
| 16 | 22.5 | -37.5 | -37.5 | 37.5 | 37.5 | -22.5 |
| 17 | 30 | -75 | -82.5 | 82.5 | 75 | -30 |
| 18 | 7.5 | -75 | 75 | -75 | 75 | -7.5 |
| 19 | 15 | -67.5 | 75 | -75 | 67.5 | -15 |
| 20 | 45 | -30 | 82.5 | -82.5 | 30 | -45 |
| 21 | 15 | -82.5 | -75 | 75 | 82.5 | -15 |
| 22 | 22.5 | -60 | 75 | -75 | 60 | -22.5 |
| 23 | 22.5 | -75 | -75 | 75 | 75 | -22.5 |
| 24 | 37.5 | -67.5 | -82.5 | 82.5 | 67.5 | -37.5 |
| 25 | 15 | 67.5 | 30 | -30 | -67.5 | -15 |
| 26 | 30 | -52.5 | 75 | -75 | 52.5 | -30 |
| 27 | 7.5 | 67.5 | 37.5 | -37.5 | -67.5 | -7.5 |
| 28 | 30 | -67.5 | -75 | 75 | 67.5 | -30 |
| 29 | 37.5 | -45 | 75 | -75 | 45 | -37.5 |
| 30 | 37.5 | -60 | -75 | 75 | 60 | -37.5 |
| 31 | 45 | -60 | -82.5 | 82.5 | 60 | -45 |
| 32 | 45 | -37.5 | 75 | -75 | 37.5 | -45 |
| 33 | 45 | -52.5 | -75 | 75 | 52.5 | -45 |
| 34 | 7.5 | 37.5 | 52.5 | -52.5 | -37.5 | -7.5 |
| 35 | 7.5 | -7.5 | -37.5 | 37.5 | 7.5 | -7.5 |
| 36 | 22.5 | 75 | 30 | -30 | -75 | -22.5 |
| 37 | 15 | 75 | 37.5 | -37.5 | -75 | -15 |
| 38 | 22.5 | 82.5 | 37.5 | -37.5 | -82.5 | -22.5 |
| 39 | 22.5 | 67.5 | 22.5 | -22.5 | -67.5 | -22.5 |
| 40 | 45 | 75 | 7.5 | -7.5 | -75 | -45 |
| 41 | 30 | 75 | 22.5 | -22.5 | -75 | -30 |
| 42 | 7.5 | 7.5 | -22.5 | 22.5 | -7.5 | -7.5 |
| 43 | 22.5 | 52.5 | 52.5 | -52.5 | -52.5 | -22.5 |
| 44 | 37.5 | 75 | 15 | -15 | -75 | -37.5 |
| 45 | 45 | 82.5 | 15 | -15 | -82.5 | -45 |
| 46 | 7.5 | 0 | -30 | 30 | 0 | -7.5 |
| 47 | 15 | 45 | 52.5 | -52.5 | -45 | -15 |
| 48 | 37.5 | 82.5 | 22.5 | -22.5 | -82.5 | -37.5 |
| 49 | 30 | 82.5 | 30 | -30 | -82.5 | -30 |
| 50 | 45 | 90 | 22.5 | -22.5 | 90 | -45 |
| 51 | 37.5 | 90 | 30 | -30 | 90 | -37.5 |
| 52 | 7.5 | -67.5 | -52.5 | 52.5 | 67.5 | -7.5 |
| 53 | 7.5 | -75 | -60 | 60 | 75 | -7.5 |
| 54 | 15 | -82.5 | 60 | -60 | 82.5 | -15 |
| 55 | 22.5 | -82.5 | 52.5 | -52.5 | 82.5 | -22.5 |
| 56 | 7.5 | 22.5 | 37.5 | -37.5 | -22.5 | -7.5 |

FIG. 19

Crossed Polarizer CSLM Designs (67.5°)

| Design # | $\alpha_1$ | $\alpha_2$ | $\alpha_3$ | $\alpha_3'$ | $\alpha_2'$ | $\alpha_1'$ |
|---|---|---|---|---|---|---|
| 1 | 15 | -30 | 22.5 | -22.5 | 30 | -15 |
| 2 | 37.5 | -37.5 | -7.5 | 7.5 | 37.5 | -37.5 |
| 3 | 37.5 | -30 | 0 | 0 | 30 | -37.5 |
| 4 | 45 | 15 | 82.5 | -82.5 | -15 | -45 |
| 5 | 22.5 | -30 | 15 | -15 | 30 | 22.5 |
| 6 | 30 | -30 | 7.5 | -7.5 | 30 | -30 |
| 7 | 30 | -37.5 | 0 | 0 | 37.5 | -30 |
| 8 | 45 | 7.5 | 75 | -75 | -7.5 | -45 |
| 9 | 15 | -37.5 | 15 | -15 | 37.5 | -15 |
| 10 | 22.5 | -37.5 | 7.5 | -7.5 | 37.5 | -22.5 |
| 11 | 15 | -45 | 7.5 | -7.5 | 45 | -15 |
| 12 | 15 | -52.5 | 0 | 0 | 52.5 | -15 |
| 13 | 7.5 | -22.5 | 82.5 | -82.5 | 22.5 | -7.5 |
| 14 | 7.5 | 0 | -75 | 75 | 0 | -7.5 |
| 15 | 7.5 | -15 | 90 | 90 | 15 | -7.5 |
| 16 | 7.5 | 7.5 | -67.5 | 67.5 | -7.5 | -7.5 |
| 17 | 45 | -60 | -37.5 | 37.5 | 60 | -45 |
| 18 | 7.5 | -52.5 | 7.5 | -7.5 | 52.5 | -7.5 |
| 19 | 7.5 | -7.5 | -82.5 | 82.5 | 7.5 | 7.5 |
| 20 | 7.5 | 37.5 | -37.5 | 37.5 | -37.5 | -7.5 |
| 21 | 7.5 | -15 | 60 | -15 | 15 | -60 | -7.5 |
| 22 | 7.5 | 60 | -60 | 60 | -60 | -7.5 |
| 23 | 7.5 | 45 | -30 | 30 | -45 | -7.5 |
| 24 | 7.5 | 52.5 | -22.5 | 22.5 | -52.5 | -7.5 |
| 25 | 7.5 | 52.5 | -67.5 | 67.5 | -52.5 | -7.5 |
| 26 | 22.5 | 82.5 | -52.5 | 52.5 | -82.5 | -22.5 |
| 27 | 7.5 | 45 | -75 | 75 | -45 | -7.5 |
| 28 | 22.5 | 30 | 75 | -75 | -30 | -22.5 |
| 29 | 15 | 15 | 67.5 | -67.5 | -15 | -15 |
| 30 | 15 | 22.5 | 75 | -75 | -22.5 | -15 |
| 31 | 45 | -75 | -7.5 | 7.5 | 75 | 45 |
| 32 | 37.5 | 82.5 | -22.5 | 22.5 | -82.5 | -37.5 |
| 33 | 37.5 | 90 | -15 | 15 | 90 | -37.5 |
| 34 | 45 | -67.5 | 0 | 0 | 67.5 | -45 |
| 35 | 15 | -15 | 37.5 | -37.5 | 15 | -15 |
| 36 | 7.5 | 0 | 60 | -60 | 0 | -7.5 |
| 37 | 7.5 | -7.5 | 52.5 | -52.5 | 7.5 | -7.5 |
| 38 | 37.5 | -82.5 | -7.5 | 7.5 | 82.5 | -37.5 |
| 39 | 7.5 | 7.5 | 67.5 | -67.5 | -7.5 | -7.5 |
| 40 | 37.5 | 30 | -75 | 75 | -30 | -37.5 |
| 41 | 30 | 60 | -37.5 | 37.5 | -60 | -30 |
| 42 | 30 | 45 | -52.5 | 52.5 | -45 | -30 |
| 43 | 30 | 67.5 | -30 | 30 | -67.5 | -30 |
| 44 | 37.5 | -75 | 0 | 0 | 75 | -37.5 |
| 45 | 45 | -60 | 7.5 | -7.5 | 60 | -45 |
| 46 | 30 | 37.5 | -60 | 60 | -37.5 | -30 |
| 47 | 15 | -27.5 | 30 | -30 | 22.5 | -15 |
| 48 | 37.5 | 22.5 | -82.5 | 82.5 | -22.5 | -37.5 |
| 49 | 30 | 30 | -67.5 | 67.5 | -30 | -30 |
| 50 | 7.5 | -22.5 | 37.5 | -37.5 | 22.5 | -7.5 |
| 51 | 30 | 22.5 | -75 | 75 | -22.5 | -30 |
| 52 | 22.5 | -22.5 | 22.5 | -22.5 | 22.5 | -22.5 |
| 53 | 45 | 22.5 | 90 | 90 | -22.5 | -45 |
| 54 | 37.5 | 15 | 90 | 90 | -15 | -37.5 |
| 55 | 45 | -30 | -7.5 | 7.5 | 30 | -45 |
| 56 | 15 | 67.5 | -60 | 60 | -67.5 | -15 |
| 57 | 15 | 60 | -67.5 | 67.5 | -60 | -15 |
| 58 | 22.5 | 75 | -60 | 60 | -75 | -22.5 |
| 59 | 22.5 | 67.5 | -67.5 | 67.5 | -67.5 | -22.5 |

FIG. 20

CCS Truth Table

| 1 Blue Modulator | 2 Green Modulator | 3 Red Modulator | Output |
|---|---|---|---|
| Off | Off | Off | Black |
| Off | Off | On | Red |
| Off | On | Off | Green |
| On | Off | Off | Blue |
| On | On | On | White |
| On | Off | Off | Cyan |
| On | Off | On | Magenta |
| Off | On | On | Yellow |

FIG. 23

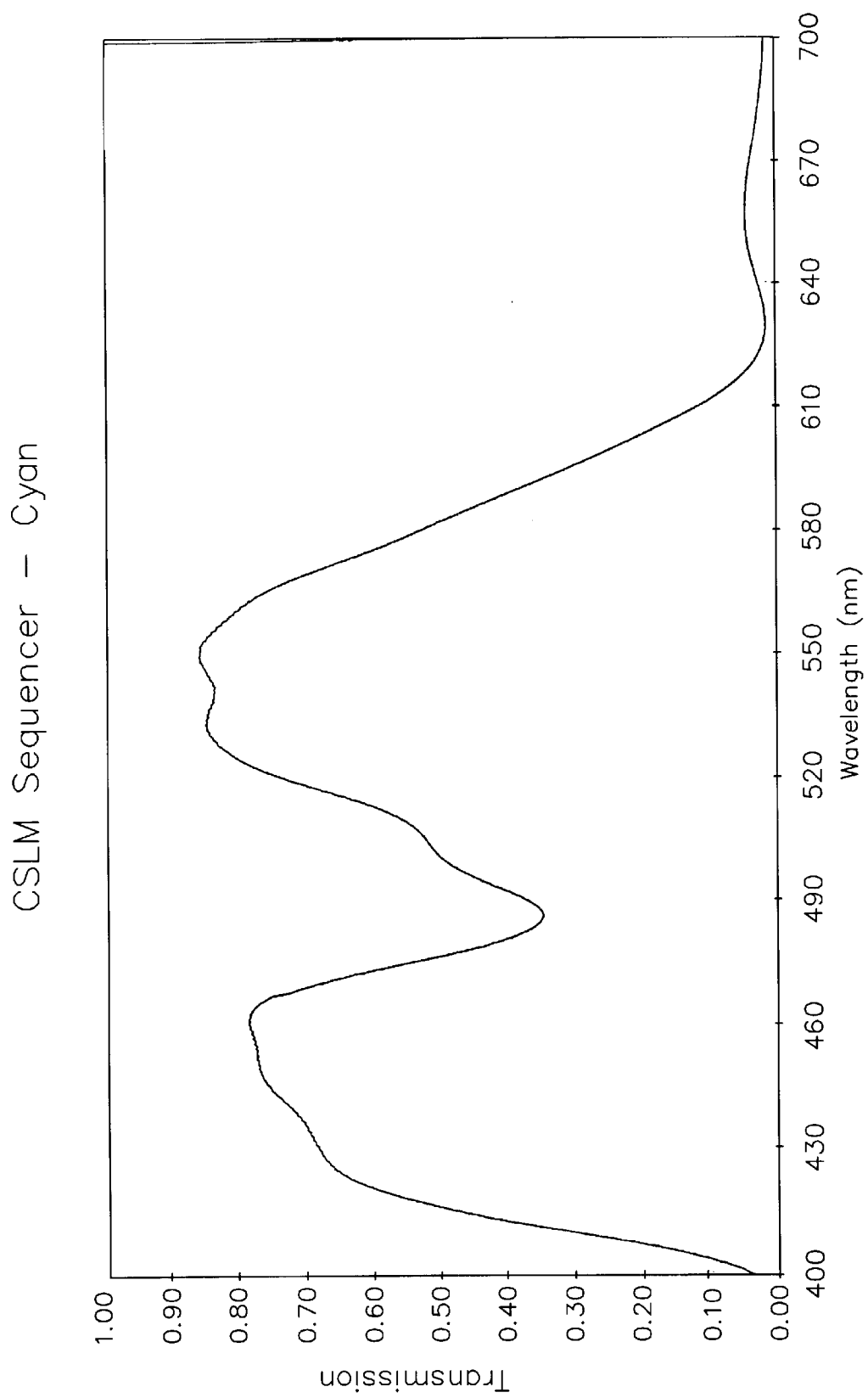

| Case | Red Stage | Green Stage | Blue Stage | Output | Notes |
|------|-----------|-------------|------------|--------|-------|
| 1 | $W_B$ | x $W_B$ | B | Blue | Ideal |
| 2 | $W_G$ | x G | $W_G$ | Green | Ideal |
| 3 | R | x $W_R$ | $W_R$ | Red | Ideal |
| 4 | R | x G | B | Black | R,G,B Blocking Redundancy |
| 5 | R | x G | $W_{ANY}$ | Not Yellow | R-G Overlap |
| 6 | R | x $W_{ANY}$ | B | Not Magenta | Black |
| 7 | $W_{ANY}$ | x G | B | Not Cyan | B-G Overlap |
| 8 | $W_{ANY}$ | x $W_{ANY}$ | $W_{ANY}$ | White | Lossy |

FIG. 31

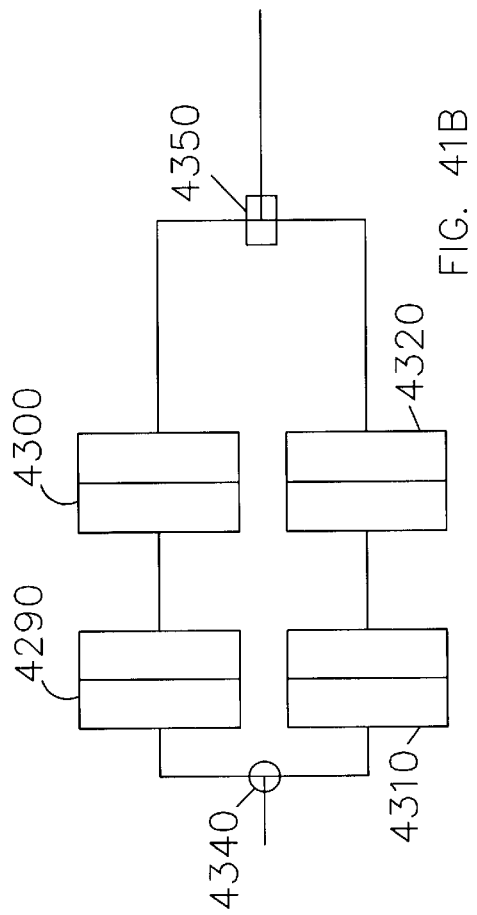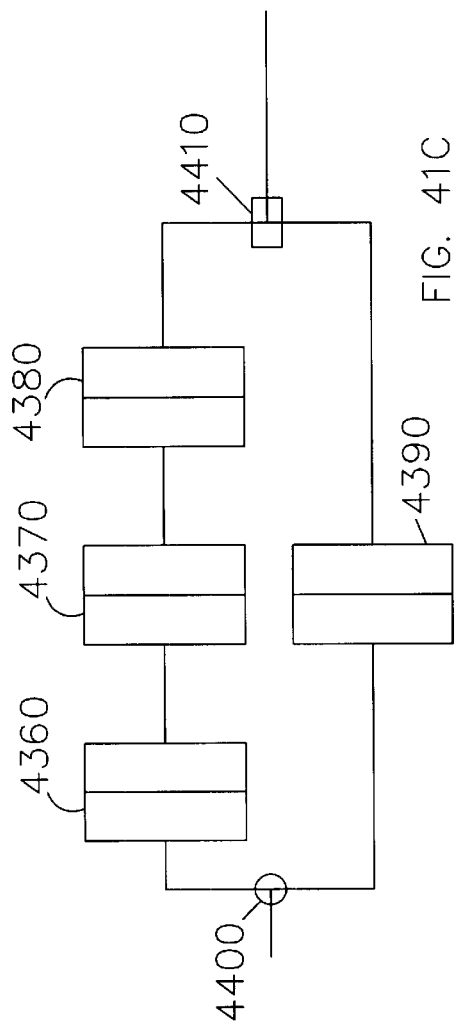

| Design Number | Number of Panels | Number of Paths | Number of Subframes | Number of Pixels | Display Type |
|---|---|---|---|---|---|
| 1 | 1 | 1 | 1 | 3 | R,G,B Color Filter Array |
| 2 | 1 | 1 | 3 | 1 | Full-Color Sequential |
| 3 | 1 | 1 | 2 | 2 | Hybrid Spatial/Sequential |
| 4 | 2 | 1 | 1 | 2 | Hybrid Common-Path/Spatial |
| 5 | 2 | 1 | 2 | 1 | Hybrid Common-Path/Sequential |
| 6 | 2 | 2 | 1,2 | 1 | Hybrid Sequential/Two-Path (i.e. Path 1: B/G, Path 2: R) |
| 7 | 2 | 2 | 2,2 | 1 | Hybrid Sequential/Two-Path (i.e. Path 1: B/R, Path 2: G/R) |
| 8 | 2 | 2 | 1,3 | 1 | Path 1: Full Color Sequential (Chrominance Path) Path 2: Monochrome (Luminance Path) |
| 9 | 2 | 2 | 1 | 1,2 | Hybrid Spatial/Two-Path (i.e. Path 1: B/G Pixels, Path 2: R) |
| 10 | 2 | 2 | 1 | 1,3 | Path 1: R,G,B Color Filter Array (Chrominance Path) Path 2: Monochrome (Luminance Path) |
| 11 | 3 | 1 | 1 | 1 | Full-Color Common-Path (i.e. Subtractive) |
| 12 | 3 | 2 | 1 | 1 | Hybrid Common-Path/Split-Path (i.e. Path 1: B & G Panels, Path 2: R Panel) |
| 13 | 3 | 3 | 1 | 1 | Conventional Three Panel |
| 14 | 4 | 1 | 1 | 1 | Full-Color Common-Path with Black Panel |
| 15 | 4 | 2 | 1 | 1 | Path 1: Full-Color Common-Path (Chrominance Path) Path 2: Monochrome (Luminance Path) |
| 16 | 4 | 2 | 1 | 1 | Path 1: Two-Color Common-Path (i.e. B & R Panels) Path 2: Two-Color Common-Path (i.e. G & R Panels) |
| 17 | 4 | 3 | 1 | 1 | Path 1: Two-Color Common-Path (i.e. B & R Panels) Paths 2, 3: Conventional Split-Path (i.e. G & R Panels) |
| 18 | 4 | 4 | 1 | 1 | Paths 1, 2, 3: Conventional Three Panel (Chrominance Path) Path 4: Monochrome (Luminance Path) |

FIG. 45

COLOR FILTERS, SEQUENCERS AND DISPLAYS USING COLOR SELECTIVE LIGHT MODULATORS

This application is a Divisional of prior application Ser. No. 09/362,497, filed Jul. 30, 1999 (now U.S. Pat. No. 6,417,892), which claims priority to Provisional Application No. 60/094,911 filed Jul. 31, 1998 and is a CIP of Ser. No. 09/126,330, filed Jul. 31, 1998, which is a CIP of Ser. No. 08/853,468, filed May 9, 1997 (now U.S. Pat. No. 5,990, 996), which is a CIP of Ser. No. 08/645,580, filed May 14, 1996 (now U.S. Pat. No. 5,822,021), said Ser. No. 09/126, 330 is also a CIP of Ser. No. 08/855,716, filed May 8, 1997, which is a Continuation of Ser. No. 08/447,522, filed May 23, 1995 (now U.S. Pat. No. 5,751,384), the contents of which are incorporated herein by reference in their entirety.

BACKGROUND OF THE INVENTION

1. Field of the Invention

This invention relates generally to color selective polarization modulation and, more specifically, to color sequencers for colorizing imaging devices, such as displays and cameras.

2. Background of the Related Art

Full color display is generally implemented using one of four techniques: (1) spatially using color filter arrays; (2) temporally using sequential color techniques; (3) additive superposition using multiple optical paths; or (4) subtractively using stacked display panels. In spatial color systems, each full-color pixel is subdivided into at least three sub-pixels, one dedicated to each additive primary color. A color filter array (CFA), consisting of red, green and blue spectral filters, is registered to the active pixel elements of a liquid crystal display (LCD) such that the transmission level of each primary color can be locally controlled. This technique requires that the sub-pixels be sufficiently small that they are not individually resolvable by the viewer. The resulting spatial integration by the eye yields a perceived full-color image. As a result of sub-dividing, display panels used in spatial color systems require three times the number of pixels than those used in monochrome displays.

In sequential color techniques, sub-frames are displayed, with each sub-frame comprising the distribution of an additive primary color in a full-color image. By displaying the sub-frames at a sufficient rate, e.g., three-times the video rate, or 180 Hz, the eye integrates the sub-frames temporally, yielding a perceived full-color image. In this case, each pixel provides full-color because there is no spatial subdivision. In principle, a full-color pixel using a CFA provides the same brightness as a sequential pixel of the same area. However, neither makes efficient use of light, because displaying an additive primary color generally means blocking the complementary subtractive primary.

To implement a full-color display using additive superposition, as for example in a projection system, the light source is split into three optical paths, each containing the light source power in one additive primary band. Typically, dichroic beamsplitters are used to separate the three additive primary colors into three physically separate paths. One display panel is devoted to spatially modulating the optical transmission in each optical path. Subsequently, each image is additively superimposed to form a full color image. Though this technique is more hardware intensive, it is in principle three times brighter than either spatial or temporal color techniques. As such, it is the preferred technique for implementing projection systems.

In a subtractive display, three optical paths are effectively created without wavefront shearing. The term subtractive is appropriate because such systems are analogous to color film. Though all light travels the same physical path, only specific layers of the structure manipulate light in each wavelength band. In practice, a full-color display consists of a stack of three co-registered transmissive display panels, each responsible for independently determining the local transmission of one additive primary. Because there is only one physical path, each stage must be made independent of the others using wavelength selective polarization effects. Luminance modulation requires both a polarized input and an effective voltage-controlled analyzing polarizer. Thus, color independent luminance modulation is typically achieved by wavelength selectively controlling the degree of input polarization, and/or the wavelength selectivity of the analyzer. Compared to additive split-path displays, subtractive displays have unique design challenges. In order to obtain high optical throughput, panel transmission losses must be low, any passive color control elements must be low loss, and images must be efficiently relayed between panels. In direct view display systems, there are additional complications associated with color quality and parallax the when the display is viewed off-normal.

There are several subtractive display schemes disclosed in the related art. The simplest structures, such as those disclosed in U.S. Pat. Nos. 3,703,329 and 5,032,007, uses three guest host LCDs with a neutral polarizer. Each LCD panel contains a dye that acts as a color selective polarizer with in-plane projection determined by the applied voltage. In other embodiments, the function of modulation and wavelength selective polarization analysis is decoupled by combining quasi neutral LCDs with color selective polarizing films. Such polarizers can be pleochroic dye polarizers, such as those disclosed in U.S. Pat. No. 4,416,514, U.S. Pat. No. 5,122,887, and K. R. Sarma et al., SID '93 DIGEST, p. 1005, or cholesteric LC films, such as those disclosed in U.S. Pat. No. 5,686,961. Other potential color polarizer film technologies include multi-layer stretched polymer films that behave as dielectric mirrors in one linear polarization, and are isotropic in the orthogonal polarization, such as those disclosed in U.S. Pat. No. 5,612,820, and coated prismatic films, such as those disclosed in U.S. Pat. No. 5,422,756. In still other configurations, such as the configuration disclosed in U.S. Pat. No. 5,050,965, mixed-mode subtractive displays are disclosed that utilize color selective polarizers in combination with birefringence color from twisted LCD panels.

Performance of related art subtractive displays has been hampered by a number of factors. For instance, color quality and throughput are poor due to the shallow transition slope and low peak transmission of many dye polarizers. More fundamentally, the optical density of the black state is typically poor when using three subtractive filter stages.

In a subtractive mode, each additive primary is generated via the cooperative action of two stages, each blocking one additive primary. When the blocked additive primaries are adjacent primaries, there is typically an unwanted leakage. More significantly, a dense black state is obtained by subtracting all three additive primaries from white, including any interprimary light. This represents a difficult spectral management problem, because contrast ratios can plummet with even small side lobe amplitudes. Furthermore, designs that achieve acceptable contrast are frequently not robust against small fabrication tolerances, variations in modulator uniformity, and environmental changes. This is because high contrast ratio demands a high level of cooperation between stages.

Reduced side lobe levels can be obtained by increasing the overlap of each subtractive primary. However, this cannot be done without adversely affecting the color coordinates of the primary colors. While passive notch filtering can be provided to eliminate interprimary light, there is an associated insertion loss and an increase in cost. As in printing systems, a fourth "black-panel" can be inserted to improve contrast ratio, which again increases cost and complexity and reduces throughput. This "black-panel" technique is disclosed in U.S. Pat. No. 5,050,965.

Tunable filters or color shutters are well documented in the prior art. There are two classes of such filters: polarization interference filters (PIFs), and switched polarizer filters (SPFs).

PIFs have traditionally been used for spectrometry instrumentation, because they are bulky, complex to fabricate, and require calibration. Lyot PIFs consist of stand-alone filter units acting cooperatively to generate a bandpass profile. Such spectral profiles are not considered ideal for display, particularly in the blue, where adequate red blocking determines an unnecessarily narrow bandpass width. Tuning Lyot PIFs typically requires inserting analog LC devices in each stage and forming a look-up table.

The Solc PIF has the benefit that internal polarizers are eliminated, as do other filters designed using finite impulse response methods (Harris, Ahmann, and Chang). In general, however, tuning the profile of a PIF requires shifting the center wavelength of each retarder in unison. Therefore, each passive retarder must be made active with the addition of one or more LC devices. Such structures enable the generation of analog true-color, which is beneficial in spectroscopic applications. In color Display/Imaging, however, higher throughput and simpler structures are achieved using SPFs.

An SPF utilizes a digital LC switch to toggle between orthogonal polarization states. A passive component, or color polarizer, has substantially different transmission spectra associated with these polarizations. Thus, driving the LC device between states provides modulation between the two color polarizer spectra. Should the LC device be driven in an analog mode, the output typically consists of voltage-controlled mixtures of the color polarizer spectra.

Color polarizers used previously in SPFs include single (45°-oriented linear retarders on neutral polarizers (disclosed in U.S. Pat. No. 4,003,081 to Hilsum, U.S. Pat. No. 4,091,808 to Scheffer, and U.S. Pat. No. 4,232,948 to Shanks), pleochroic dye linear polarizers (disclosed in U.S. Pat. No. 4,582,396 to Bos, U.S. Pat. No. 4,416,514 to Plummer, U.S. Pat. No. 4,758,818 to Vatne, and U.S. Pat. No. 5,347,378 to Handschy), hybrid structures containing both effects (disclosed in U.S. Pat. No. 4,917,465 to Conner, and U.S. Pat. No. 5,689,317 to Miller), cholesteric liquid crystal circular polarizers (disclosed in U.S. Pat. No. 5,686, 931 to Funfschilling et al.), and polarizer retarder stack (PRS) technology (disclosed in U.S. Pat. No. 5,751,384 to Sharp). Other potential color polarizer technologies include coated prismatic polarizers (disclosed in U.S. Pat. No. 5,422,756 to Weber), and multi-layer stretched polymers (disclosed in PCT Application No. WO 95/17691 to Ouderkirk).

The highest throughput SPFs currently utilize PRS technology. Because such structures use a switch external to the stack, conservation of power dictates that, assuming a neutral switch, the two spectra are substantially inverses of one another. In the absence of additional passive filtering, the spectra are highly related, with a spectral overlap at the half-maximum point. As such, retarder based SPF technology is well suited to switching between complementary colors, rather than switching between filtered and neutral outputs.

Another issue with complementary color switch technology concerns the robustness of the output. Typically, cell chrominance has a significant influence on the resulting color coordinate. While the center wavelength and uniformity of the cell are determined in fabrication, behavior is subsequently influenced by temperature, voltage, incidence angle and azimuth. For instance, when a zero twist nematic (ZTN) cell inverts the spectrum of a PRS (typically the undriven state), the half-maximum point can be shifted according to the half-wave retardance of the cell. In the driven state, the cell can be made to vanish at normal incidence, giving color polarizer limited performance. However, a significant retardance is typically experienced when viewing the filter off-normal, which can significantly influence the color coordinate. Thus, achieving a stable color coordinate using complementary switching can place impractical tolerances and, in some cases, demand unattainable performance on the cell.

The above references are incorporated by reference herein where appropriate for teachings of additional or alternative details, features and/or technical background.

SUMMARY OF THE INVENTION

The present invention provides color selective light modulators, and color filters, sequencers and displays utilizing the same. Color separation is accomplished with nearly lossless retarder films, providing high spectral contrast between transmission and extinction, with arbitrarily steep transition slopes.

In the color filters and color sequencers of the present invention, each color filter stage is a color selective light modulator (CSLM) which varies the transmission of one color without modulating the complementary color. A color filter stage can switch between transmitting a neutral spectrum (white or black) and transmitting a chromatically filtered spectrum. Two or more color filter stages can be used in series, with each filter stage independently controlling the transmission of a primary color.

In a preferred embodiment, each filter stage controls the transmission of an additive primary color locally in an analog fashion, thus integrating image and color generation. One preferred embodiment eliminates internal polarizers between filter stages, thereby providing a full-color display with only an input polarizing means and an output polarizing means. A preferred two-polarizer configuration operates in an additive mode, which exhibits benefits over subtractive mode schemes.

A color selective polarization modulator contains an active polarization modulating element (modulator), e.g., an electro-optic or magneto-optic polarization modulator having a modulation state of polarization which is substantially intermediate between isotropic states of polarization, i.e., eigenpolarizations. The color selective polarization modulator further comprises a retarder stack comprising one or more retarders.

The modulation state of polarization is an input polarization for which the transmitted state of polarization depends on the voltage applied to the modulator. The isotropic state of polarization is an input polarization for which the transmitted state of polarization is substantially independent of the voltage applied to the modulator. The retarder stack chromatically preconditions the light such that a first spectrum is placed in the modulation state of the modulator and a second complementary spectrum is placed in the isotropic state of the modulator. Thus, the modulator modulates the state of polarization of the first spectrum, but leaves the polarization of the complementary spectrum substantially unmodulated. In a preferred embodiment, the spectra are additive and subtractive primary spectra.

A color selective light modulator (CSLM), which can be used to form a color filter, is formed by combining a color selective polarization modulator, i.e., the retarder stack and the modulator, with a polarization analyzer. The polarization analyzer can be a second retarder stack in combination with a neutral polarizer, or it can be a color selective polarizer, such as a linear or circular color polarizing filter. Examples of these types of color selective polarizers are pleochroic dye polarizers, cholesteric liquid crystals, and cholesteric liquid crystal polymers.

In a preferred embodiment, the polarization analyzer comprises a second retarder stack and an analyzing polarizer positioned after the modulator. Such structures have the potential of providing complete transmission or complete blocking of an unmodulated spectrum, while permitting 100% luminance modulation of the complementary spectrum. The relationships between retarder stacks (i.e. number, orientation and retardation of each retarder film) significantly influences the overall behavior. Exemplary retarder stack relationships represent cooperative polarization transformations, yielding full luminance modulation of a well-defined spectral band, with zero modulation of the complementary spectral band.

In a CSLM containing two retarder stacks (i.e., the retarder stack in the color selective polarization modulator and the retarder stack in the polarization analyzer), the polarizers and retarder stacks can be oriented so that the color filter is either stack only (SO) neutral, i.e., transmits white light in the absence of the modulator, or SO filtered. In the SO neutral mode, the action of the modulator is to produce a filtered output, while the SO filtered mode uses the modulator to generate the neutral state. In either case, the voltage applied to the modulator effectively controls the "presence" of the compound retarder stack, i.e., the extent to which the two retarder stacks cooperate in filtering rather than canceling to produce a neutral output. If the modulator is capable of analog modulation, the voltage controlled presence of the compound retarder stack is also analog.

In addition to the retarder stacks, additional polarization transforming elements can be included between the input and exit polarizers in order to, for example, resolve compatibility issues between the polarizers and the type of modulator. For polarized light sources, no input polarizer is required. In CSLM embodiments having no internal polarizers, the CSLMs can be operated in split-path configurations having polarization separators/combiners for the input and exit polarizers. The CSLMs can also employ reflection-mode designs.

Unlike common paths displays and color sequencers of the prior art, a two-polarizer CSLM permits operation in an additive mode, rather than a subtractive mode, by eliminating the need to analyze the state of polarization after each stage. This eliminates the interaction of CSLM stages on a power basis. Inverting the spectra, such that additive primaries become subtractive primaries (i.e., white becomes black and vice-versa), yields important performance improvements. Specifically, the CSLM stages become independent in generating additive primaries, while a high density black state can be achieved. This is accomplished with little impact on the subtractive primaries and the white state.

The CSLM of the present invention preferably contains the active polarization modulating element between the retarder stacks, thus providing modulation between a filtered spectrum and a neutral spectrum. It is an object of this invention to utilize CSLMs to provide high throughput color filters with outputs arbitrarily selectable from the set of R, G, B, C, M, Y, W, and K (black). It is a further object of this invention to utilize CSLMs to produce multi-stage color filters and sequencers that contain no internal analyzing polarizers. It is yet a further object of this invention to utilize CSLMs to produce color filters with fixed color coordinates which do not rely upon accurate active polarization modulating element characteristics. It is also an object of this invention to integrate such filters with displays and digital cameras to yield high performance color generation, with or without neutral outputs.

It is a further object of the present invention to provide a common-path stacked-panel projector that is operated in an additive mode, rather than in subtractive mode. This unique option is enabled by the CSLMs of the present invention, which permit one to avoid any light blocking until after light passes through all three panels.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 is a table listing 24 preferred designs of the neutral/primary color filters/ switches of the present invention;

FIG. 14 is a table that lists CSLM designs with N=3 that have the required symmetry for implementing a reflection mode CSLM device;

FIG. 17 is a table showing parameters for 46 SO filtered CSLM designs, in accordance with the present invention;

FIG. 18 is a table showing parameters for 46 SO neutral CSLM designs, in accordance with the present invention;

FIG. 19 is a table showing parameters for 56 crossed polarizer CSLM designs, in accordance with the present invention;

FIG. 20 is a table showing parameters for 59 crossed polarizer CSLM designs, in accordance with the present invention;

FIG. 23 is a truth table for the CSLM color sequencers of FIGS. 22A and 22B;

FIGS. 25A, 25B and 25C are plots of additional measured cyan, magenta and yellow spectra that are also available with the RGB CSLM color sequencer of FIG. 22A;

FIG. 31 is a table that shows the effect of tuning the white state of different CSLM stages, in accordance with the present invention;

FIG. 38B is a schematic showing a split-path system having one pixelated stage on one path and two pixelated stages on another path, in accordance with the present invention;

FIG. 38C is a schematic showing another embodiment of a split-path display system, in accordance with the present invention;

FIGS. 41A–41E are schematics showing embodiments of display systems producing outputs having four components, in accordance with the present invention;

FIG. 45 is a table listing 18 examples of display types that can utilize the CSLMs of the present invention;

DETAILED DESCRIPTION OF PREFERRED EMBODIMENTS

Color selective polarization modulators are described in the present invention for use in color selective light modulators (CSLMs). CSLMs are devices that color selectively control the transmission of light using active or spatially patterned elements.

Figure 1:
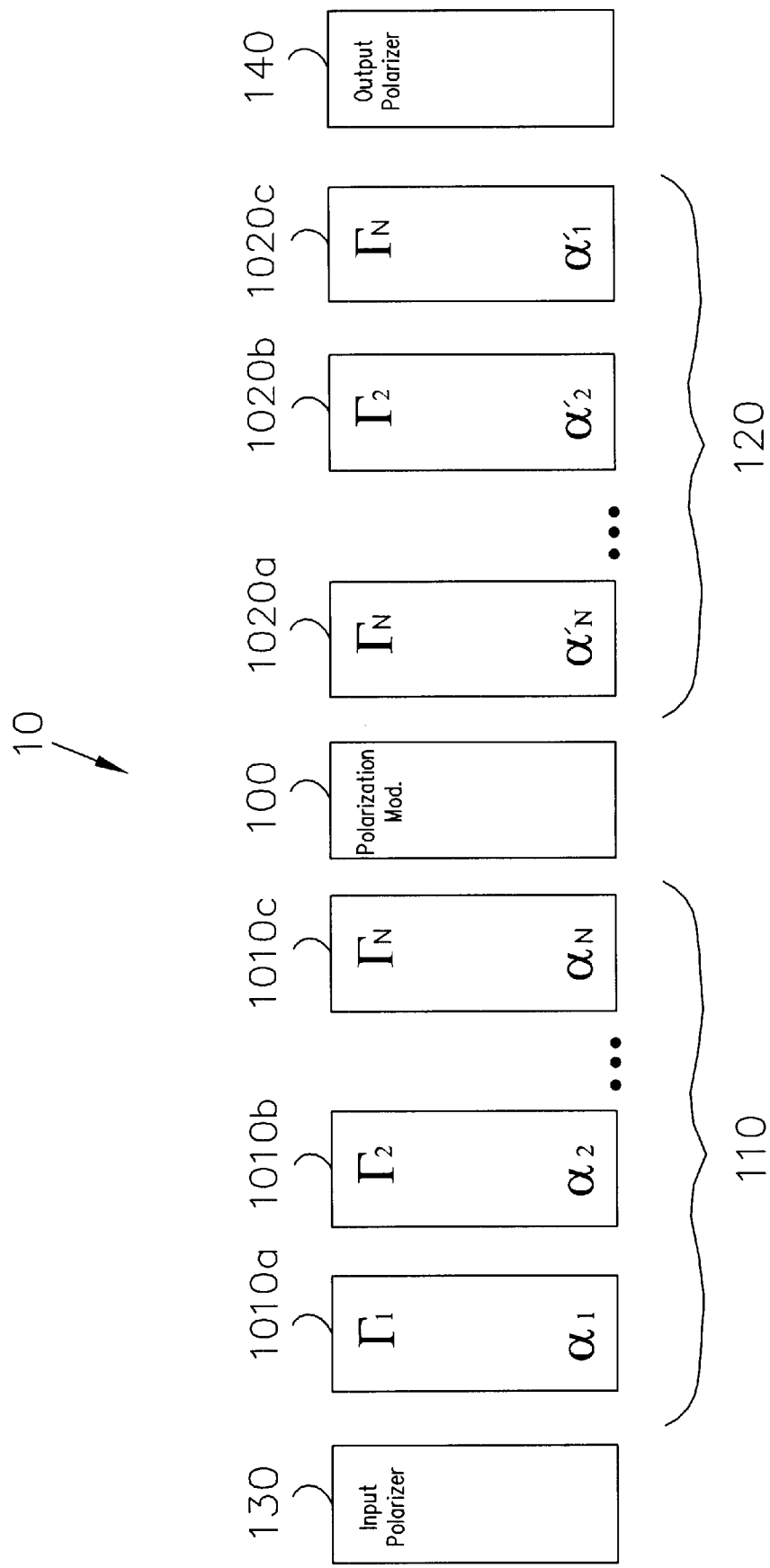
FIG. 1 is a schematic of a generalized color selective light modulator (CSLM), in accordance with the present invention.

A schematic of a generalized CSLM 10 used as a color filter is shown in FIG. 1. The CSLM color filter comprises an input polarizer 130, a first retarder stack 110, a second retarder stack 120, a polarization modulator 100 positioned between the retarder stacks 110 and 120, and an output polarizer 140. The first retarder stack 110 comprises a plurality of individual retarders 1010a, 1010b, ... 1010c having retardances $\Gamma_1$, $\Gamma_2$, ... $\Gamma_N$, respectively, and orientations $\alpha_1$, $\alpha_2$, ... $\alpha_N$, respectively. The second retarder stack 120 comprises a plurality of individual retarders 1020a, ... 1020b and 1020c having orientations $\alpha'_N$, ... $\alpha'_2$, $\alpha'_1$, respectively. It should be appreciated that, for illustrative purposes, each of the first and second retarder stacks 110 and 120 are shown with three individual retarders. It should be understood that the number of individual retarders included in each of the retarder stacks 110 and 120 can be less than or greater than three.

The color selective elements in the CSLMs are typically stacks of retarder films. However, they can also be thin twisted liquid crystal films. The retarder stack in the color selective polarization modulator and the retarder stack in the polarization analyzer, which are related in retardation values and orientations, are used to determine the spectral band over which the active element (polarization modulator) can modulate light transmission. The polarization modulator, which can be an active or a spatially patterned polarization modulator, is positioned between the retarder stacks for controlling the transmission of selected spectral bands. If an active modulator is used, the transmission of the selected bands are electronically and temporally controlled. If a spatially patterned modulator is used, the transmission of selected spectral bands are spatially controlled.

The CSLMs of the present invention are useful for common-path, split-path and hybrid color display systems, color sequencers, and for analog color generation in applications that include, but are not limited to, lighting, spectrometry, colorimetry, and multi-spectral imagery.

Definitions

A few definitions that are used to characterize the structures of the present invention and their behavior will now be provided. An additive primary color is one that is identifiable as a substantially saturated red (R), green (G) or blue (B) by a viewer with normal color vision. Conversely, colors that are desaturated RGB hues are termed pastels. Colors that are saturated but have other hues can be produced as admixtures of the additive primary colors, i.e., yellow or orange.

The term "subtractive primary color" refers to the absence of one additive primary color. These are known as cyan (C), magenta (M) and yellow (Y), and are the colors used in subtractive systems, i.e., printing systems. Unless otherwise stated, cyan is considered to be blue+green, magenta is considered to be blue+red, and yellow is considered to be green+red. Monochromatic yellow is referred to as true-yellow.

Colors are complementary when the sum of their power spectra gives a true white spectrum, i.e., cyan+red, magenta+green, or yellow+blue. By conservation of power, complementary colors can be generated, for instance, by rotating a neutral analyzing polarizer, following an arbitrary polarizer/retarder stack, through $\pi/2$.

A "filtered" spectrum is a spectrum that is chromatically altered upon transmission through the CSLM structure. The transmitted spectrum has a particular hue, and is significantly more saturated than a "neutral" spectrum, which is discussed below. Preferred filtered spectra are those that represent saturated colors, such as the additive primaries RGB, or the subtractive primaries CMY.

A "neutral" spectrum is one that is not chromatically altered by upon transmission through the CSLM structure. The transmitted neutral spectrum has coordinates that are substantially nearer the white point of the Commission International DE l'Eclairge diagram than a filtered spectrum. Examples include the white state or the black state of a filter.

An "Eigenpolarization" is a polarization state which is unchanged upon passage through a CSLM structure.

"Stack-Only" (SO) mode refers to the output of a CSLM structure when the polarization modulator is not present, or when the polarization modulator is in a state that is the electrooptic equivalent of "not present". The SO mode can be such that the two retarder stacks work cooperatively to transmit either a neutral spectrum or a filtered spectrum when they are positioned between neutral polarizers.

"Stack-Altered" (SA) Mode refers to the output of a CSLM structure when the polarization modulator element is used to effectively alter the "presence" of one retarder stack relative to the other retarder stack. The SA mode can be such that the two retarder stacks work cooperatively to generate either a neutral spectrum or a filtered spectrum when they are positioned between neutral polarizers.

The human eye has a wavelength-dependent sensitivity, being most sensitive to green light during normal daylight illumination conditions. Conversely, the eye is nearly insensitive to short wavelength blue, i.e., less than 400 nm, and long wavelength red light, i.e., greater than 700 nm.

The eye has three discrete photoreceptors that correspond to the three additive primaries. As such, the eye can be "tricked" into observing arbitrary colors using appropriate mixtures of the three additive primaries. This allows for the generation of full-color imagery using only three-color information. The additive primaries are separated by transition bands that are, in principle, not necessary for full color imagery These transition bands are true cyan, at a wavelength of approximately 500 nm, and true yellow, at a wavelength of approximately 585 nm. In many instances, the transition bands are rejected in order to enlarge the available color space.

The CSLM structures of the present invention preferably comprise two stacks of retarders, with an active polarization modulator or a spatially patterned polarization modulator between them. The polarization modulator can preferably be driven between two extreme states, preferably in an analog fashion. In a preferred embodiment, the modulator enables the SO mode in one extreme state, and enables the SA mode in the other extreme state. Because the two retarder stacks work cooperatively to generate a neutral spectrum or a filtered spectrum, the terms "partial stack" and "half stack" are sometimes used herein to refer to one of the retarder stacks. Accordingly, the terms "retarder stack", "partial stack" and "half stack" are used interchangeably herein to refer to one of the two retarder stacks on either side of the polarization modulator.

If a spatially patterned modulator is used between the two retarder stacks, the spatially patterned modulator is preferably patterned so that the SO mode is enabled when light passes through one portion of the patterned modulator, and the SA mode is enabled when light passes through another portion of the patterned modulator. In addition, one or more additional portions of the modulator may be patterned to enable additional intermediate modes, i.e., modes that lie in between the SO mode and the SA mode.

In the SA mode, the output observed between neutral polarizers is the result of the cooperative effects of the retarder stacks, in conjunction with the effect of the modulator. In effect, the modulator modifies the presence of one retarder stack relative to the other, thereby modifying the characteristics of the both retarder stacks together. The SA mode is associated with an extreme modification of the both retarder stacks relative to the SO output. However, it should be recognized that analog states can exist between the SO and SA modes. The above discussion applies to all the CSLM structures described herein.

Characteristics of the Polarization Modulator

The methodology for designing individual retarder stacks, as well as the relationships between retarder stacks, depends upon the characteristics of the polarization modulator (modulator) used in the CSLM. Modulators can include, but are not limited to, mechanical, electromechanical, liquid crystal, linear electrooptic effect, magneto-optic, and non-linear electrooptic effect devices. Modulators can be addressed electrically, optically, or using hybrid effects via media that generate photo currents.

Liquid crystal (LC) based modulators are preferred due to their low manufacturing costs, their scalability, their ability to impart large polarization transformations per unit interaction length, their ability to impart large modulation with low voltage/power, and other considerations. LC devices generally fall under the following categories: (1) Zero-Twist Nematic (ZTN) or Electrically Controlled Birefringence (ECB) devices; (2) Twisted Nematic Devices; and (3) In-Plane Switching Devices.

ZTN or ECB devices are a subset of LC devices in which the in-plane retardation is controlled by an electric field applied normal to the plane. ZTN or ECB devices include anti-parallel nematic devices, pi-cell or surface mode devices, vertically aligned nematic (VAN) devices, and hybrid aligned nematic (HAN) devices.

Anti-parallel nematic devices and pi-cell or surface mode devices have maximum retardation in the undriven state and are nearly isotropic in the driven state. High contrast is often obtained by adding external compensation in order to eliminate residual retardation in the driven state.

VAN devices are homeotropically aligned on both substrate surfaces. They are isotropic in the undriven state, with an increasing in-plane retardation with applied voltage. VAN devices have very little residual retardation and hence give high contrast with no external compensation.

HAN devices are homeotropically aligned on one substrate surface, and planar aligned on the other substrate surface.

A Twisted Nematic device is one in which the substrates are rubbed other than parallel or antiparallel. Twisted Nematic devices with a difference in rub angle of approximately 45°–90° are typically called "TN" devices, while devices with a difference in rub angle of approximately 240°–270° are typically called "STN" super-twist nematic devices. TN devices are typically addressed using transmissive active matrix thin film-transistor (FT) panels. STN devices can be highly multiplexed, permitting passive matrix addressing schemes. Small twist angles (40°–60°) are often used for mixed-mode reflective displays.

An In-Plane Switching device refers to any switch in which the molecular directors rotate substantially in the substrate plane. Examples include chiral smectic devices, e.g., ferroelectric LC or electroclinic LC devices, surface-stabilized chiral smectic C, volume-stabilized smectic C, distorted helix ferroelectric, flexoelectric, achiral smectic, and antiferroelectric LC devices. There are also In-Plane Switching nematic devices which are driven by lateral electrodes. That is, if lateral electrodes on one of the device substrates are used rather than transparent electrodes deposited on opposing device substrates, nematic liquid crystals can operate as rotatable retarders with fixed retardance.

Compound retarders utilizing a liquid crystal active retarder in combination with one or more passive retarders can be used as the polarization modulator in the CSLM. Particularly useful are achromatic compound retarders, as described in U.S. Pat. No. 5,658,490, and achromatic polarization rotators, as described in U.S. Pat. No. 5,870,159, both of which are incorporated by reference in their entirety herein.

The achromatic compound retarder comprises a liquid crystal rotatable half-wave retarder flanked by passive retarders. The orientations and retardances of the passive retarders are such that the compound retarder is achromatic. The achromatic polarization rotator comprises a liquid crystal rotatable half-wave retarder in combination with a passive half-wave retarder. In the optically compensated bend (OCB) cell, a pi-cell is combined with a retarder film that has a z-direction retardance to improve field-of-view. STN displays frequently use one or more retarder films to suppress birefringence color that is otherwise observed. Both TN and STN displays use retarder films to improve contrast ratio and to improve the view angle.

Typically, the behavior of LC devices is interferometric in nature. Specifically, there are two orthogonally polarized eigenpolarizations with a voltage-controlled phase shift between them. The phase difference introduced between waves, i.e., the retardation, results in a change in the state of polarization. ZTN devices are very simple, because the eigenpolarizations are well defined and are both independent of voltage and wavelength. Though twisted nematic devices are more complex, they also have eigenpolarizations. The specific CSLM designs presented herein are optimized for ZTN modulators, though it should be appreciated that the retarder stacks in the CSLMs of the present invention can be designed and generated for use with other types of modulators, such as twisted nematic devices.

Optically active devices are another group of electro-optic modulators that can be used as polarization modulators in the CSLMs of the present invention. Optically active devices are polarization rotators, with the polarization rotation being independent of the polarization orientation of the incident light. The isotropic states are left-handed and right-handed circular polarizations. The optically active modulator performs voltage-controlled phase shifting of the circular polarizations, which does not affect the circular state of polarization. However, for linear states, which can be decomposed into equal amplitudes of the left-handed and right-handed circular polarizations, the transmitted polarization is linear and the orientation is determined by the phase shift between the circular states. Thus, optically active modulators act as polarization rotators for linear states, with the modulation state of polarization being any linear state.

Chiral Smectic Liquid Crystal (CSLC) retarders reflect polarization about an axis rather than rotating the polarization. However, they are like optically active devices in their isotropic and modulation states of polarization. In contrast to zero-twist nematics, CSLCs rotate in-plane, having a fixed retardance and an optic axis orientation that is determined by the applied voltage. For a half-wave retardance, CSLC retarders have circular isotropic states and linear modulation states. The voltage-controlled orientation of the optic axis in the CSLC retarder determines the transmitted orientation of linear light.

There are also electro-optic modulators that have intermediate modulation and isotropic states, such as twisted nematic devices. The polarization transformation of a twisted nematic device is most easily seen on the Poincare sphere W. E. Bigelow and R. A. Kashnow). The State of Polarization follows a cone rolling on the equator, with a base radius that depends, in part, on wavelength. As the pitch (which is four times the cell gap for 90-degree TN) and birefringence become large, the base of the cone becomes small and almost independent of wavelength, and the device appears optically active, i.e., it exhibits circular Eigenpolarizations. For lower pitch values, a linear state introduced along the rub direction, i.e., normal direction, performs excursions from the equator. These excursions represent periodic introduction of ellipticity coupled with the dominant rotation. Light with the appropriate ellipticity introduced along the rub direction maintains that ellipticity during rotation. This wavelength-dependent elliptical state experiences a pure rotation. This construction can also be used to describe the transformation of an STN device in the undriven state.

It was recently shown experimentally that a twisted nematic device is an elliptical retarder with elliptical Eigenpolarization states. Like the linear variable retarder, the phase shift is substantially determined by one particular helicity of polarization state. This is described in J. L. Pezzaniti and R. A. Chipman, "Phase-only modulation of a twisted nematic liquid-crystal TV by use of the eigenpolarization states," Opt. Lett. 18, 1567–1569 (1993).

To achieve compatibility between the retarder stacks and the modulator, additional passive retarders can be included in the CSLM. For example, if the retarder stacks prepare the light in two linear polarizations separated by 45°, these polarization states are the modulation and isotropic states of polarization for a modulator that comprises a variable retarder with fixed orientation. A passive quarter-wave retarder oriented parallel to one of the polarization states converts the two linear polarizations into one linear and one circular polarization, which are the modulation and isotropic states of polarization for a modulator that comprises a rotatable retarder with fixed retardance, such as a CSLC modulator. Thus, if the CSLM includes a passive quarter-wave retarder on either side of a CSLC modulator, retarder stacks designed for a variable retarder modulator can instead be used with a rotatable retarder modulator.

General Considerations

Without using specific retarder stack designs, an analysis of filter designs can be performed subject to the following assumptions: (1) it is desirable to generate either black or white in the neutral state of a color filter/switch; (2) it is desirable to generate "stable" primary colors (nominally from the set RGBCMY) in the filtered state of a color filter/switch. That is, it is desirable for the chrominance of the polarization modulator, e.g., an LC cell, to have little influence on the filter color coordinate; (3) the CSLM is designed so that the modulator optically "vanishes" in the SO mode throughout the visible spectrum; and (4) the polarization modulator exhibits some chrominance in the SA mode, such that it cannot adequately maintain a constant polarization transformation throughout approximately two-thirds of the visible spectrum. With the above assumptions, various general color filter configurations can be analyzed. It should be noted that there may be applications for which the above assumptions are not relevant.

FIG. 2 is a table listing 24 preferred designs of CSLM-based neutral/primary color filters/ switches, based on a choice between six additive and subtractive primary filtered states, white or black neutral states, and stack-only (SO) or stack-altered (SA) states. In general, the SO output is of higher quality because it is generally more practical to achieve a neutral (achromatic) isotropic state than an achromatic retardation (or rotation) state when using a nematic LC device as the polarization modulator. While it is possible to fabricate achromatic LC devices for the SA mode, e.g., thick TN structures, we assume that the SO state is superior to the SA state.

If an LC cell is used as the polarization modulator, one of the most significant differentiators when comparing color filter/switch designs is the impact of the LC cell chrominance on the quality of the color filter/switch output. The SO mode is preferably selected to be the output that can least afford to suffer the negative effects of cell chrominance. The ultimate decision regarding the SO and SA modes is preferably based on a global view of overall component performance, which may include multiple color filter/switch stages and multiple polarizers. The priorities are derived from the specifications for a particular application. These specifications include, but are not limited to, the number of outputs, the location of center wavelengths, the bandpass profile, and the throughput requirement for each wavelength band. For example, a color sequencer for a digital camera may have optimum spectra that are quite poor for display applications. Other practical issues may also have to be addressed, including the number of allowed polarizers, drive voltage limitations, characteristics of lamp spectra, and field-of-view requirements. There is clearly no "best-design" that will cover all applications. However, a few examples will be described below that illustrate how the present invention can be adapted for different applications.

Most applications utilize multi-stage color filters, with each color filter stage implemented with a CSLM that preferably comprises a pair of retarder stacks with a central LC cell as the polarization modulator. In a multi-stage design, it is preferable for the color filter stages (CSLMs) to function independent of one another, so that they can be independently designed and be completely modular. This simplifies the design process, particularly in multi-stage configurations. For example, the retardance of a retarder stack in a one of the color filter stages may be shifted to accommodate the needs of one application, with no impact on the outputs of the remaining color filter stages.

In the interest of maintaining the independence of color filter stages, and obtaining a high density black state or an extremely neutral white state, the SO mode of a multistage color filter preferably corresponds to the neutral output of each color filter stage. In some instances, however, the designer of the color filter stages does not have this option. For example, in order to have independent color filter stages, each color filter stage must generate an acceptable filtered state, i.e., color coordinate, with no assistance from other color filter stages. Even when an additive primary color is obtained subtractively from two color filter stages, a lack of redundancy in color blocking remains. In other words, an acceptable additive primary color coordinate cannot be achieved unless each color filter stage can generate a high quality subtractive primary color. As a result, priority is frequently given to obtaining acceptable filtered states over ideal neutral states.

There are design schemes that provide a high quality SA filtered state, using chromatic polarization modulators, thereby preserving the SO mode for the neutral state. In these design schemes, the LC cell (polarization modulator) need only switch one additive primary color. Examples of this include R/K (red/black), G/K and B/K, as well as the complements C/W, M/W and Y/W. Assuming that the LC cell is more chromatic in the SA mode than in the SO mode, the density of the black state (or flatness of the white state) is better using SO black (white). Typically, the primary color quality is indistinguishable for SO or SA filtered modes. Stacks of these types of color filter stages (CSLMs) are desirable for multi-stage color filters.

When the LC cell must switch between two or more additive primary colors, the situation changes. SA additive primary with SO white suffers significant degradation in the filtered color coordinate. This is particularly so for SA green, because the polarization modulator must rotate the polarization of both blue and red in order to effectively block them. For an active polarization modulator, this requires an LC cell that is achromatic throughout the visible spectrum. Thus, the SO mode is devoted to the filtered state in order to preserve the color coordinate. The consequence of assigning the SO mode to the filtered state is that the white state can have significant short-wavelength blue and long-wavelength red loss. The white state actually appears as if the retarder stacks were removed, leaving only the LC cell oriented at 45-degrees. The retarder stacks, in many cases, improve white transmission, but never appear to degrade transmission when compared to the LC cell alone.

Requirements of CSLM Structures

It is assumed that at least partially polarized light is input to the CSLM. While unpolarized light can be introduced, it should be understood that randomly polarized light is not manipulated by the CSLM, and is passed through the CSLM unmodulated. Therefore, we consider the action of the CSLM on the polarized component of the input light. Furthermore, it is assumed that the polarized component of the input light is neutrally polarized over a particular operating band. A "white" state is thus defined as an output transmission that is substantially neutral throughout this particular operating band.

An optimum white state is defined as a transmission function with unity transmission throughout the operating spectral band. For visible operation, the operating spectral band is 400–700 nm. Conversely, a filtered state is one in which the transmission function contains one or more maximum transmission points (ideally zero loss), and one or more minimum transmission points (ideally zero transmission) within the operating band.

(A) Neutral Output Requirements

The requirements placed on a single color filter stage (CSLM) for achieving a neutral state will now be discussed. The discussion will focus, in particular, on a maximum throughput white state, with the understanding that such a design can also represent a black state by a suitable rotation of the analyzing polarizer.

Polarized input light can be generated directly, e.g., from a laser, or can be generated by placing a passive polarizer between the light source and the CSLM. While many types of passive polarizers exist, the most common passive polarizers generate linear polarization states. Therefore, the discussion and examples presented concentrate on the special case of linearly polarized input light. However, it should be understood that other neutral light inputs can be generated directly or indirectly using an elliptical polarizer, or an achromatic retarder structure in combination with a neutral linear polarizer.

The CSLM comprises a retarder structure that contains first and second retarder stacks on either side of a polarization modulator (active or spatially patterned) and an analyzing neutral polarizer (analyzer). The term "neutral" signifies that the polarizer provides substantially constant transmission and polarizing efficiency throughout the operating band. The operating band contains at least one spectral portion that is substantially modulated by the modulator and at least one spectral portion that is substantially unmodulated by the modulator.

If the input light polarization differs from the polarization that is transmitted by the polarization analyzer, an efficient white state requires that the retarder structure perform a neutral polarization transformation. This transformation can be accomplished in either the SO or SA modes. For the SO mode, the retarder stacks cooperate to produce a neutral transformation that transforms the input light polarization to the polarization transmitted by the analyzing polarizer. The modulator, e.g., the LC cell, thus switches the CSLM structure to one that is substantially more chromatic, thereby accomplishing the desired filtering operation.

For the SA mode, a neutral transformation is accomplished via the action of the retarder stacks with the modulator, or in some cases by the modulator alone. An example of this is the specific case of a linear input polarization state and a linear analyzing polarizer. In the neutral state, using either SO or SA modes, the modulator must rotate the polarization by $\theta$ for a highly efficient white state, or by $\theta+\pi/2$ for a black state, where $\theta$ is the orientation of the analyzing (exit) polarizer. Because the modulator performs a relatively neutral operation, it is attractive to consider an arrangement in which the modulator is largely responsible for the characteristics of the neutral state. While the modulator may not be particularly achromatic, an analog modulator may be tuned to position the peak transmission of the neutral spectrum to maximize performance. For instance, a multi-stage color filter may maximize throughput by tuning the peak transmission of the color filter stages in the neutral state to coincide with the peak transmission of a color filter stage in the filtered state.

In the specific case where the analyzing polarizer analyzes the input state of polarization, e.g., x-oriented input polarization and x-oriented linear analyzing polarizer, an optimum white state is obtained when the retarder stack structure provides a zero net polarization transformation. This is equivalent to requiring that the input/output polarization be an eigenpolarization of the retarder stack. In this case, a preferred subset of retarder stack designs is one in which the input/output polarization coincides with an eigenpolarization of the retarder structure for one particular state of the LC device. This includes cases where additional retarder stacks are used to produce a neutral polarization state before the chromatic retarder stack, and analyze the neutral polarization state after the chromatic retarder stack, e.g., a Pancharatnam achromatic retarder preceding and following a linear polarizer. However, such solutions are more complex because they require additional retarders.

In the case in which matched input/output polarizations produce a white state in the SO mode, the first retarder stack performs a chromatic polarization transformation that must be fully compensated by the second retarder stack within the operating band. This simply requires that the input polarization correspond to an eigenpolarization of the combined retarder stack. For example, a zero-oriented linear polarization state with an input retarder stack having individual retarder orientations of −7.5°, 52.5° and 67.5° can be followed by the second retarder stack having individual retarders oriented at 67.5°, 52.5° and −7.5°, yielding a neutral white state. Note that this particular structure is symmetric in both retardation and orientation, thus enabling true reflection mode color filters/switches. It should be further noted that this retarder stack structure requires a specific input State of Polarization, and does not perform identically for other input polarization orientations, e.g., 45° linear or circular input polarizations.

A "crossed-stack" arrangement provides a family of solutions for SO white that does not depend upon a specific input/output polarization. When two retarders have equal retardation and have crossed orientations, the resulting Jones matrix is the identity matrix. This concept can be extended by adding additional retarders on either side, with each additional pair having the same retardation and crossed orientations. For any number of retarders conforming to this scheme, there is zero net polarization transformation because the Jones matrices representing each retarder stack are inverses of one another. Because the retarder structure appears isotropic, an optimum white state is obtained for any matched input/output polarization. Optimum stack designs for filtered outputs in the SA mode depend on behavior of the modulator and the chromatic polarization states that are optimally presented by the input retarder stack.

Another case is that in which matched input/output polarizations produce a white state in the SA mode. In this case, the input polarization corresponds to an eigenpolarization of a CSLM structure that now includes both the retarder stacks and the modulator. For example, a zero-oriented linear polarization state with an input retarder stack having individual retarders oriented at −7.5°, 52.5° and −67.5°, can be followed by a second retarder stack having individual retarders oriented at −67.5°, −52.5° and 7.5°. This yields a white state with a ZTN half-wave plate (modulator) oriented parallel to the input. The structure thus appears to have the eigenpolarization of the symmetric structure described above.

In a second example, the modulator can be used to create the appearance of crossed retarder stacks. Using the above-described input polarization, input retarder stack, and ZTN half-wave plate orientation, the second retarder stack has individual retarders oriented at 22.5°, 37.5° and −82.5°.

(B) Filtered Output Requirements

The demands placed on the color filter structure from a transmission spectrum perspective will now be discussed. As discussed previously, the operating band is defined as having at least one spectral portion in which the polarization is substantially unmodulated by the modulator, e.g., LC device, and at least one spectral portion in which the polarization is substantially modulated by the modulator. In a preferred embodiment, the polarization modulation results in a transmission modulation by the suitable selection of an analyzing polarizer. Furthermore, the modulated spectral portion is preferably modulated between substantially full transmission and substantially zero transmission. This requires that the modulator be capable of modulating between orthogonal polarization states within the modulated portion of the spectrum. The unmodulated portion of the spectrum must retain its polarization state independent of the switching state of the modulator. Thus, the transmission of the unmodulated portion of the spectrum must remain substantially fixed (typically full transmission or zero transmission) for any switching state.

The above design considerations are considered with respect to a CSLM filter structure comprising a modulator positioned between two retarder stacks. The filtered portion of the spectrum is fully modulated between orthogonal states and the unmodulated spectral portion does not "see" the modulator (i.e., is not modulated by the modulator) in a way that is significant to its transmission through the CSLM structure. The polarization of the filtered portion of the spectrum must be properly configured for modulation as in a conventional neutral shutter. The unmodulated portion of the spectrum has a polarization that corresponds to a zero-modulation state of the modulator, i.e., a modulator eigenpolarization.

The modulator, whether single-layer or compound (i.e., multi-layers of active and/or passive elements), twisted or zero-twist, is preferably a device that is interferometric in behavior. That is, there are two orthogonal eigenpolarizations, each with an optically distinct path length. It is assumed that the path length between these waves can be controlled. It is the path length difference between waves, that project onto each eigenpolarization, that influences the state of polarization of light transmitted through the modulator. Preferred modulators for the CSLM structures of the present invention are those that have voltage and wavelength stable eigenpolarizations, such as zero-twist nematics (ZTN). Conversely, twisted nematic devices have eigenpolarizations that are relatively sensitive to wavelength and voltage.

While many of the structures of the present invention are based on a wavelength effect that is stable over the modulated band, the chrominance of the modulator can, in some instances, be used to enhance the color selection technique. For example, the retarder stacks can open multiple spectral "windows" over which a modulator can modulate. A chromatic modulator can then be used to select which of the spectral bands is transmitted and which is blocked. However, the performance of most of the structures of the present invention is enhanced by suppressing modulator chrominance.

In view of the above discussion, there are exemplary input polarizations for achieving minimum modulation and for maximum modulation potential. Minimum modulation polarizations have projections only along a single eigenpolarization. For a ZTN device, for instance, the minimum modulation polarizations are the ordinary and extraordinary waves. Maximum modulation polarizations correspond to polarization states with substantially equal projections along the eigenpolarizations. For a ZTN device, this is the family of polarizations with arbitrary ellipticity, but with an ellipse axis oriented at $\pm\pi/4$ to the rub direction. Thus, an input retarder stack can generate, for example, linear $\pm\pi/4$ polarizations or circular polarizations in a particular band, and the modulator can provide full modulation capability for each polarization state.

Evaluating the quality of the filtered state is somewhat complex because no single design is "best" for all applications and output colors. Design considerations, such as the width of the passband relative to the stop-band, and the transition slope, all depend upon the specific color being filtered and the application requirements.

Preferred spectra for display applications have a frequency domain duty ratio appropriate to the desired spectrum, and have a spectral profile that is rectangular, rather than sinusoidal or some other spectral profile. There may be additional physiological or other reasons why other spectral profiles are preferred. In general, however, the filter preferably has a steep transition slope, with a relatively flat transmission band and a relatively flat blocking band. Relatively flat bands can be achieved by having a series of distributed high-contrast nulls and peaks in the spectrum. Near-ideal transmission spectra can be produced by increasing the number of retarders in the retarder stacks. In practice, acceptable transition slopes and side-lobe amplitudes and locations must be carefully chosen to optimize saturation with a limited number of components.

The criteria for evaluating color filter designs is based on considerations of saturation, hue, and throughput. The saturation and hue can be evaluated using the CE chromaticity diagram. The quality of color generated by a particular filter output can be characterized by calculating a series of overlap integrals, including the transmission function for a specific filter state, the power spectrum of the source, and the CE color matching functions.

Saturated primary colors are generated by maximizing the ratio between the light source power transmitted in the desired primary band to the light source power transmitted outside of the primary band. The filter design can be matched to the light source characteristics to make the optimization very specific. For example, true white sources, such as a 6000 K black body, place greater demands on filter performance than distributed light sources, such as a CRT phosphor or a flourescent backlight. The spectral positions of nulls in the blocking band depend upon the retardance of the optical components. It is advantageous to strategically place nulls at out-of-band power spectral maxima of the light source. Similarly, it is advantageous to place side-lobe maxima away from out-of-band power spectral maxima. Passive filters can be inserted to reject bands that lie outside of the primary color bands to increase saturation.

(C) Retarder Stack Design

The polarization transformation accomplished by each retarder stack is arbitrary, being determined by the retardation and orientation of each retarder film. However, constraints can be placed on retarder stack designs in order to obtain particular results. For instance, when a zero-twist nematic LCD is used as the polarization modulator, the polarization of the center wavelength can be constrained to be a $\pm\pi/4$-oriented linear polarization exiting the first retarder stack. Consider a retarder stack that is comprised of equal retardation elements, with each retardation element providing a half-wave retardance, of arbitrary order, at the center wavelength. The following equation must be satisfied:

$$\alpha_N - \alpha_{N-1} \alpha_{N-2} \ldots \alpha_2 \pm \alpha_1 \pi/8 + m\pi/4, \quad (1)$$

where m is an integer, N is the number of retarder elements, and the final sign is determined by whether N is odd or even.

There are also designs in which the peak modulated wavelength is not a $\pm\pi/4$-oriented linear state after the first retarder stack. Consider a red color filter that conforms to a quasi folded Solc design. The retarder stack is made up of polycarbonate retarders which are full-wave at 450 nm. In this case, with N=3, the rocking angle should be 7.5° for a π/4 rotation angle. However, the red color filter design uses a significantly larger 120 rocking angle, giving a 72° rotation angle. This rotation angle corresponds to an 807 nm half-wave wavelength. Not surprisingly, the efficiency is poor for this wavelength, though it lies well beyond the visible. Nevertheless, the efficiency is high at the much shorter 668 nm wavelength, where the retardance is significantly larger than half-wave. In this particular case, the larger rocking angle compensates for the loss in rotation efficiency at the shorter wavelength, yielding the desired intermediate polarization at 668 nm. Full red transmission is possible because the retarder stack generates a $\pm\pi/4$-oriented elliptical state.

(D) Retarder Stack Relationships

In U.S. Pat. No. 5,822,021, which is herein incorporated by reference in its entirety, structures were disclosed that generate an achromatic white state or black state by producing an identity Jones matrix between parallel polarizers for the white state, or crossed polarizers for the black state. For an arbitrary input retarder stack, the inverse retarder stack is produced by reversing the order of the individual retarders, and rotating each individual retarder $\pi/2$ from the corresponding individual retarder in the input retarder stack. The transmission is unity for all wavelengths, assuming lossless components and assuming that the modulator between the crossed retarder stacks is made to "vanish." In the crossed retarder stack arrangement, the white state quality is insured regardless of the modulator orientation or the electrooptic effect, provided the modulator can be made to effectively vanish. Thus, the filtered state can be designed without having to consider the impact on the white state quality. One result of such independent design characteristics is that SO neutral configurations can be readily adapted into multiple stage filter designs.

Part of the present invention is the discovery that, by orienting a zero-twist nematic (ZTN) LC modulator at 0 or $\pi/2$ between crossed retarder stacks, many useful filtering operations can be obtained. Assuming that the input retarder stack has individual retarders oriented at $\alpha_1, \alpha_2, \ldots \alpha_N$, the second retarder stack has individual retarders oriented at $\pi/2+\alpha_N, \ldots \pi/2+\alpha_2, \pi/2+\alpha_1$. Assuming that the ZTN LC modulator is a half-wave retarder over the modulated bandwidth, the ZTN LC modulator, in the SA mode, effectively switches the angle of each individual retarder in the second retarder stack to $\pi/2-\alpha_N, \ldots \pi/2-\alpha_2, \pi/2-\alpha_1$.

Accordingly, the states are inverted by simply giving the individual retarders in the second retarder stack the effective orientation produced in the SA mode with crossed retarder stacks. This produces a SA white state, subject to the effects of the LC modulator chrominance on white-state transmission. Such SO filtered configurations are valuable when the effects of the LC modulator chrominance on the quality of a filtered state are intolerable.

In addition, the SA white state quality is substantially determined by the LC modulator chrominance alone and, as such, can be tuned to provide maximum transmission at an arbitrary wavelength. This is important for providing high throughput in multi-stage SA white filters. The effect of the retarder stack on the white state, if any effects are observed at all, is to increase the transmission. The retarder stack has never been found to degrade the transmission of the white state.

Designs in which the SA white states are compromised by the LC modulator chrominance alone are generally preferred over designs with SO white outputs with similar chrominance. SO white output designs refer to designs that use the retarder stacks to produce a quasi-neutral transformation to yield a white state. The SA white designs are preferred in multi-stage filters because the white state can be tuned to maximize throughput. In contrast, the SO white state has a fixed chrominance that represents a loss of throughput.

Examples of CSLM devices that represent a range of design options for modulating between neutral and filtered transmission spectra will now be discussed. All of the CSLM devices discussed use ZTN LC devices for the polarization modulator. However, different options for the modulator orientation, retarder stack interactions, and polarizer orientations will also be discussed.

Embodiment 1: SO White, 0°-Oriented ZTN LC Modulator, Parallel Polarizer

Figure 3:
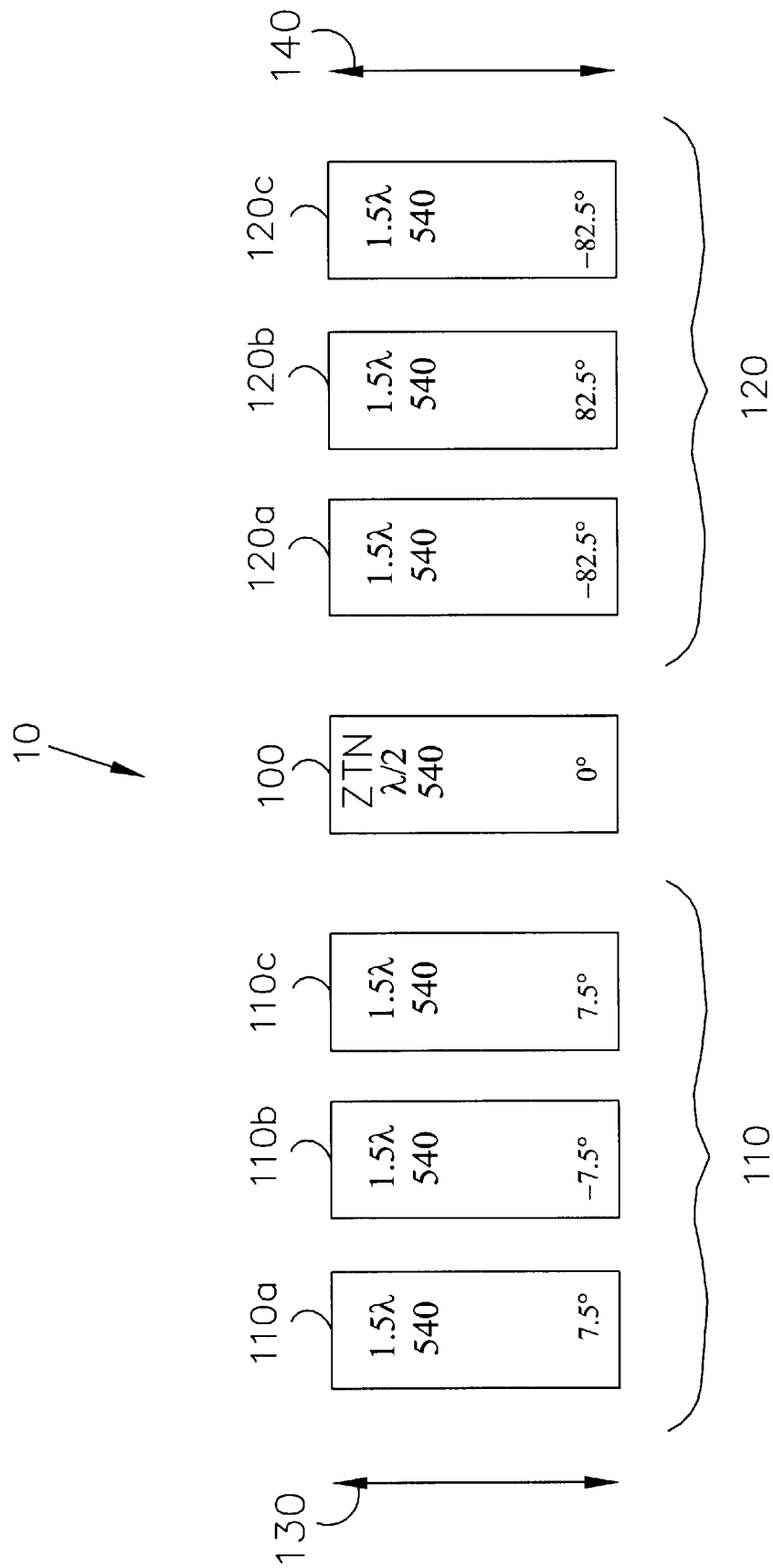
FIG. 3 shows a first embodiment of the color selective light modulators (CSLMs) of the present invention.

One embodiment of the CSLMs of the present invention comprises crossed retarder stacks and parallel polarizers, and gives a substantially ideal SO white output. The CSLM structure 10 is shown in FIG. 3. The CSLM structure 10 comprises a ZTN LC modulator 100, a first retarder stack 110 and a second retarder stack 120. The ZTN LC modulator 100 and the retarder stacks 110 and 120 are positioned between input polarizer 130 and output polarizer 140. The orientation of the input polarizer 130 is parallel to the orientation of the output polarizer 140. The ZTN LC modulator 100 is oriented parallel or perpendicular to the input polarizer 130, and provides a half-wave of retardance at the center wavelength of the modulated band. In the SA mode, the half-wave ZTN LC modulator 100 reflects the input polarization about the input polarization axis, thereby changing the apparent orientation of one retarder stack 110 relative to the other retarder stack 120.

The crossed-stack CSLM shown in FIG. 3 is a magenta/white color filter that uses three individual retarders, preferably retarder films, in each retarder stack and a rocking angle of 7.5°. Specifically, the first retarder stack 110 comprises a first retarder film 100a oriented at 7.5° with respect to the input polarizer 130, second retarder film 110b oriented at an angle of −7.5° with respect to the input polarizer 130 and retarder film 110c oriented at an angle of 7.5° with respect to the input polarizer 130. Retarder stack 120 comprises first, second and third retarder films 120a, 120b and 120c oriented at angles of −82.5°, 82.5° and −82.5°, respectively, with respect to the input polarizer 130.

All of the individual retarders in the first and second retarder stacks 110 and 120 are 1.5-wave retarders in the green (540 nm), giving a π/4 polarization rotation (half-wave retardance) for green light. Note that this color filter design satisfies the generating function discussed above, so that 540 nm light is linear π/4 oriented after the first retarder stack 110. This makes green light fully available for modulation by the 0-oriented ZTN LC modulator. Both blue and red light remain oriented along the polarization axis of the input polarizer 130, which coincides with an eigenpolarization of the ZTN LC modulator 100. Therefore, there is no mechanism for the ZTN LC modulator 100 to modulate blue/red polarization, independent of any LC retardation. The transition bands between blue/green and green/red are steep, resulting in a square notch in the filtered state. The spectrum is characterized by three maxima in each passband (blue/red), and two nulls in the stop band (green). The amplitude of the side lobes between the peaks/nulls is approximately 1%.

Because only one additive primary band is switched by the ZTN LC modulator, the effects of modulator chrominance on the SA spectrum are almost undetectable. The white spectrum is substantially ideal because the first and second retarder stacks 110 and 120 are crossed.

Figure 4:
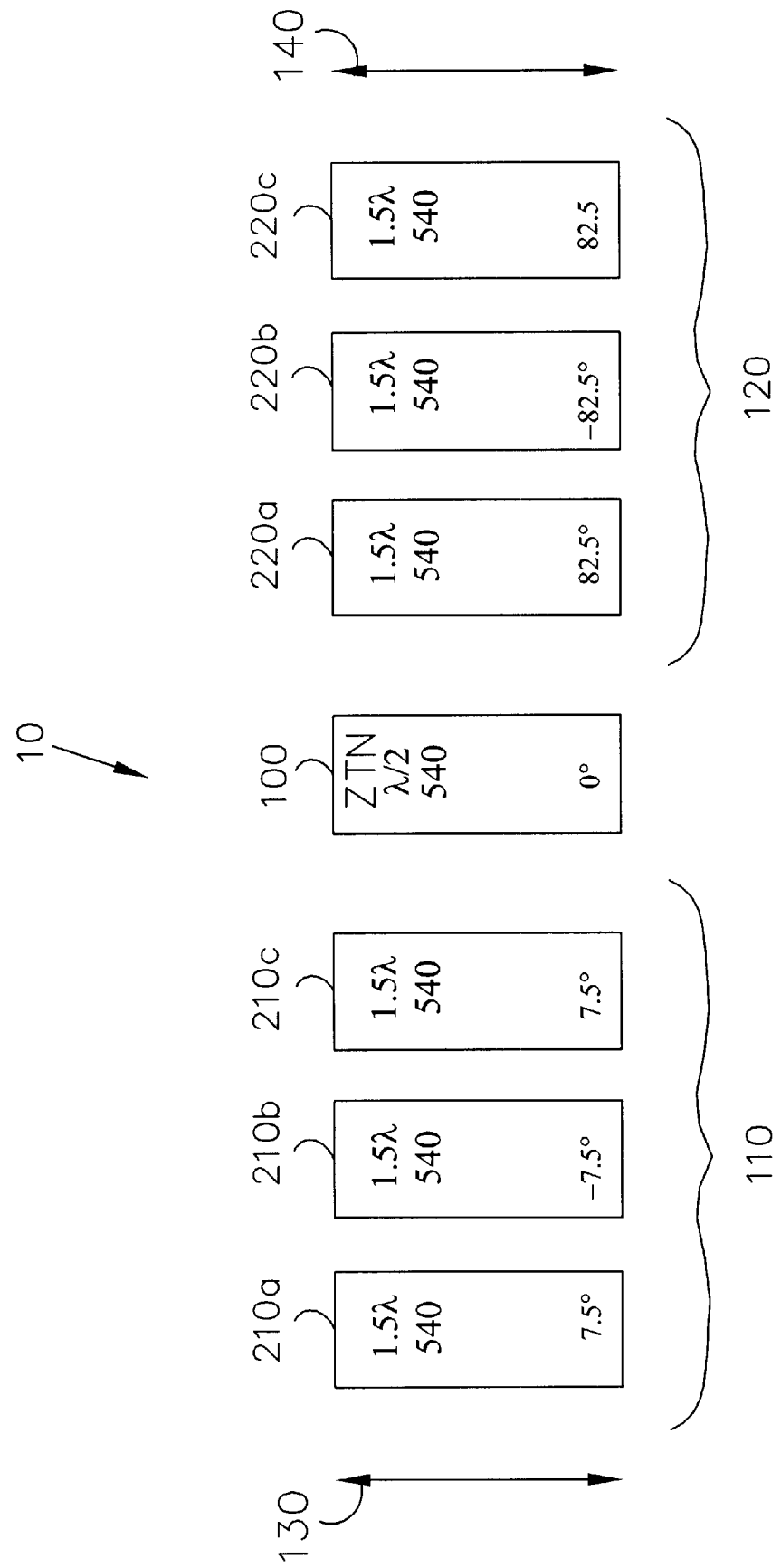
FIG. 4 shows a second embodiment of the CSLMs of the present invention.

Embodiment 2: SA Crossed Stack, 0°-Oriented ZTN LC Modulator, Parallel Polarizer FIG. 4 shows a magenta/white (M/W) color filter similar to the color filter shown in FIG. 3, except that the color filter of FIG. 4 transmits a white output in the SA mode. Like the color filter shown in FIG. 3, the ZTN LC modulator 100 is oriented parallel or perpendicular (π/2) to the input polarizer 130, so that the modulator 100 will modulate 45° polarized light and pass light that is oriented along the polarization axis of the input polarizer 130 unchanged.

The first retarder stack 110 comprises individual retarder films 210a, 210b and 210c oriented at 7.5°, −7.5°, and 7.5°, respectively, with respect to the input polarizer 130. The second retarder stack 120 comprises individual retarder films 220a, 220b and 220c oriented at 82.5°, −82.5° and 82.5°, respectively, with respect to the input polarizer 130. The individual retarder films in the first and second retarder stacks 110 and 120 are 1.5-wave retarders in the green (540 nanometers). Accordingly, the first and second retarder stacks 110 and 120 each give a π/4 polarization rotation half-wave retardance) for green light. The exit polarizer 140 is oriented with its polarization axis parallel to the polarization axis of the input polarizer 130. Accordingly, the light output is modulated between a magenta state and a white state.

For orientations of the ZTN LC modulator 100 other than 0 or π/2, designs can be generated for SA white states by considering the effective input to the second retarder stack 120. For example, the orientation of the second retarder stack 120 and the exit polarizer 140 can be selected to provide effectively crossed retarder stacks and parallel polarizers. This white state is substantially ideal insofar as the modulator 100 is achromatic over the entire modulated band.

A modulator with orientation $\alpha_{LC}$ produces an effective input polarization of $2\alpha_{LC}$, with an effective input retarder stack 110 with orientations $2\alpha_{LC}-\alpha_1, 2\alpha_{LC}-\alpha_2, 2\alpha_{LC}-,\alpha_N$. Thus, an effective crossed retarder stack white output can be generated by orienting the exit polarizer 140 at $2\alpha_{LC}$ and the second retarder stack 120 at $\pi/2+2\alpha_{LC}-\alpha_N, \ldots \pi/2+^2\alpha_{LC}-a_2, \pi/2+2\alpha_{LC}-\alpha_1$.

Figure 5:
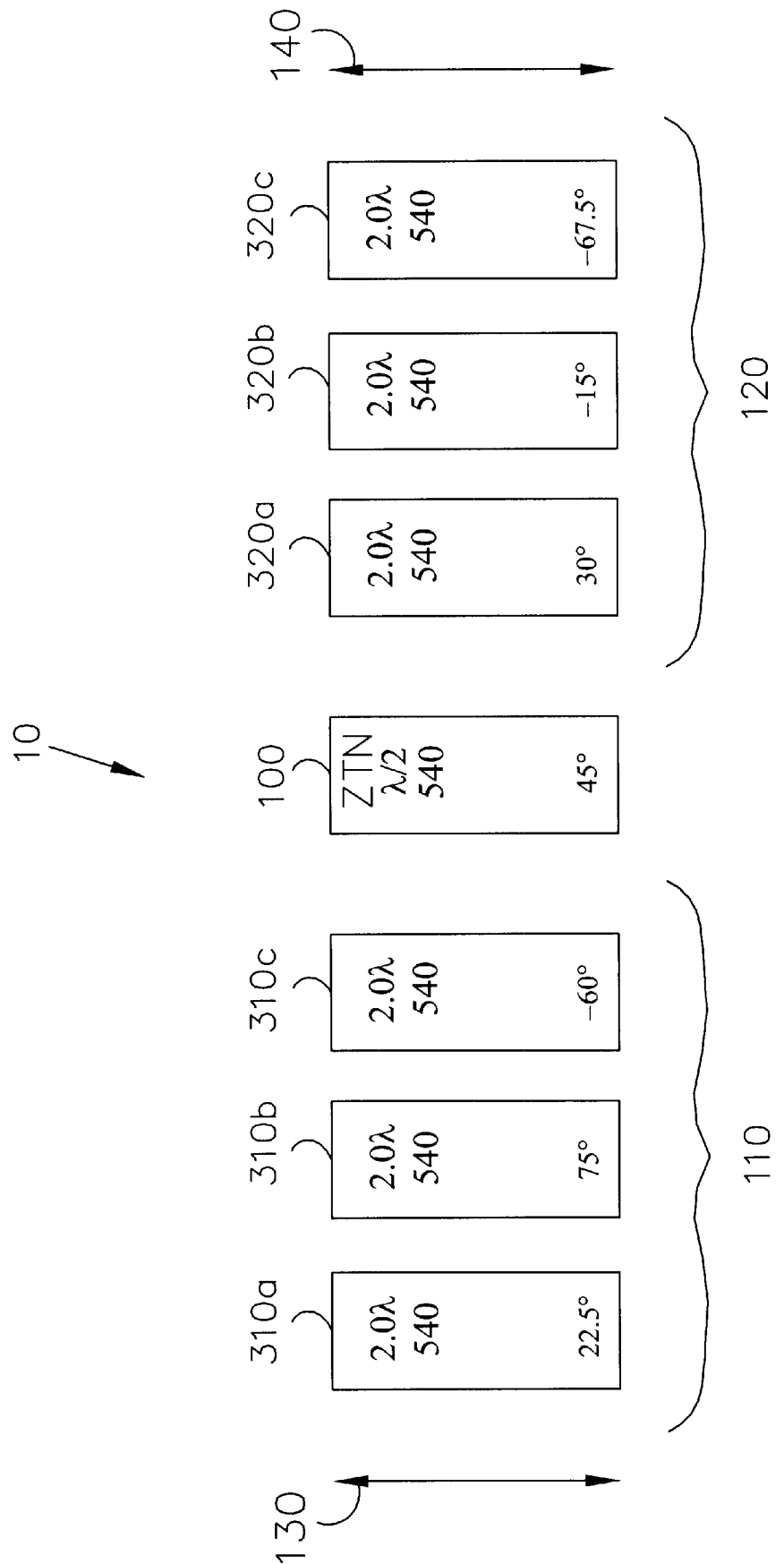
FIG. 5 shows a third embodiment of the CSLMs of the present invention.

Embodiment 3: SO Crossed-Stack, π/4-Oriented ZTN LC Modulator, Parallel Polarizer FIG. 5 shows another embodiment of a color filter with a magenta/white output. Like the embodiments shown in FIGS. 3 and 4, the input and exit polarizers 130 and 140 are oriented parallel with respect to each other. However, the ZTN LC half-wave modulator 100 is oriented at the ±π/4 with respect to the input polarizer 130. Thus, the modulator 100 modulates the polarization of light that is oriented parallel to the polarization axis of the input polarizer 130, and leaves the polarization of light that is oriented at ±π/4 with respect to the input polarizer 130 unchanged.

In order to obtain a M/W output like the color filters shown in FIGS. 3 and 4, the first and second retarder stacks 110 and 120 are modified so that they each provide full-wave retardance in the green (540 nanometers). As in the color filter shown in FIG. 3, the first and second retarder stacks 110 and 120 are crossed with respect to each other, thus providing a substantial ideal so white output.

The first retarder stack 110 comprises individual retarders 310a, 310b and 310c, oriented at 22.5°, 75° and −60°, with respect to the input polarizer 130. The second retarder stack 120 comprises individual retarders 320a, 320b and 320c, oriented at 30°, −15° and −67.5°, respectively, with respect to input polarizer 130.

Figure 6:
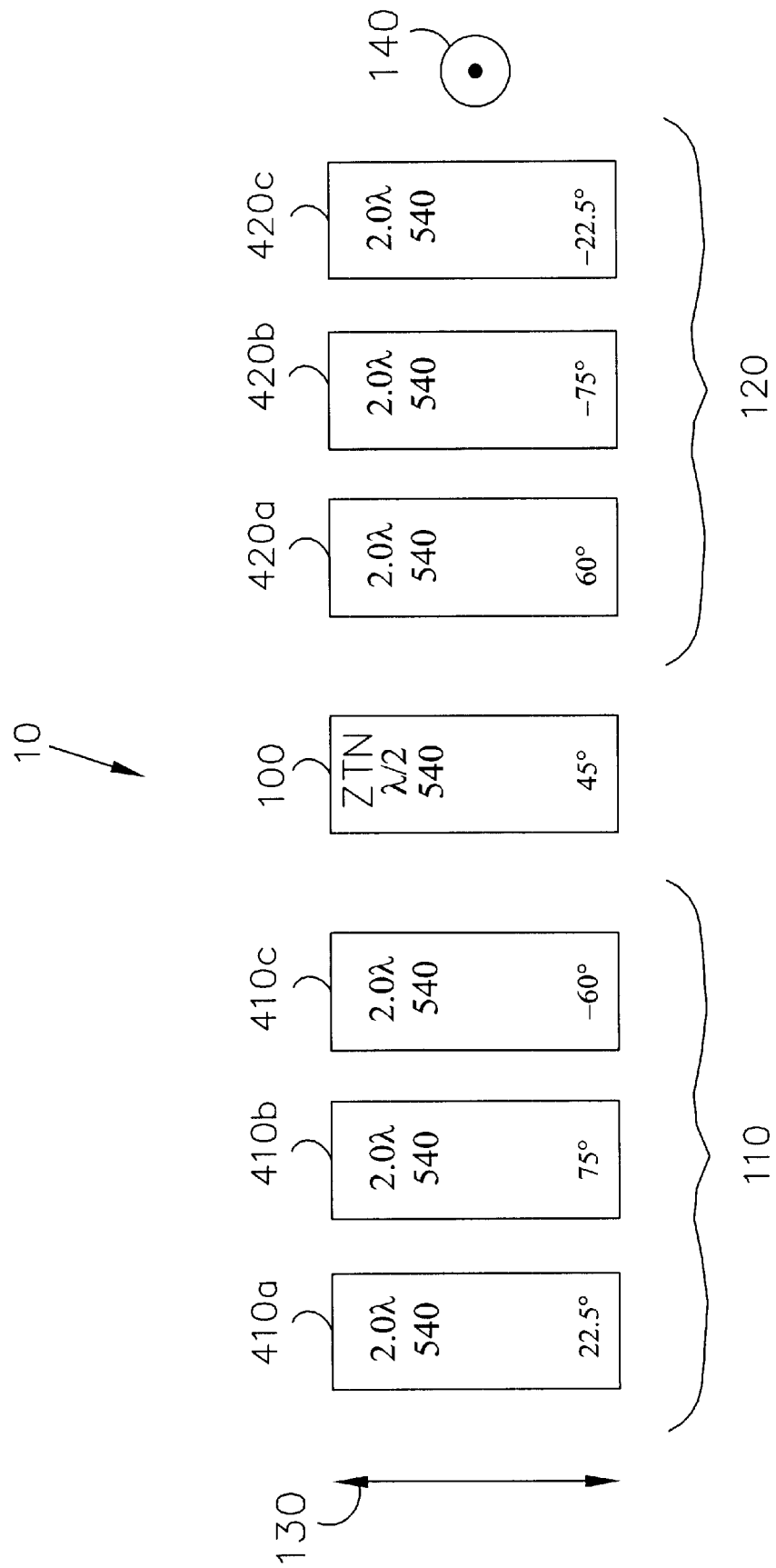
FIG. 6 shows a fourth embodiment of the CSLMs of the present invention.

Embodiment 4: SA Crossed-Stack, π/4-Oriented ZTN LC Modulator, Crossed Polarizer FIG. 6 shows another embodiment of a CSLM 10 similar to the CSLM shown in FIG. 5, except that a white output is achieved in the SA mode. The ZTN LC half-wave modulator 100 reflects the state of polarization, such that the input polarization appears to be oriented at $\pi/2$, and the first retarder stack 110 "appears" to have orientations $\pi/2-\alpha_1$, $\pi/2-\alpha_2$, ... $\pi/2-\alpha_N$. A SA white state is generated by creating the "appearance" of crossed retarder stacks and parallel polarizers. This is done by orienting the exit polarizer 140 at $\pi/2$, and orienting the individual retarders in the second retarder stack 120 at $-\alpha_N$, ... $-\alpha_1$. The resulting structure has first and second retarder stacks 110 and 120 of opposite sign.

In the embodiment shown in FIG. 6, the first retarder stack 110 comprises individual retarders 410a, 410b and 410c, oriented at 22.5°, 75° and −60°, respectively, with respect to the input polarizer 130. The second retarder stack 120 comprises individual retarders 420a, 420b and 420c, oriented at 60°, −75° and −22.5°, respectively, with respect to the input polarizer 130. The individual retarders in the first and second retarder stacks 110 and 120 provide full-wave retardance at 540 nanometers.

Figure 7:
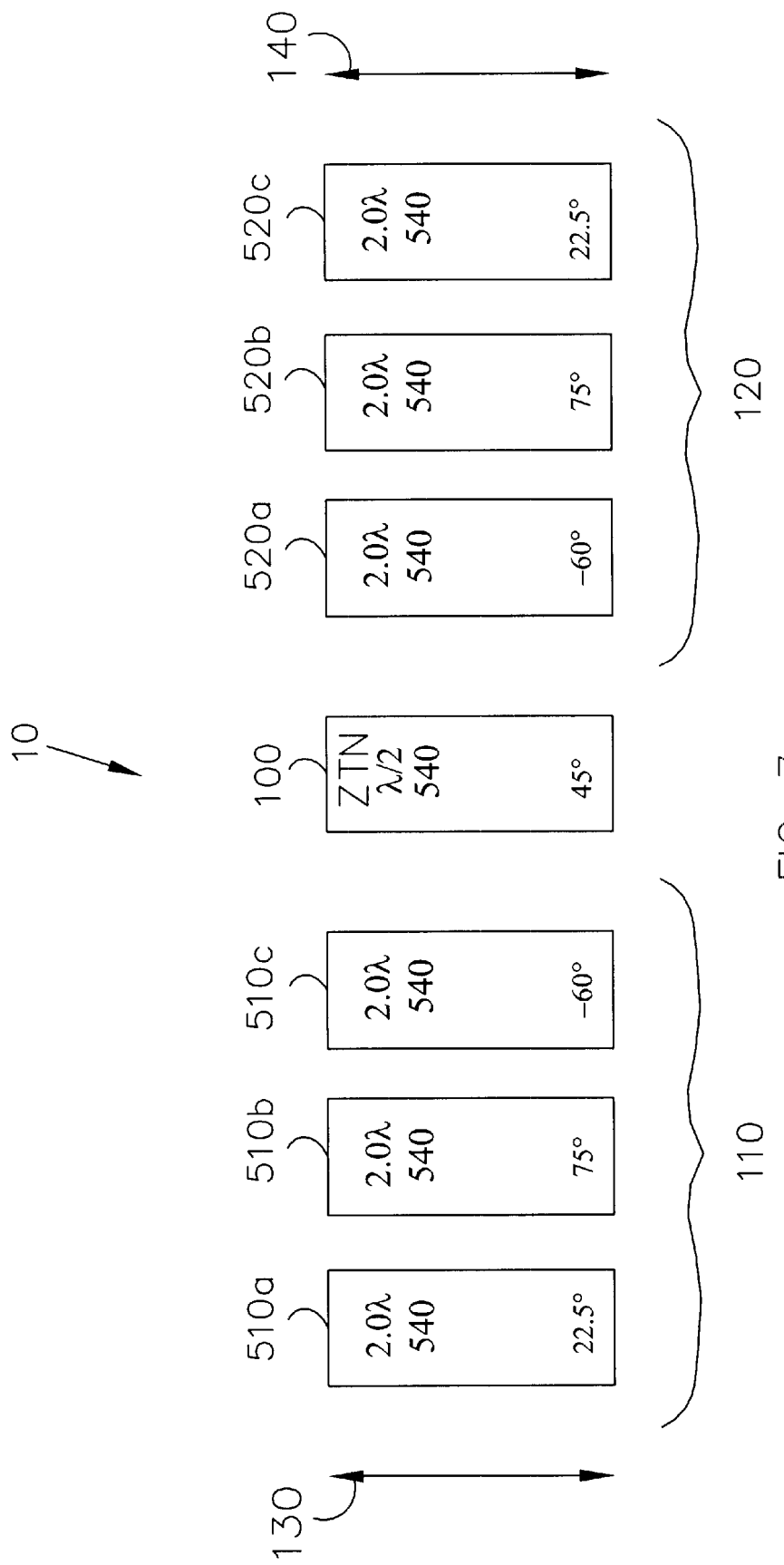
FIG. 7 shows a fifth embodiment of the CSLMs of the present invention.

Embodiment 5: SO White (Eigenpolarization), $\pi/4$-Oriented ZTN LC Modulator Parallel Polarizer An alternative to crossed retarder stacks is to achieve a neutral output using an eigenpolarization of the CSLM structure. FIG. 7 shows another embodiment of the CSLM 10 that is a modification of the CSLM embodiment of FIG. 6. In the CSLM 10 of FIG. 7, a white output is obtained in the SO mode using an eigenpolarization. A $\pm\pi/4$ oriented ZTN LC modulator 100 is used in this embodiment to modulate spectrums with 0 and/or $\pi/2$ oriented polarizations.

The CSLM 10 of FIG. 7 is a M/W CSLM, with the individual retarders in the first and second retarder stacks 110 and 120 providing two full waves of retardance at 540 nm (green). The first and second retarder stacks 110 and 120 are each half-wave retarders in the blue and red bands, with the first retarder stack 110 generating $\pm\pi/4$ oriented polarizations in the blue and red bands. As such, the ZTN LC modulator 100 does not modulate the state of polarization of the blue and red bands.

In the specific embodiment of FIG. 7, the first retarder stack comprises individual retarders 510a, 510b and 510c, oriented at 22.5°, 75° and 60°, respectively, with respect to input polarizer 130. The second retarder stack 120 comprises individual retarders 520a, 520b and 520c, oriented at −60°, 75° and 22.5°, respectively, with respect to input polarizer 130.

Embodiment 6: SA White (Eigenpolarization), $\pi/4$-Oriented ZTN LC Modulator, Crossed Polarizer In the CSLM of FIG. 8, the ZTN LC modulator 100 modifies the appearance of the first retarder stack, thus generating a filtered output. In the half-wave retardance state, the input and exit polarizers 130 and 140 appear crossed, and the first retarder stack "appears" to have orientations 67.5°, 15° and −30°.

Figure 8:
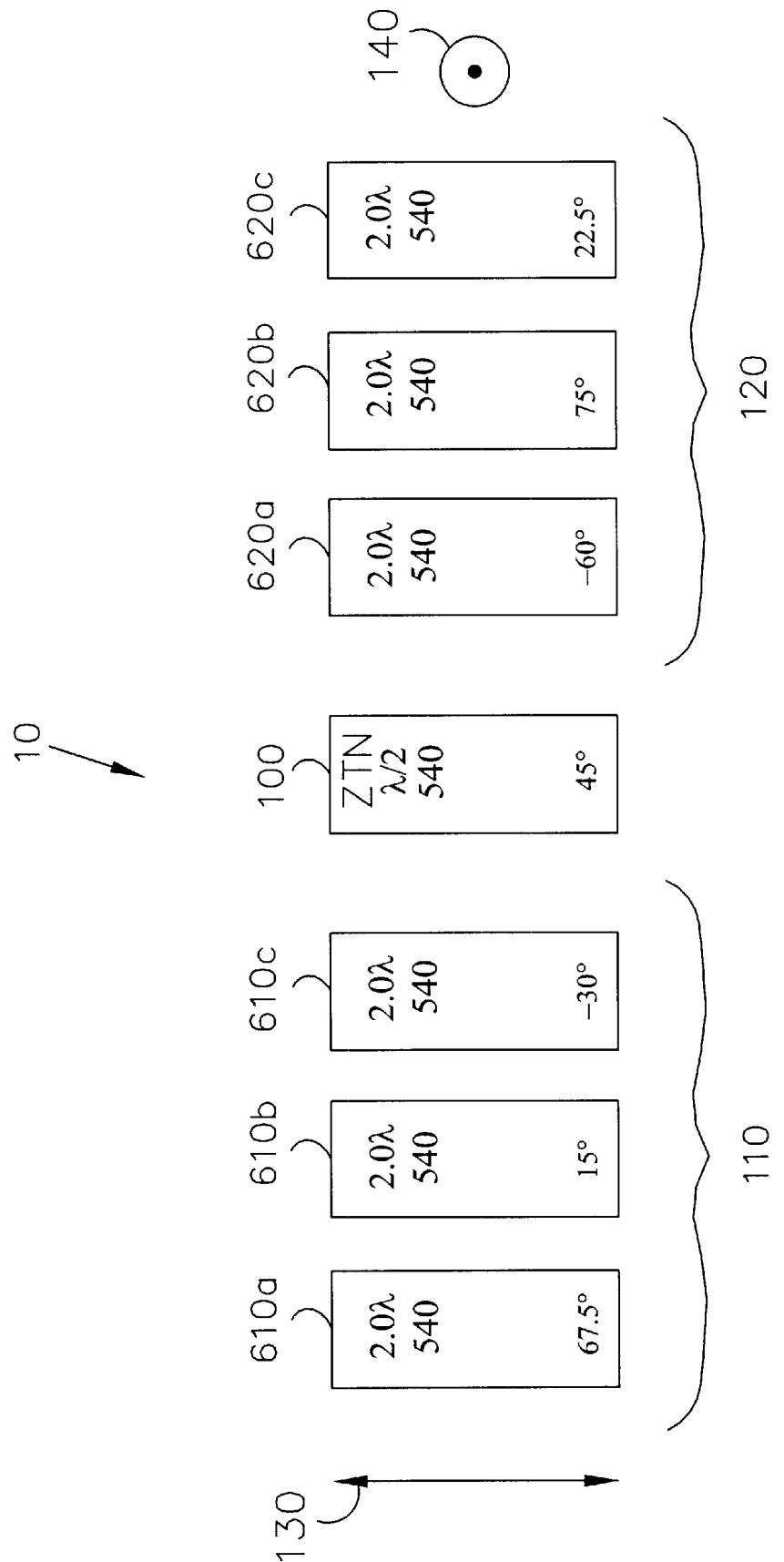
FIG. 8 shows a sixth embodiment of the CSLMs of the present invention.

In CSLM 10 shown in FIG. 8, the input and exit polarizers 130 and 140 are crossed, and the individual retarders 610a, 610b and 610c in the first retarder stack 110 are oriented at 67.5°, 15° and −30°, respectively, with respect to the input polarizer 130. The individual retarders 620a, 620b and 620c in the second retarder stack 120 have the same orientations as the corresponding individual retarders shown in FIG. 6.

The configuration shown in FIG. 8 generates a white state in the SA mode as an eigenpolarization.

Figure 9:
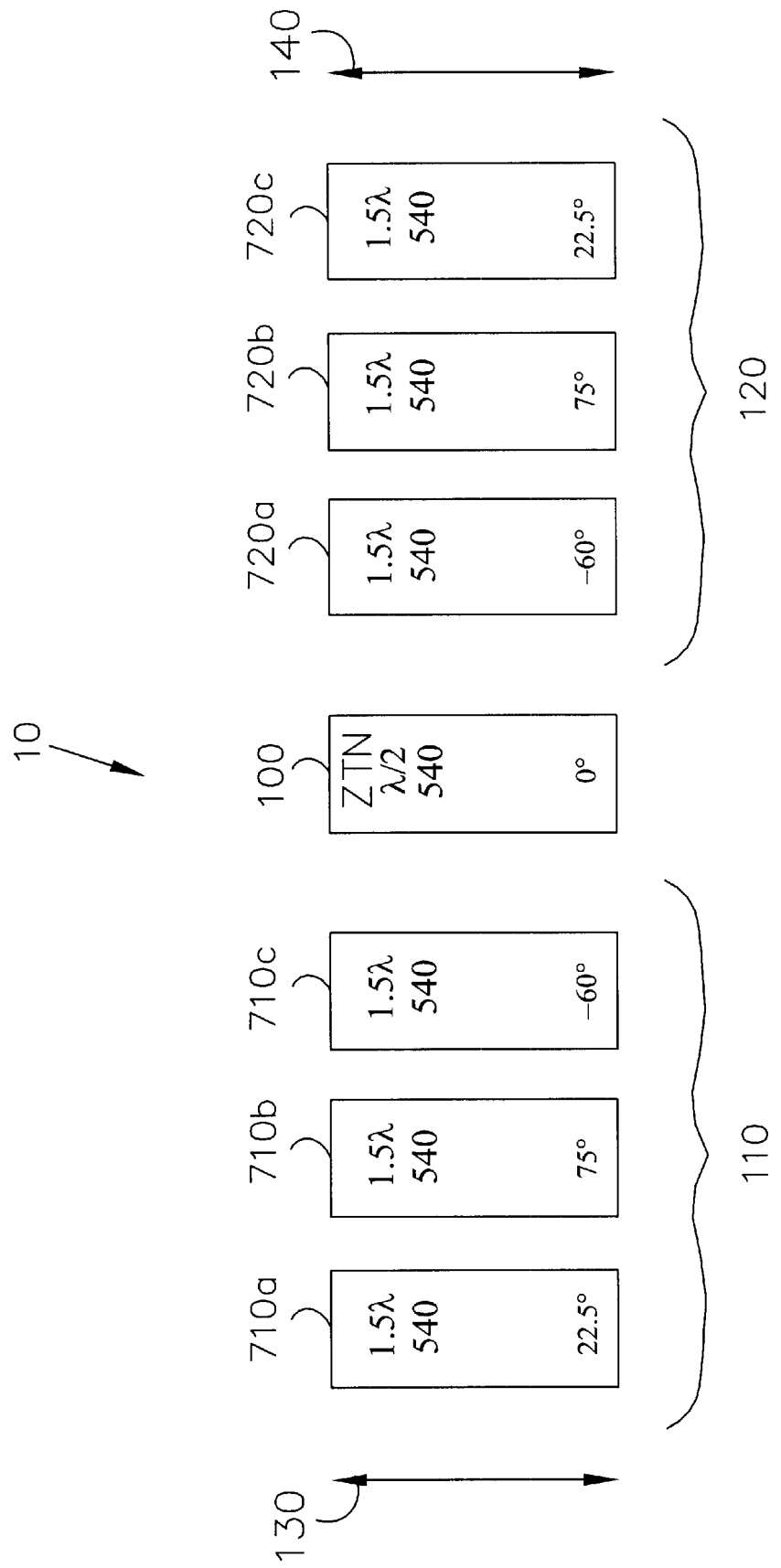
FIG. 9 shows a seventh embodiment of the CSLMs of the present invention.

Embodiment 7: SO White (Eigenpolarization), 0°-Oriented ZTN LC Modulator, Parallel Polarizer The CSLM embodiment shown in FIG. 9 uses the same retarder stack configuration used in the CSLM of FIG. 7. However, a different filtered state is generated by orienting the ZTN LC modulator 100 at 0°. Since the neutral output is obtained in the SO mode, its spectrum is unchanged at normal incidence. The 0°-oriented ZTN LC modulator 100 modulates $\pm\pi/4$ oriented polarizations. Therefore, a green modulator (M/W design) uses retarder stacks 110 and 120 comprised of green (540 nm) half-wave individual retarders 710a, 710b, 710c, 720a, 720b, and 720c. In the SA mode, the ZTN LC modulator 100 creates the "appearance" of switching the signs of the angles in one of the retarder stacks.

Embodiment 8: SA White (Eigenpolarization, 0°-Oriented ZTN LC Modulator, Parallel Polarizer A SA white state can be obtained as an eigenpolarization by reversing the signs of the angles of the individual retarders in one of the retarder stacks (110 or 120) of the CSLM 10 shown in FIG. 9. As such, the filtered output is obtained in the SO mode.

Figure 10:
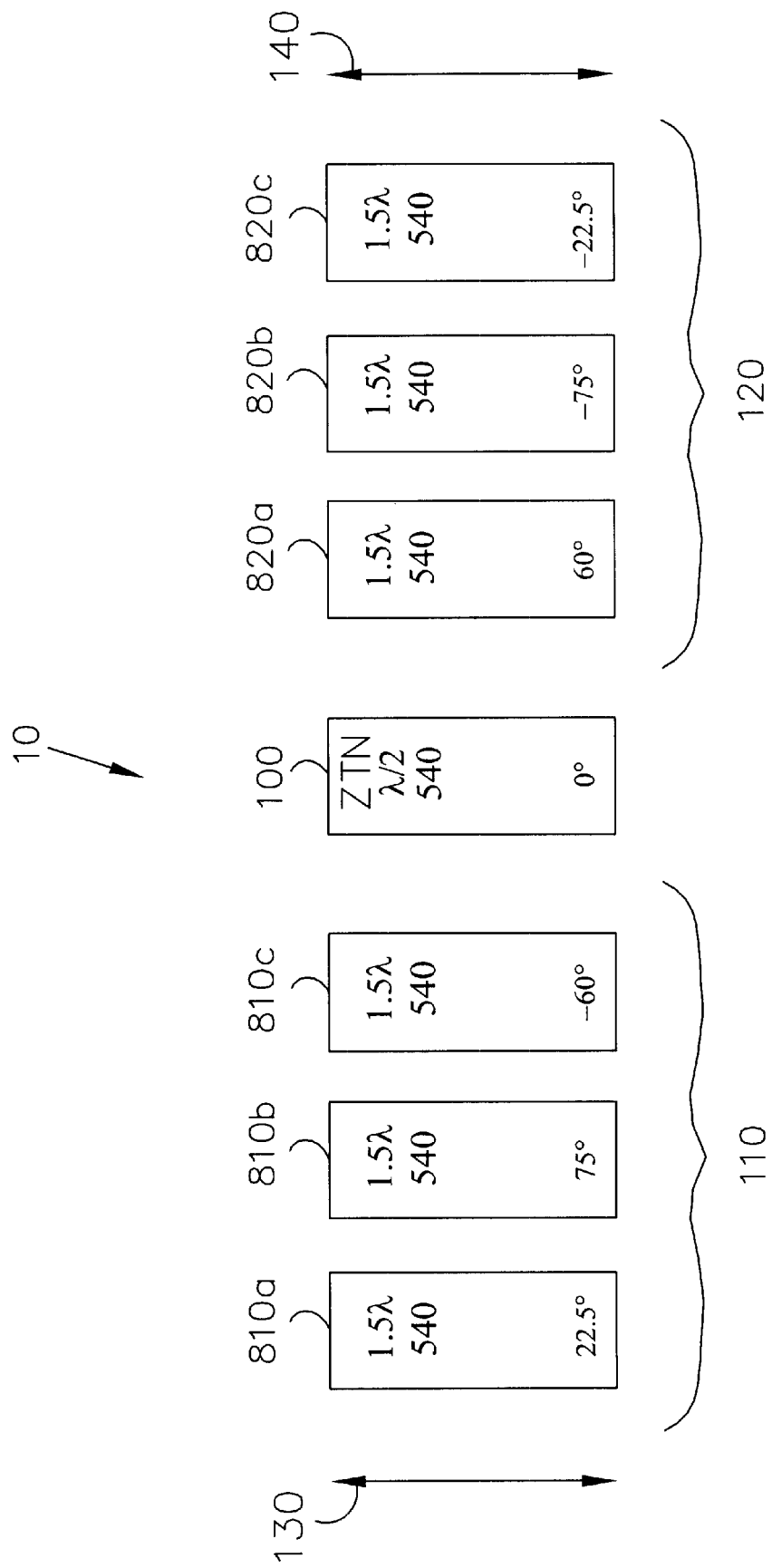
FIG. 10 shows a eighth embodiment of the CSLMs of the present invention.

A CSLM embodiment that incorporates this configuration is shown in FIG. 10. In this embodiment, the first retarder stack 110 comprises individual retarders 810a, 810b and 810c that have the same orientation as the individual retarders 710a, 710b and 710c shown in FIG. 9. The second retarder stack 120 comprises individual retarders 820a, 820b and 820c oriented at 60°, −75° and −22.5°, respectively. Like in the CSLM shown in FIG. 9, the ZTN LC modulator 100 in the embodiment shown in FIG. 10 is orientated at 0°.

Embodiment 9: SA White with Tunable Peak Transmission

Figure 11:
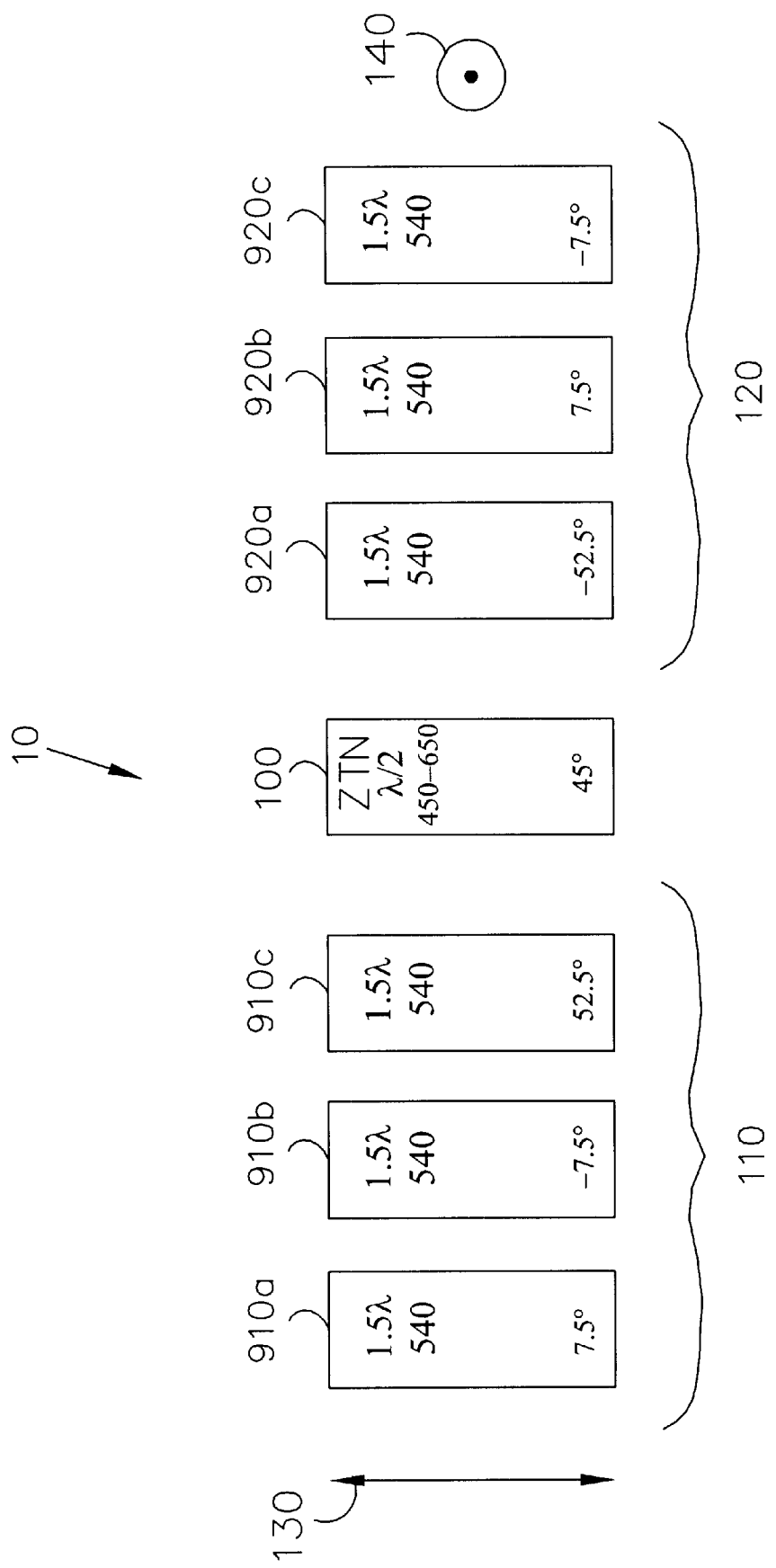
FIG. 11 shows a ninth embodiment of the CSLMs of the present invention.

When the chrominance of the modulator is too large for generating spectra with adequate saturation in the SA mode, such spectra are best generated in the SO mode. Consequently, the white state reflects the loss in transmission characteristics of most LC shutter devices in the open state. However, like ZTN neutral shutters, the peak transmission of the white state of the CSLM can be tuned to maximize throughput. FIG. 11 shows a SO green CSLM 10 with a tunable white state.

The ZTN LC modulator 100 is tunable so that the peak transmission of the white state of the CSLM 10 can be tuned to maximize throughput. The input and output polarizers 130 and 140 have crossed orientations. The first retarder stack 110 comprises individual retarders 910a, 910b and 910c oriented at 7.5°, −7.5° and 52.5°, respectively. The second retarder stack 120 comprises individual retarders 920a, 920b an 920c oriented at −52.50, 7.5° and −7.50. The ZTN LC modulator 100 is oriented at 45°.

Reflection Mode CSLM

Figure 12:
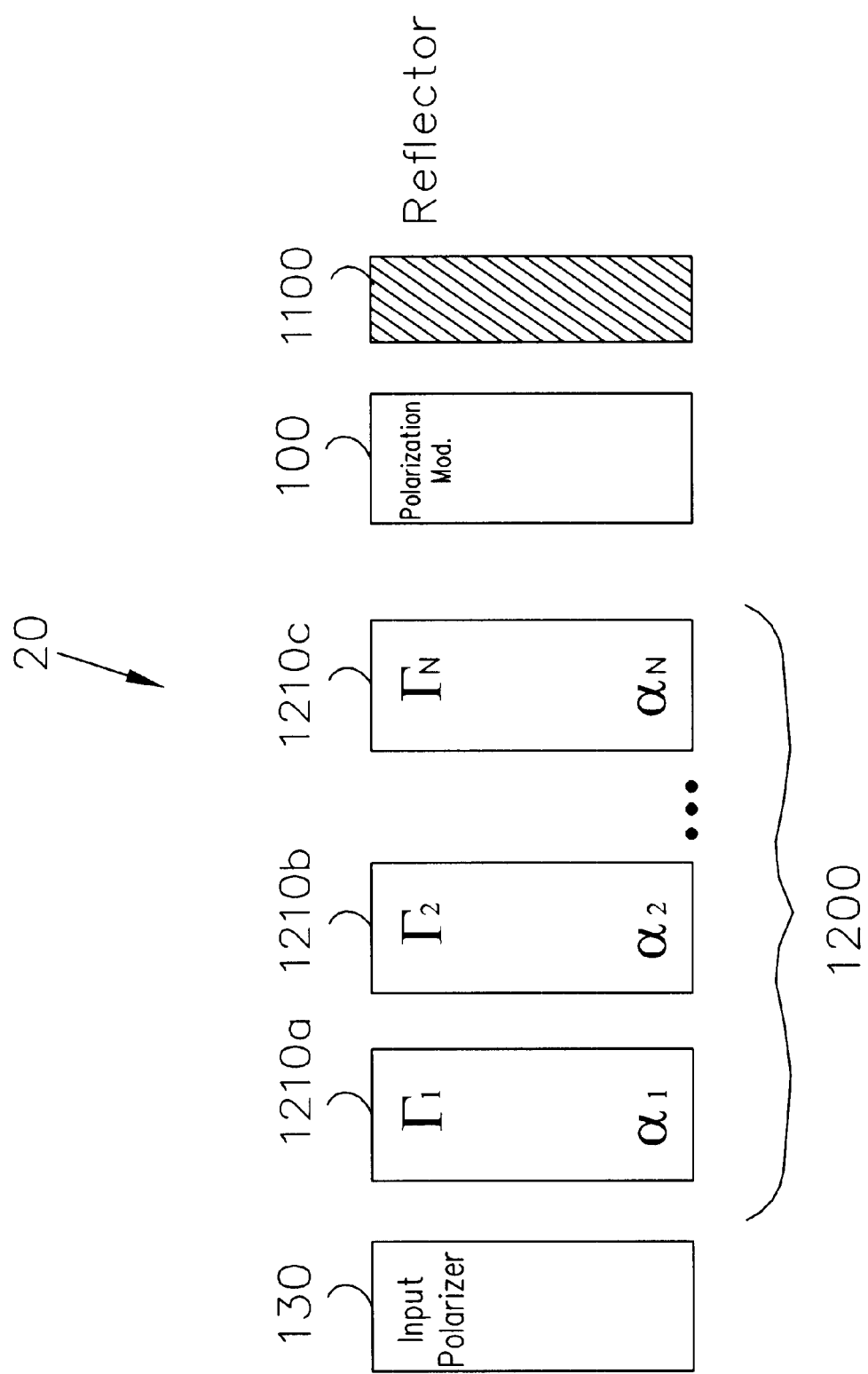
FIG. 12 shows reflection mode CSLM, in accordance with the present invention.
Figure 13:
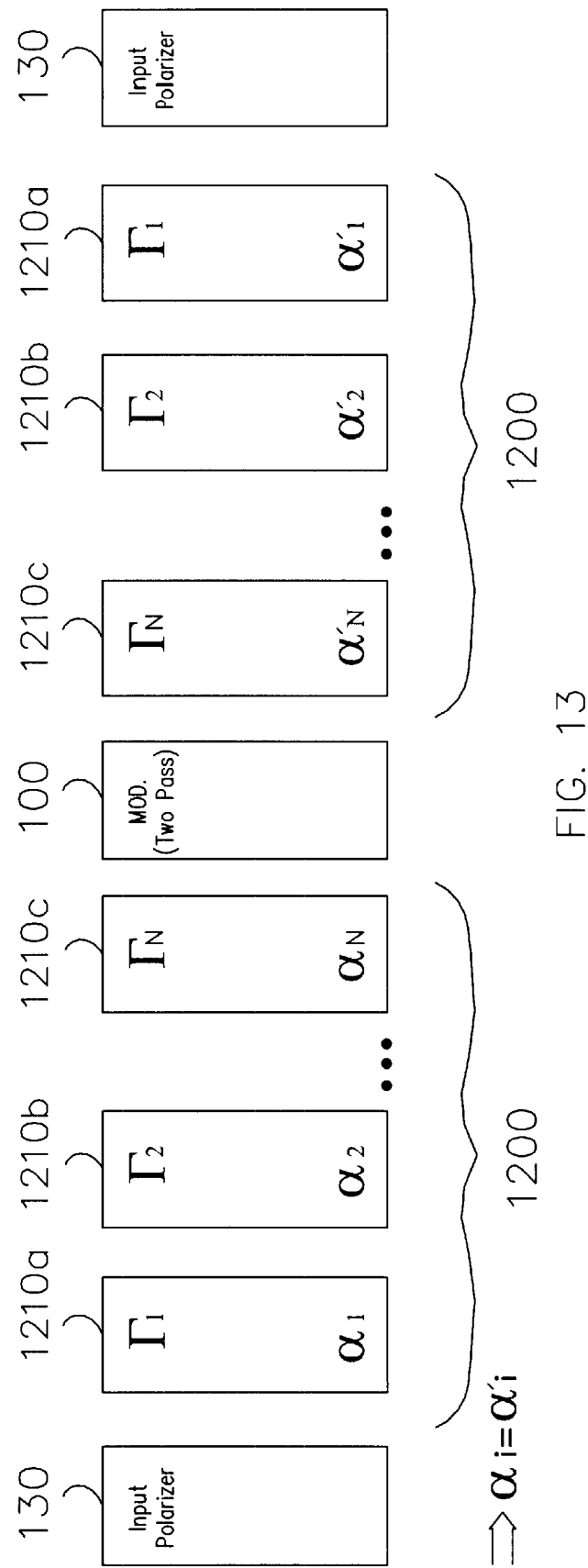
FIG. 13 is an "unfolded" schematic of the reflection mode CSLM of FIG. 12.

A reflection mode CSLM 20 is shown in FIG. 12. The reflection mode CSLM 20 comprises an input polarizer 130, a reflector 1100 and a retarder stack 1200 positioned between the input polarizer 130 and the reflector 1100. The retarder stack 1200 comprises a plurality of individual retarders 1210a, 1210b ... 1210c having retardances $\Gamma_1$, $\Gamma_2$, ... $\Gamma_N$ and orientations $\alpha_1$, $\alpha_2$, ... $\alpha_N$, respectively. In operation, light passes through the input polarizer 130, through the individual retarders 1210a, 1210b ... 1210c, reflects from the reflector 1100, passes back through individual retarders 1210c ... 1210b, and 1210a and passes back through input polarizer 130. Accordingly, the input polarizer 130 also functions as the exit polarizer, and the retarder stack 1200 functions as both the first and second retarder stacks. To more clearly illustrate the path light takes through the reflection mode CSLM 20, an "unfolded" schematic of the reflection mode CSLM 20 is shown in FIG. 13.

The reflection mode CSLM 20 has the constraint that $\alpha_i=\alpha_i$. While achromatic transformations can be inserted to broaden the range of design choices (Ammann and Yarborough), it is most desirable to avoid such transformations, thereby simplifying the stack design. In a retroreflecting arrangement, the unfolded version shows that the input and output polarizers (implemented with polarizer 130) are parallel and the layers in corresponding retarder stacks have identical orientations. If a polarization splitter (not shown) is used, there is an option between a parallel polarizer output or a crossed polarizer output.

Figure 15A:
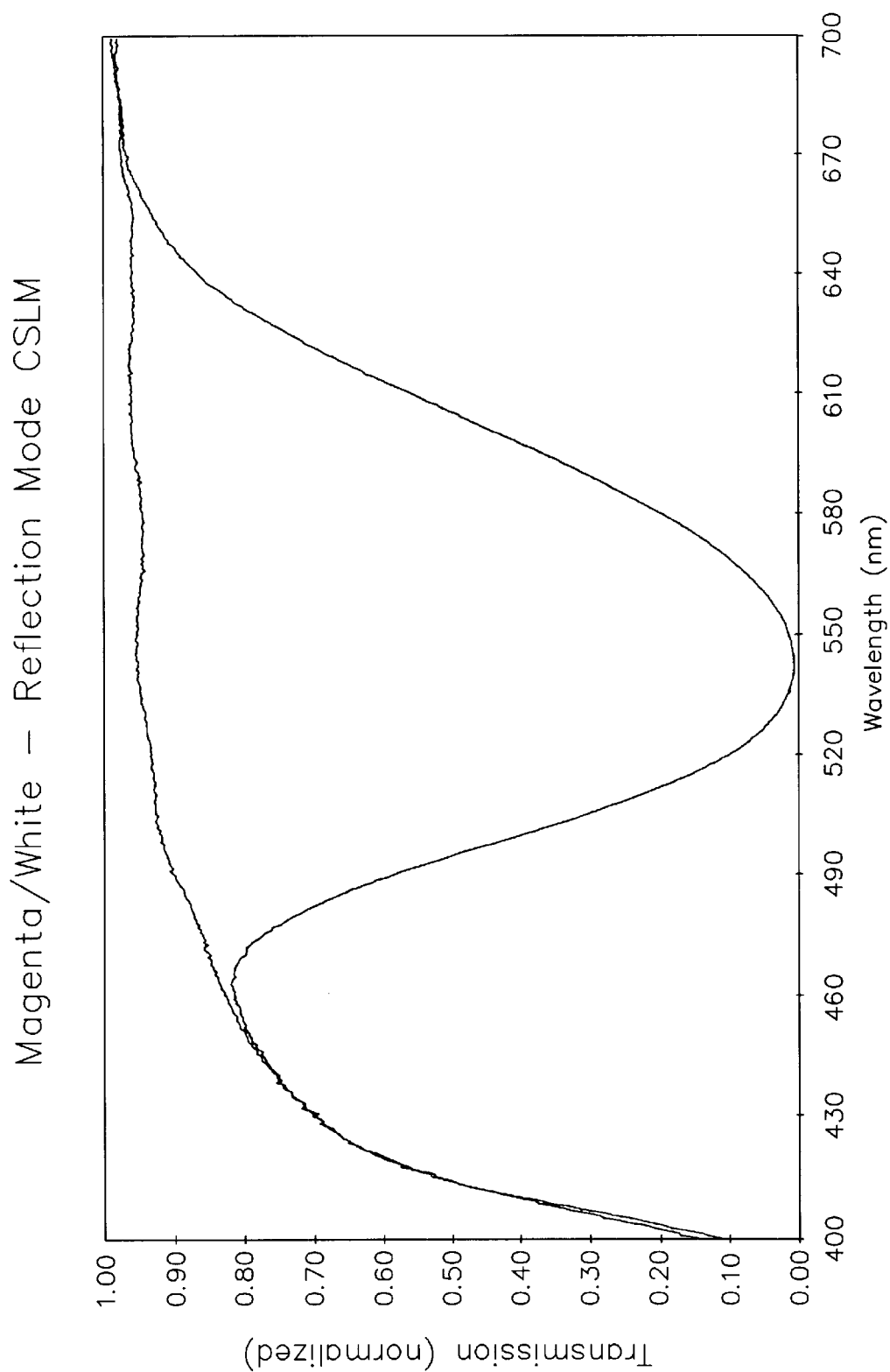
FIGS. 15A and 15B are plots of the measured output of reflection mode magenta and yellow CSLMs, respectively.
Figure 15B:
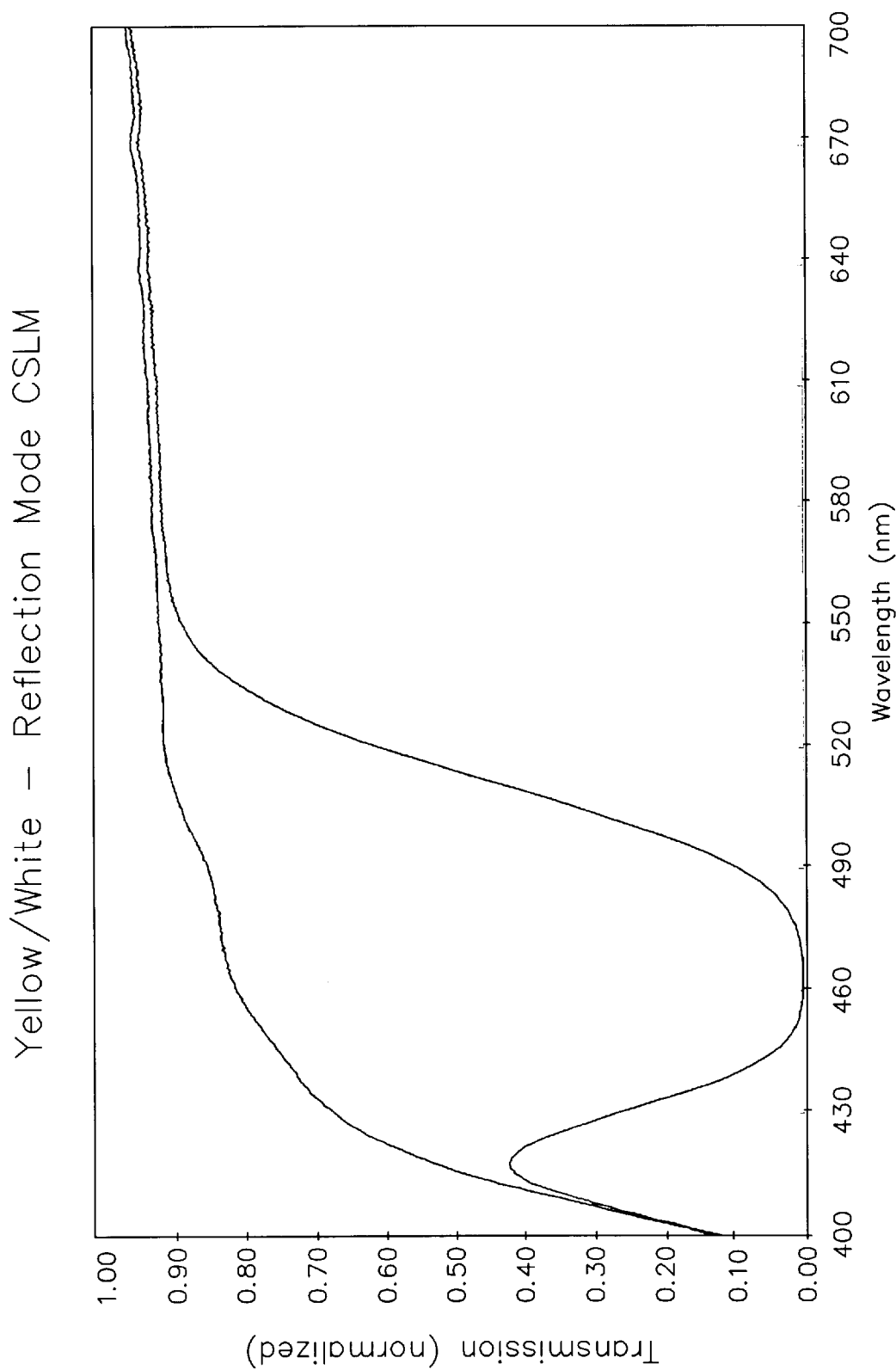

FIG. 14 is a table that lists designs with three retarders (N=3) that have the required symmetry for implementing a reflection mode device. FIGS. 15A, and 15B are plots of the measured output of reflection mode magenta and yellow CSLMs, respectively. A cyan CSLM uses design #8 listed in 14, polycarbonate retarders that provide a full wave of retardance at 430 nm. The magenta and yellow CSLMs use design #5 listed in FIG. 14. The magenta CSLM uses 1.5-wave polycarbonate retarders at 540 nm, and the yellow CSLM uses 1.5-wave polycarbonate retarders at 460 nm. All CSLMs were constructed with two sheets of Nitto-Denko EG 1425 DU iodine polarizers, which forms the envelope of the white outputs. The transparent electrode losses also contribute to the shape of the output profile.

Other Embodiments

The CSLM embodiments discussed above primarily utilize an LC modulator to control the transmission of one portion (spectrum) of the operating band, while maintaining fixed transmission of the complementary spectrum. Preferred embodiments are those in which the unmodulated spectrum is either fully transmitted or fully extinguished. The embodiments in which the unmodulated spectrum is fully transmitted represent variable saturation CSLMs, because the LC modulator modulates between a white state and a filtered state that is substantially more saturated. The embodiments in which the unmodulated spectrum is fully extinguished are variable luminance CSLMs, because the LC modulator modulates between a filtered state and a black state. In many instances, a variable luminance CSLM permits full modulation from a filtered state to a black state with fixed color coordinates.

Another type of filter is a variable hue filter. A variable hue filter is one with both end points on the CIE diagram corresponding to filtered states. The action of the LC modulator(s) is thus to modulate between two filtering operations, rather than a filtered state and a neutral state. Examples of some variable hue filters are provided in U.S. Pat. No. 5,751,384, which is incorporated herein by reference in its entirety. This type of filter can also be implemented with CSLMs.

Figure 16:
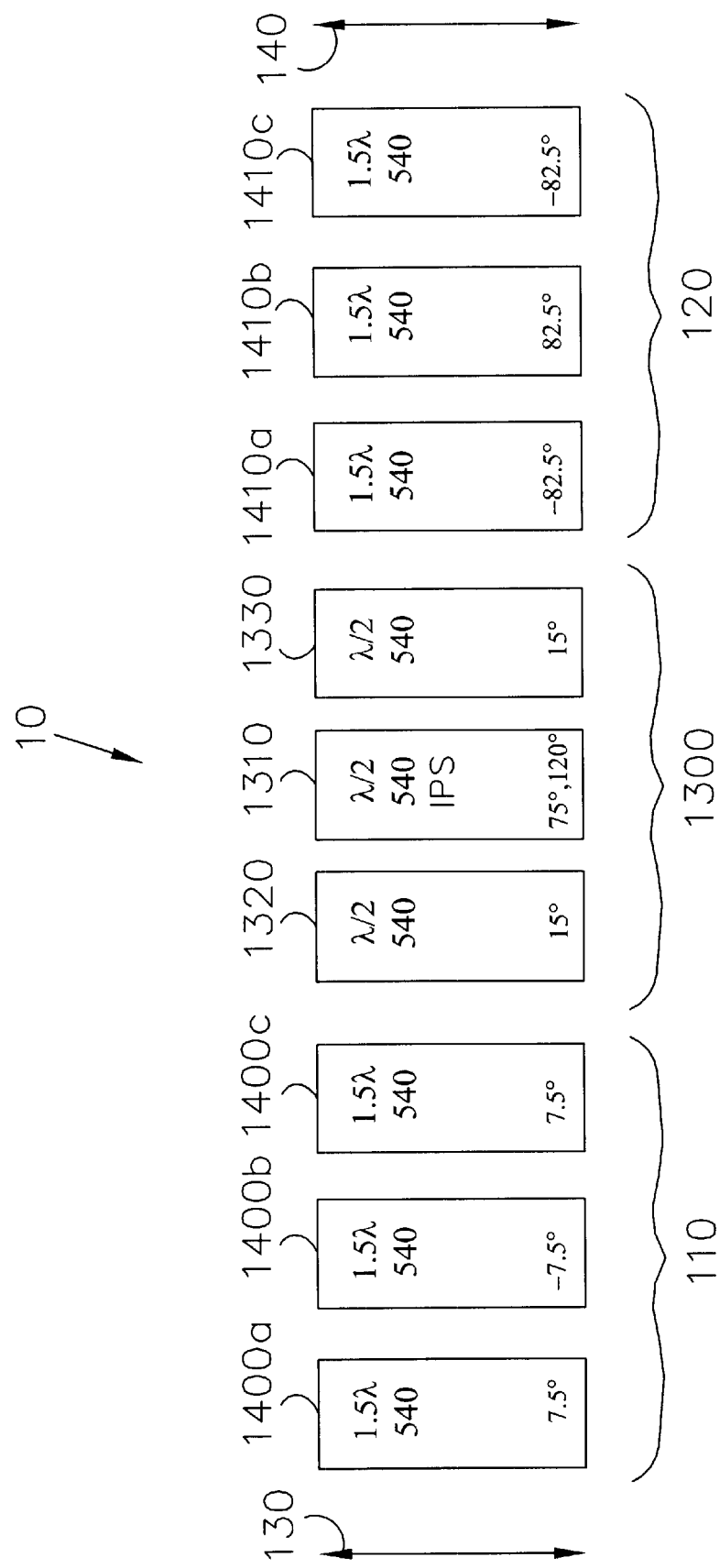
FIG. 16 shows a variable hue CSLM that switches between a green output and a magenta output in accordance with the present invention.

FIG. 16 shows a variable hue filter (CSLM) 10 that switches between a green output and a magenta output. This can be compared to the G/M output of a stage utilizing an LC switch external to a retarder stack color polarizer (SPF). In such an arrangement, the green and magenta spectra are exact inverses (complementary), intersecting at the 50% transmission points. However, the G/M spectra of the CSLM 10 may not be exactly complementary. The sum of the two spectra actually has notches in the true cyan and true yellow bands, which is desirable for display applications. Like the standard SPF, the two spectra can be generated by rotating a half-wave retarder by $\pi/4$.

In the CSLM embodiment of FIG. 16, a compound half-wave modulator 1300 is used as the modulator and achromatizes the $\pi/4$ orientation. The compound half-wave modulator 1300 comprises an in-plane switching (IPS) modulator 1310, and half-wave retarders 1320 and 1330 positioned on each side of the IPS modulator 1310 and orientated at 15°. A first retarder stack 110 comprises individual retarders 1400a, 1400b and 1400c oriented at 7.5°, −7.5° and 7.5°, respectively. A second retarder stack 120 comprises individual retarders 1410a, 1410b and 1410c oriented at −82.5°, 82.5° and 82.5°, respectively. The compound half-wave modulator 1300 is positioned between the first retarder stack 110 and the second retarder stack 120, which are all positioned between parallel polarizers 130 and 140.

When the IPS modulator 1310 is oriented at $5\pi/12$, a green output with a 40 nm bandpass width is transmitted. When the IPS modulator 1300 is rotated to $2\pi/3$, a magenta with half maximum points at 494 nm and 596 nm is output. The spectra overlap at the 10% transmission points.

FIG. 17 is a table that shows 46 additional SO filters CSLM designs, and FIG. 18 is a table showing 46 additional SO neutral CSLM designs. FIG. 19 is table that shows 56 additional cross polarizer CSLM designs in which $\alpha_1-\alpha_2+\alpha_3$ is equal to 22.5°. FIG. 20 is a table that shows 59 additional cross polarizer CSLM designs in which $\alpha_1-\alpha_2+\alpha_3$ is equal 67.5°.

Multiple Stage Filters

Multiple stage CSLMs comprise two or more retarder stack/modulator/retarder stack stages in series with one or more analyzing polarizers. Each retarder stack/modulator/retarder stack stage comprises a modulator with a retarder stack positioned on each side of the modulator. The polarizers are typically neutral, but polarizers designed to analyze a particular spectral component can separate retarder stack/modulator/retarder stack stages. Examples of two-polarizer and four-polarizer full color multiple stage CSLMs are used by way of illustrating issues that arise when retarder stack/modulator/retarder stack stages are cascaded. Multi-stage CSLMs can be used as color sequencers, as will be explained in more detail below.

Figure 21A:
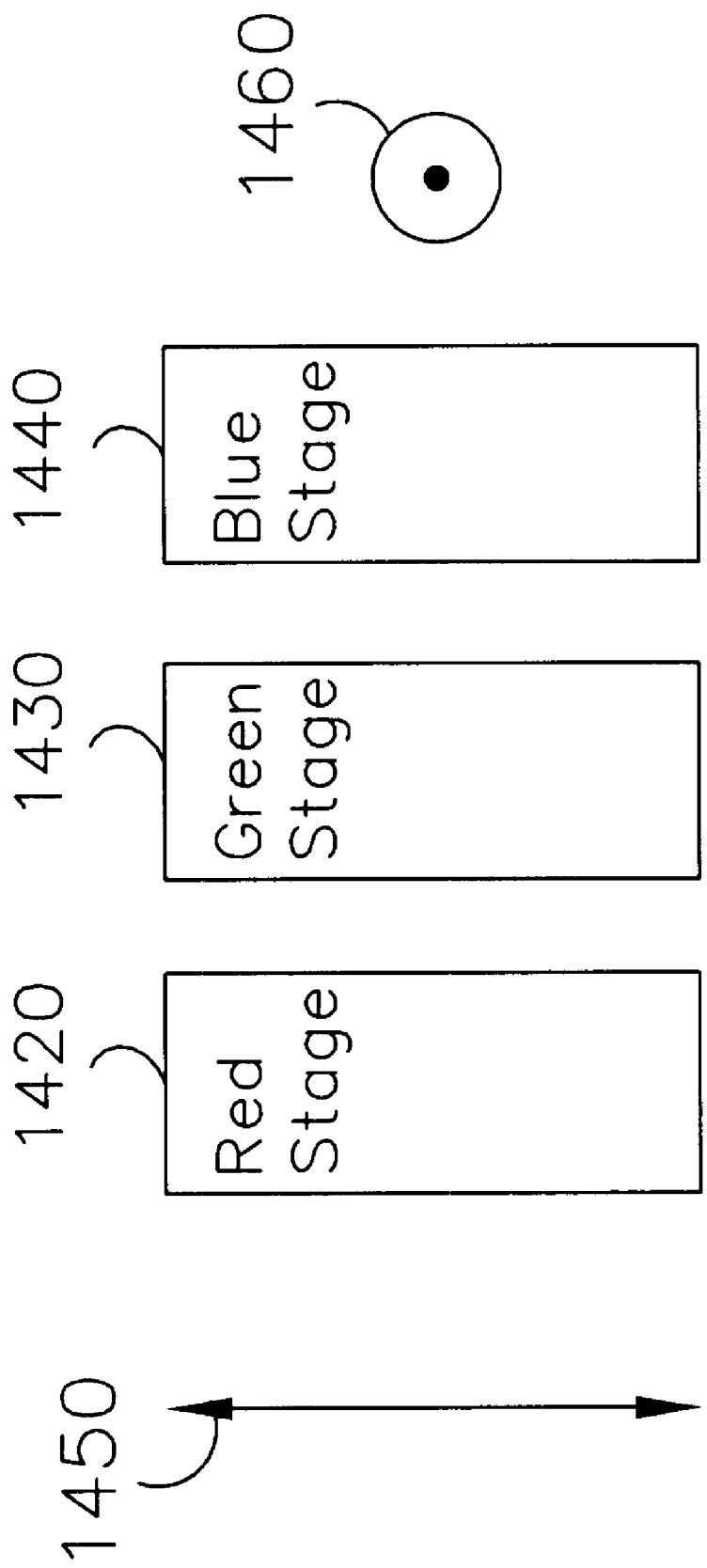
FIG. 21A is a block diagram of a two-polarizer multi-stage CSLM, in accordance with the present invention.
Figure 21B:
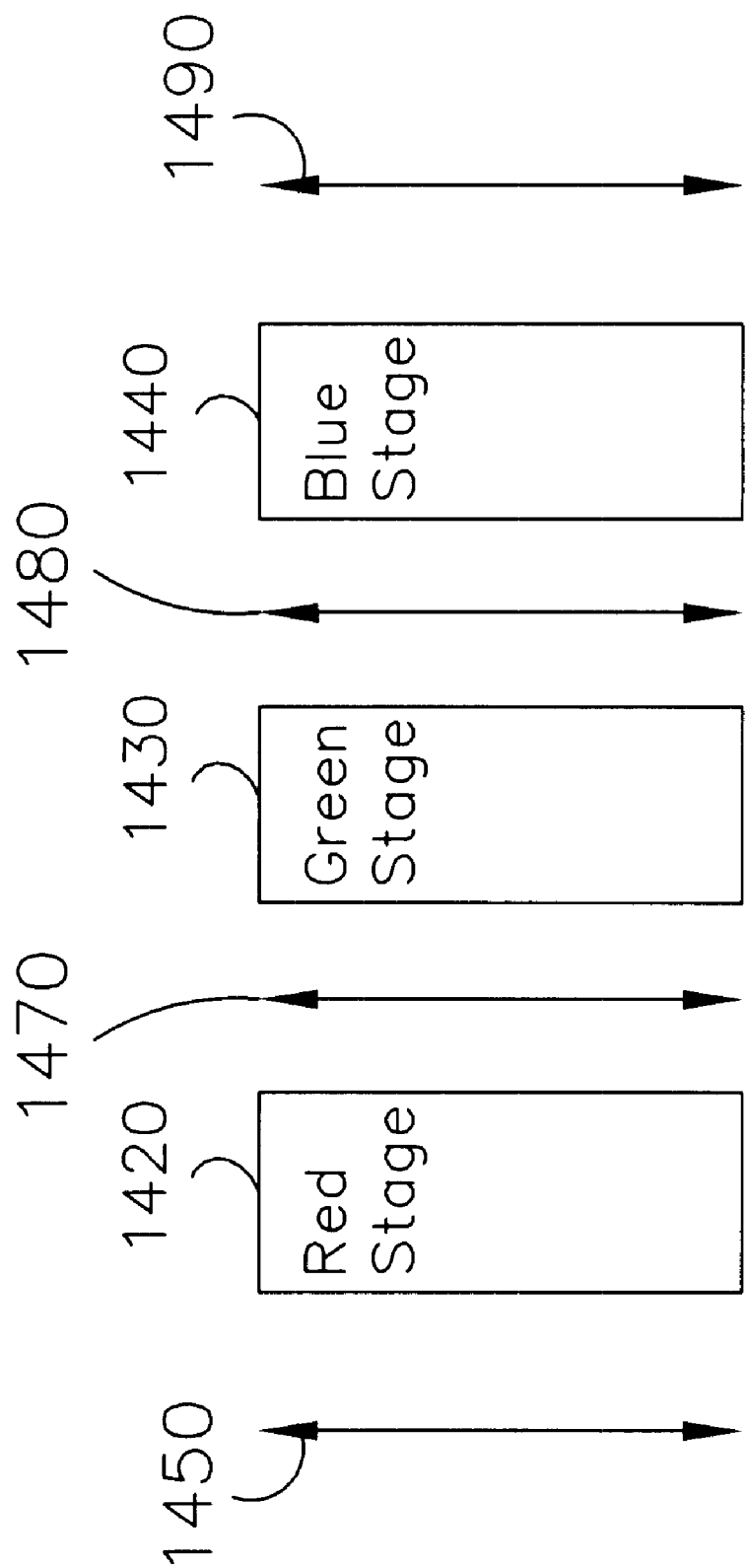
FIG. 21B is a block diagram of a four-polarizer, three-stage CSLM, in accordance with the present invention.

FIGS. 21A and 21B are block diagrams of a two-polarizer, three-stage CSLM, and a four-polarizer, three-stage CSLM, respectively. The two-polarizer, three-stage CSLM shown in FIG. 17A comprises an input polarizer 1450, a red stage 1420, a green stage 1430, a blue stage 1440 and an output polarizer 1460 that is crossed with respect to the input polarizer 1450. The four-polarizer, three-stage CSLM shown in FIG. 17B generally comprises an input polarizer 1450, a red stage 1420, a polarizer 1470 for analyzing a spectral component transmitted by the red stage 1420, a green stage 1430, a polarizer 1480 for analyzing a spectral component transmitted by the green stage 1430, a blue stage 1440 and a polarizer 1490 for analyzing a spectral component transmitted by the blue stage 1440.

It should be noted that the actual number of stages is arbitrary. In addition, although red, green and blue stages are shown for illustrative purposes in the CSLMs of FIGS. 21A and 21B, it should be appreciated that stages that modulate other colors may be used. Most of the CSLM designs discussed above allow the modulators in each of the CSLM stages to be pixellated, in order to permit common-path full color displays using video rate panels. A few of the CSLM designs discussed above are intended specifically for either additive primary or subtractive primary color generation only.

Two-Polarizer, Three-Stage CSLM

An important benefit of a two-polarizer multi-stage CSLM, such as the general one shown in FIG. 21A, is high light efficiency, because it only requires a polarized input and a single analyzing polarizer following the last individual retarder stack/modulator/retarder stack stage. The analyzing polarizer can be mounted external to the retarder stacks and modulators to increase power handling and/or to capitalize on polarizers already in the system, as in LCD sequential projectors. Should the input light be unpolarized, a polarizing beamsplitter can be used to form two optical paths. These paths can be processed separately by the retarder stacks and modulators and recombined with a second polarization splitter. This in principle, represents a substantially lossless filtering operation. This is accomplished without increasing the etendue of the system, provided that components subsequent to the multi-stage CSLM are not sensitive to polarization. Such is the case with a digital micromirror device PMD).

The challenge in designing a full-color multi-stage CSLM with one analyzing polarizer is to minimize the interaction between the retarder stack/modulator/retarder stack stages. Because the state of polarization is not analyzed after each retarder stack/modulator/retarder stack stage, the stages interact on a field basis, rather than on a power transmission basis. The two-polarizer design thus requires greater independence of stages than the four-polarizer design. Since a polarization analyzer does not isolate the CSLM stages, any polarization effects introduced by modulator chrominance (or off-normal input light) in the neutral state represents a degradation in color coordinates for any retarder stack/modulator/retarder stack stage in the filtered state. As the quality of the neutral state improves (the density of the black state or the flatness of the white state), the independence of the stages likewise improves, making SO neutral states a desirable design choice.

A significant benefit of the two-polarizer design is the greater number of design options available relative to four-polarizer designs. In particular, the two-polarizer CSLM can be operated in an additive mode. As discussed above, stages behave as variable saturation filters in substractive mode, and as variable luminance filters in additive mode. When only one polarization analyzer is used, designs that use a black state rather than a white state can be considered. A black state simply means that a particular stage "vanishes" between crossed polarizers, rather than parallel polarizers. The term "vanishes" is used to indicate that the polarization of input light passing through the stage is preserved. Thus, it is as though the stage is not present. In the context of a multi-stage CSLM, a black state does not preclude other output spectra, because other stages remain available to switch to the filter mode. Conversely, a four-polarizer filter, using all neutral polarizers, requires that white be a common output of every retarder stack/modulator/retarder stack stage. Thus, by simply rotating the analyzing polarizer, the CSLM is converted from a subtractive filter to an additive filter, with some important performance implications.

A benefit of the additive mode design is that it gives preference to the quality of the additive primary colors and black, rather that the subtractive primary colors and white, which is important in display applications. When the input and output polarizers are crossed, the quality of the black state is primarily compromised by any inability to make the structure between the polarizers vanish. Conversely, when the input and output polarizers are parallel, a black state relies on the structure between the polarizer to convert the polarization to the orthogonal state. Using a full-color subtractive mode structure, this requires the cooperation of three retarder stack/modulator/retarder stack stages, each responsible for rotating the polarization of one additive primary color to the orthogonal state. This is typically a formidable task.

Other benefits are associated with the generation of color. The additive mode design generates an additive primary directly using a single CSLM stage, requiring no cooperation between stages. Each stage can thus be designed independently, without regard for the characteristics of the other stages, provided that the neutral states are of adequate quality. Therefore, with an additive mode CSLM, stages ideally "vanish" in the SO mode and each stage is responsible for independently determining the transmission of one additive primary color.

When generating subtractive primaries additively, losses in performance due to interaction between stages is frequently of lesser consequence than when generating additive primaries subtractively. It should be noted that, by conservation of power, the transmission spectra of additive and subtractive filters are inverses of one another. With this in mind, it is chromatically more tolerable to have a true yellow notch in the yellow spectrum than a yellow side lobe in the blue spectrum. Similarly, it is chromatically more tolerable to have a true cyan notch in the cyan spectrum than a true cyan side lobe in the red spectrum. Most importantly, true cyan and true yellow notches in the white output are less significant than true cyan and true yellow side lobes in the black state.

A Projection Display RGB CSLM Color Sequencer

In a projection display, maintaining high light efficiency is a high priority. In addition, a CSLM color sequencer (CCS) must handle the high light level of the projector lamp. Accordingly, internal polarizers are preferably eliminated from the CCS design. In order to not decrease throughput, the CCS preferably does not create a bottleneck in view time, or duty ratio. Accordingly, the transient behavior of the CSLM must be considered. Fortunately, the field of view requirement is relaxed for direct view systems, which is beneficial in two-polarizer designs. Typically, a 10°–15° half-cone angle is acceptable. Given these priorities, a preferred embodiment for a projector CCS will now be described. Note that, while much of the discussion centers around single-pixel color sequencers, this example also applies to stacked three-stage, pixelated color displays.

Figure 22A:
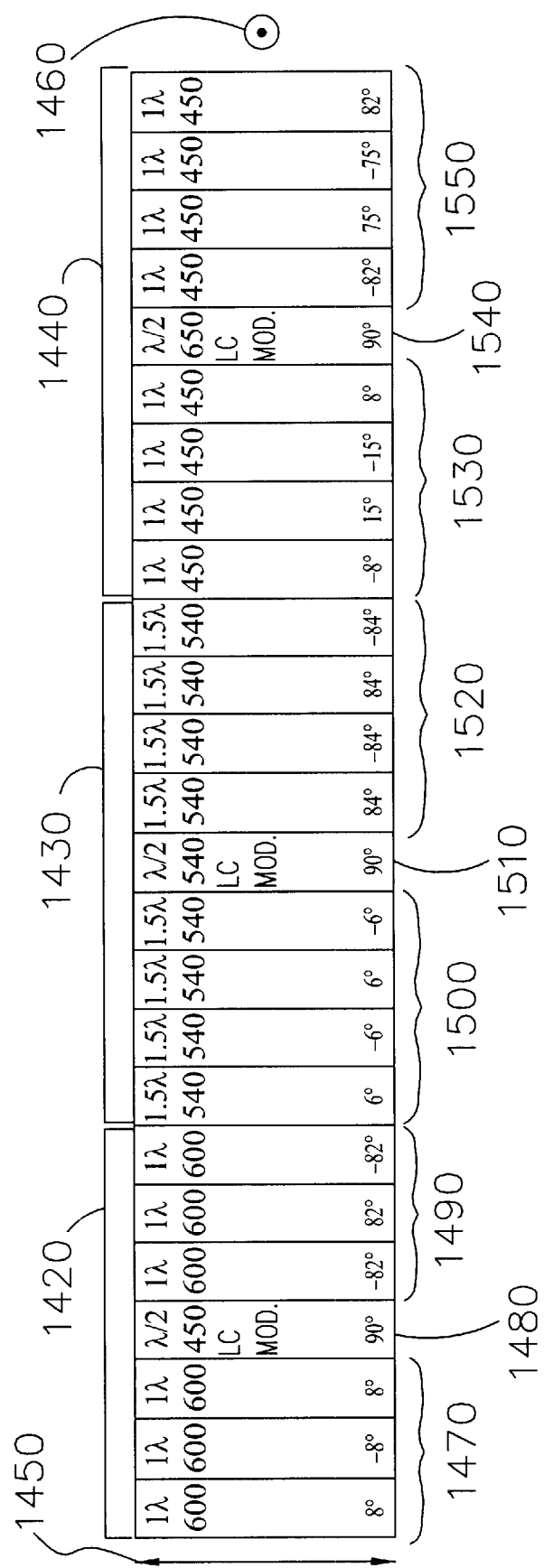
FIGS. 22A and 22B show two CSLM color sequencers that incorporate a two-polarizer additive (SO black) CSLM design, in accordance with the present invention.

As shown in FIG. 22A, a first preferred CSLM design for the projector CCS is a two-polarizer additive (SO black) design, with a SA red stage 1440, a SA green stage 1430 and a SA blue stage 1420. The blue stage 1420 comprises a first retarder stack 1470, a 450 nm half-wave LC modulator 1480 and a second retarder stack 1490. The green stage 1430 comprises a first retarder stack 1500, a 540 nm half-wave LC modulator 1510 and a second retarder stack 1520. The red stage 1440 comprises a first retarder stack 1530, a 650 nm half-wave LC modulator 1540 and a second retarder stack 1550. The preferred retardances and orientations of the individual retarders that comprise retarder stacks 1470, 1490, 1500, 1520, 1530 and 1550 are listed in FIG. 22A and will not be discussed. LC modulators 1480, 1510 and 1540 are oriented at 90°. The individual retarders that make up retarder stacks 1470, 1490, 1500, 1520, 1530 and 1550 are preferably Z-stretched polymer films, such as Nitto NRZ™ polymer films.

Figure 22B:
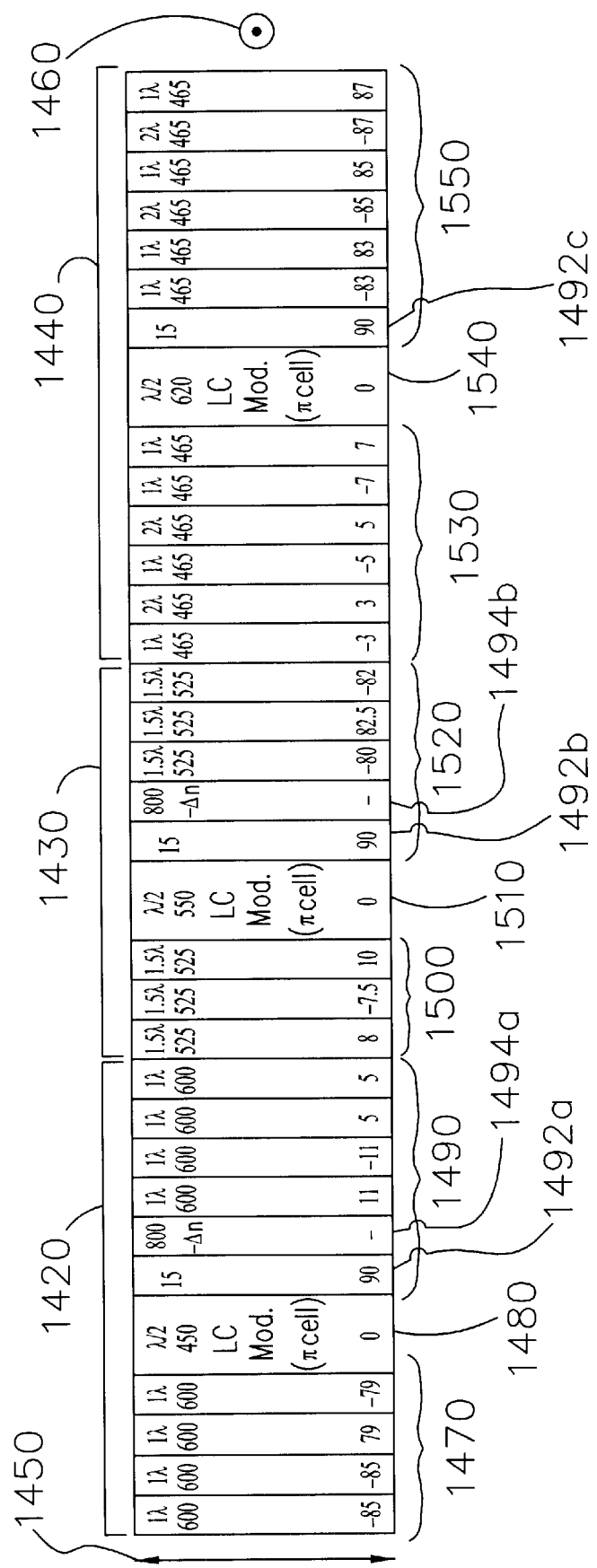

FIG. 22B shows a second preferred CSLM design for the projection CCS. Like the design of FIG. 22A, the design of FIG. 22B is a two-polarizer additive (SO black) design, with a SA red stage 1440, a SA green stage 1430 and a SA blue stage 1420. The LC modulators 1480, 1510 and 1540 in the design of FIG. 22B are 450 nm, 550 nm and 620 nm half-wave LC modulators, respectively. The preferred retadances and orientations of the individual retarders that comprise retarder stacks 1470, 1490, 1520, 1530 and 1550, are listed in FIG. 22B and will not be discussed. LC modulators 1480, 1510 and 1540 are oriented a 0°.

Unlike the design of FIG. 22A, the design of FIG. 22B includes compensators for improving the field of view. Specifically, retarder stacks 1490, 1520 and 1550 include in-plane compensators 1492A, 1492B and 1492C. In addition, retarder stacks 1490 and 1520 include Z-compensators 1494A and 1494B. The in-plane compensators and the Z-compensators help improve the field of view of the CSLM color sequencer. The Z-compensators 1494A and 1494B are suitably cellulose triacetate, and biaxially stretched polymers, such a polycarbonate.

The designs of FIGS. 22A and 22B have three LC modulators 1480, 1510 and 1540. While a CCS based on complementary color switching has only two LC modulators, the design of FIGS. 22A and 22B provide important advantages. First, the three-stage design eliminates the internal polarizer required in complementary two-stage designs. With properly selected glass, conductive coatings, and spacer densities, stage losses can be reduced to approximately 1–2% per stage. In contrast, each dye-stuff polarizer used as an internal polarizer results in more than a 16% loss.

Second, the spectra from each stage of the FIGS. 22A and 22B designs are independent of one another, unlike complementary retarder stack based designs which overlap at the 50% transmission point.

Third, the LC modulators 1480, 1510 and 1540 each need only be achromatic over one additive primary color band, while complementary-based designs (assuming redundant blocking) require achromatic behavior over two additive primary color bands.

Fourth, the retardances of the LC modulators 1480, 1510 and 1540 have no significant influence on the color coordinate of the three-stage CCS, unlike complementary-based filters. This makes the three-stage CCS very robust, because the spectra are independent of the detailed characteristics of the LC modulators.

Fifth, the designs of FIGS. 22A and 22B permit nearly 100% viewing due to its desirable transient behavior, as will be discussed in more detail below.

FIG. 23 is a truth table for the CCS of FIGS. 22A and 22B. With all LC modulators driven high (the "off" state), the black state is obtained. To the extent that the first and second retarder in each stage stacks are identical in retardation and are accurately crossed, and that the LC modulator can be made to completely vanish, the contrast ratio is polarizer limited. Given reasonable fabrication tolerances, a 200:1 average contrast can be achieved using properly compensated LC modulators.

Independent optimization of each retarder stack allows one to achieve near ideal color coordinates without the loss associated with additional notch filters. Such filters might otherwise be required in complementary-based designs to reject interprimary light. Achieving acceptable color coordinates depends upon the lamp spectrum (and chromatic losses in the system), the number of individual retarder films in the retarder stacks, and the specific primary band modulated by the stage. As the center wavelength of the bandpass increases, it becomes necessary to increase the number of retarder films to maintain performance. In the B/K stage 1420 for example, only three retarder films are used for each of the first and second retarder stacks 1470 and 1490, because the $\Delta n(\lambda)/\lambda$ dependence of the retardation serves to improve the stop-band width. Generally, a blue stage using retarder stacks with two or three individual retarder films gives acceptable coordinates.

Conversely, the $\alpha n(\lambda)/\lambda$ dependence of retardation tends to reduce the stop-band width for the R/K stage 1440. Accordingly, additional retarder films are preferably used in the retarder stacks 1530 and 1550. For example, a 1.5λ red retarder film used in a retarder stack is 2.5λ in the blue, resulting in a magenta output. This can be addressed by using the LC modulator chrominance to eliminate the blue order, and by using the blue stage 1420 to further reduce blue transmission. However, this type of design is less robust because it relies on modulator retardance control and cooperation between stages to achieve acceptable spectra. As discussed above, it is preferable for each stage to be independent of the others. When 0.5λ red retarders are used, the blue order is safely eliminated, but the transition slope is shallower. While this allows the stages to be independent, the value of N (the number of individual retarders) must be increased to sharpen the transition slope and give an acceptable color coordinate.

Figure 24A:
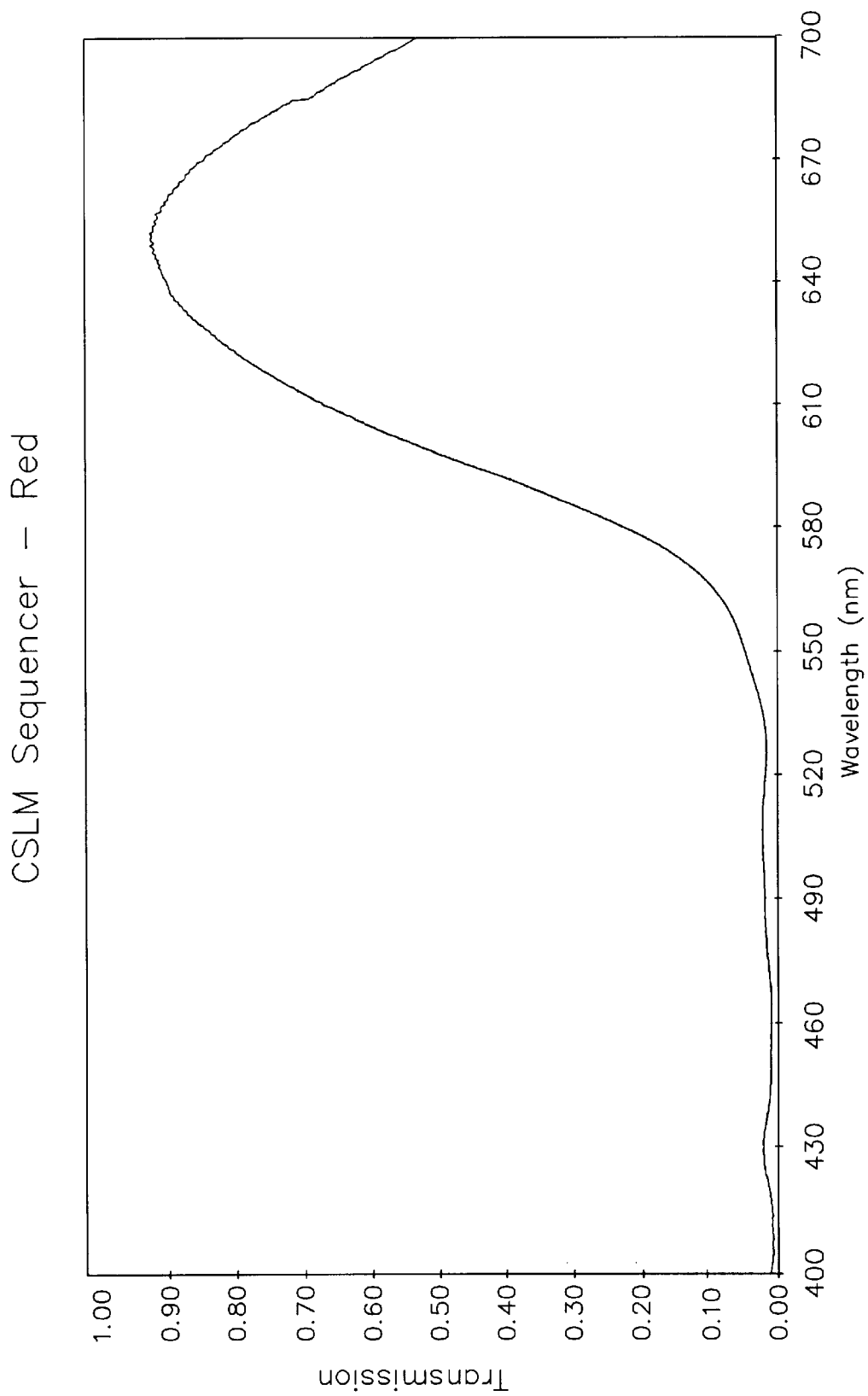
FIGS. 24A, 24B and 24C are plots of the measured red, green and blue transmission spectra, respectively, for the fully assembled RGB CSLM color sequencer of FIG. 22A.
Figure 24B:
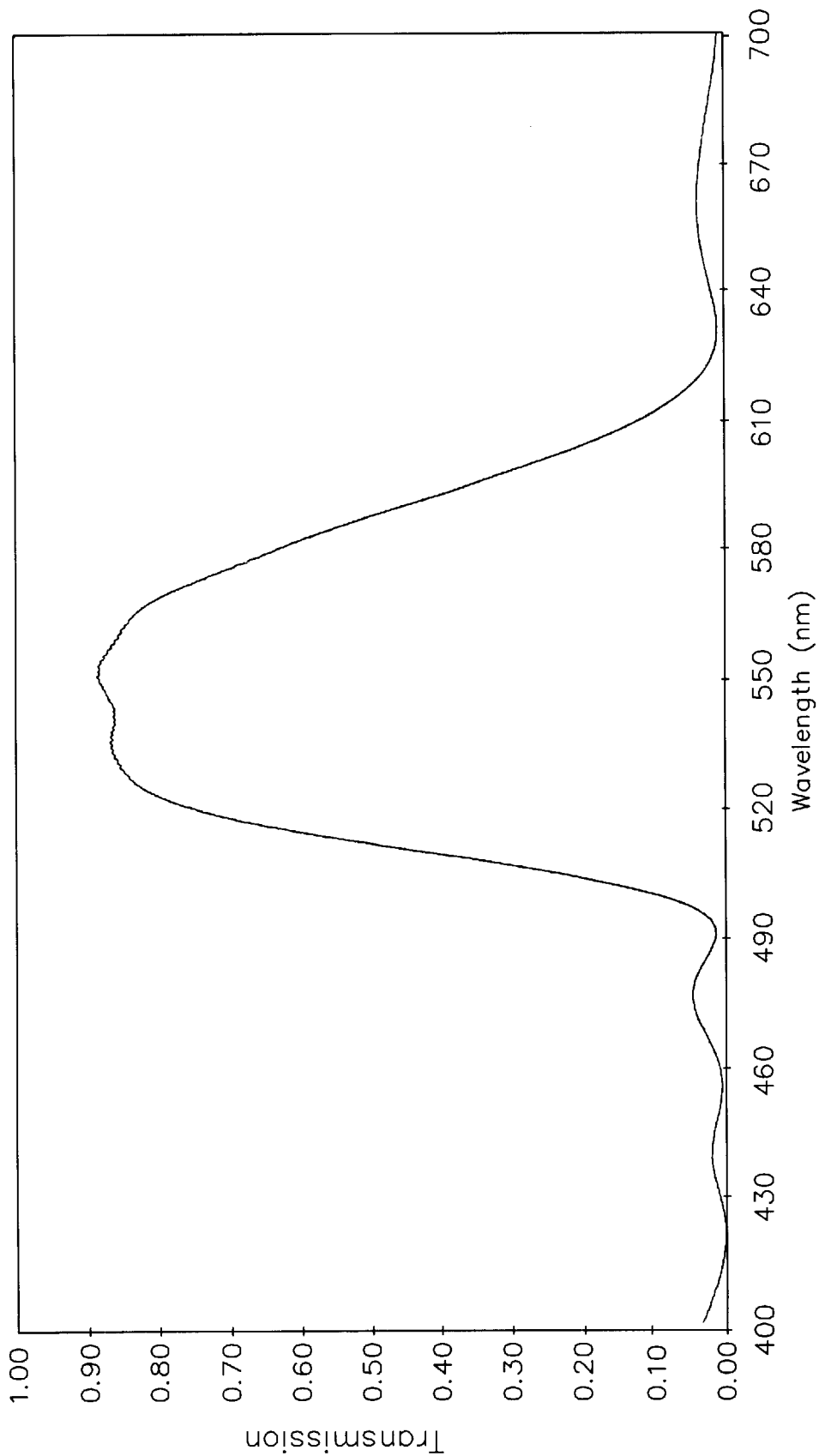
Figure 24C:
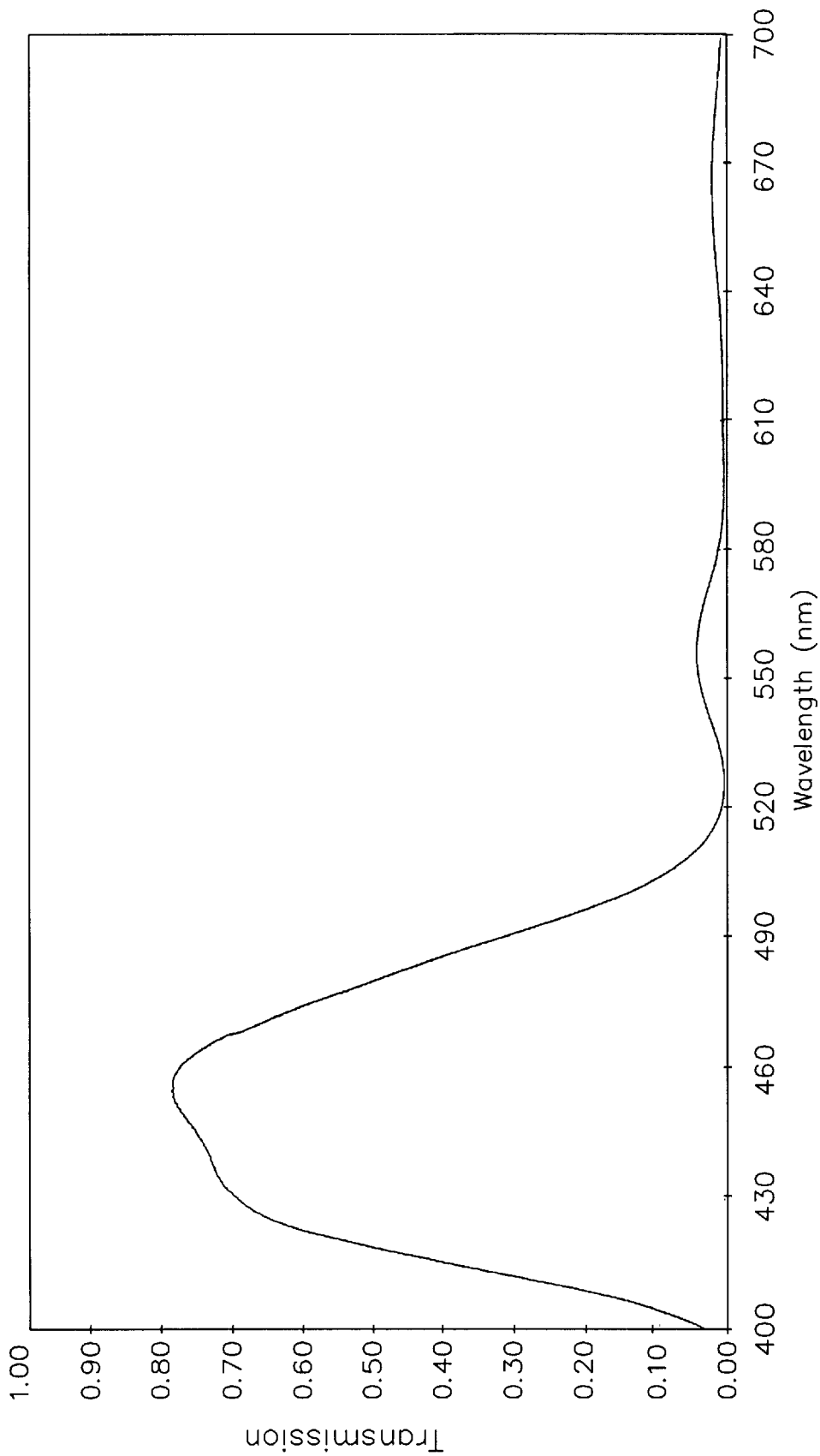

FIGS. 24A, 24B and 24C show the measured red, green and blue transmission spectra, respectively, for the fully assembled RGB CCS of FIG. 22A. The peak transmission for each spectrum shows losses associated only with the packaged RGB CCS. This includes substrates, retarder stacks, adhesives, ITO films, and LC films. AR coatings are provided on external surfaces, but the RGB CCS is packaged without the input and output polarizers.

Figure 25B:
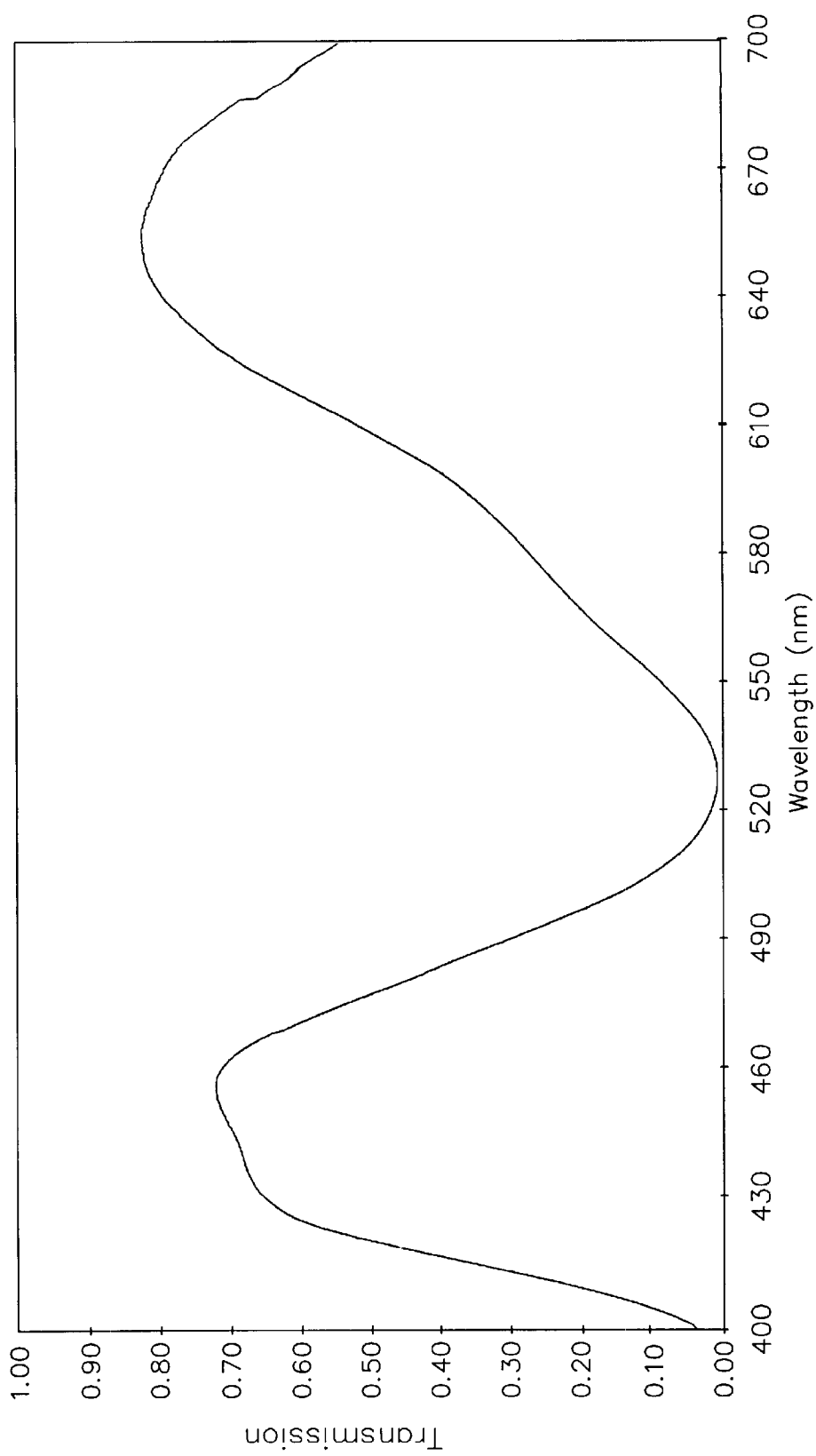
Figure 25C:
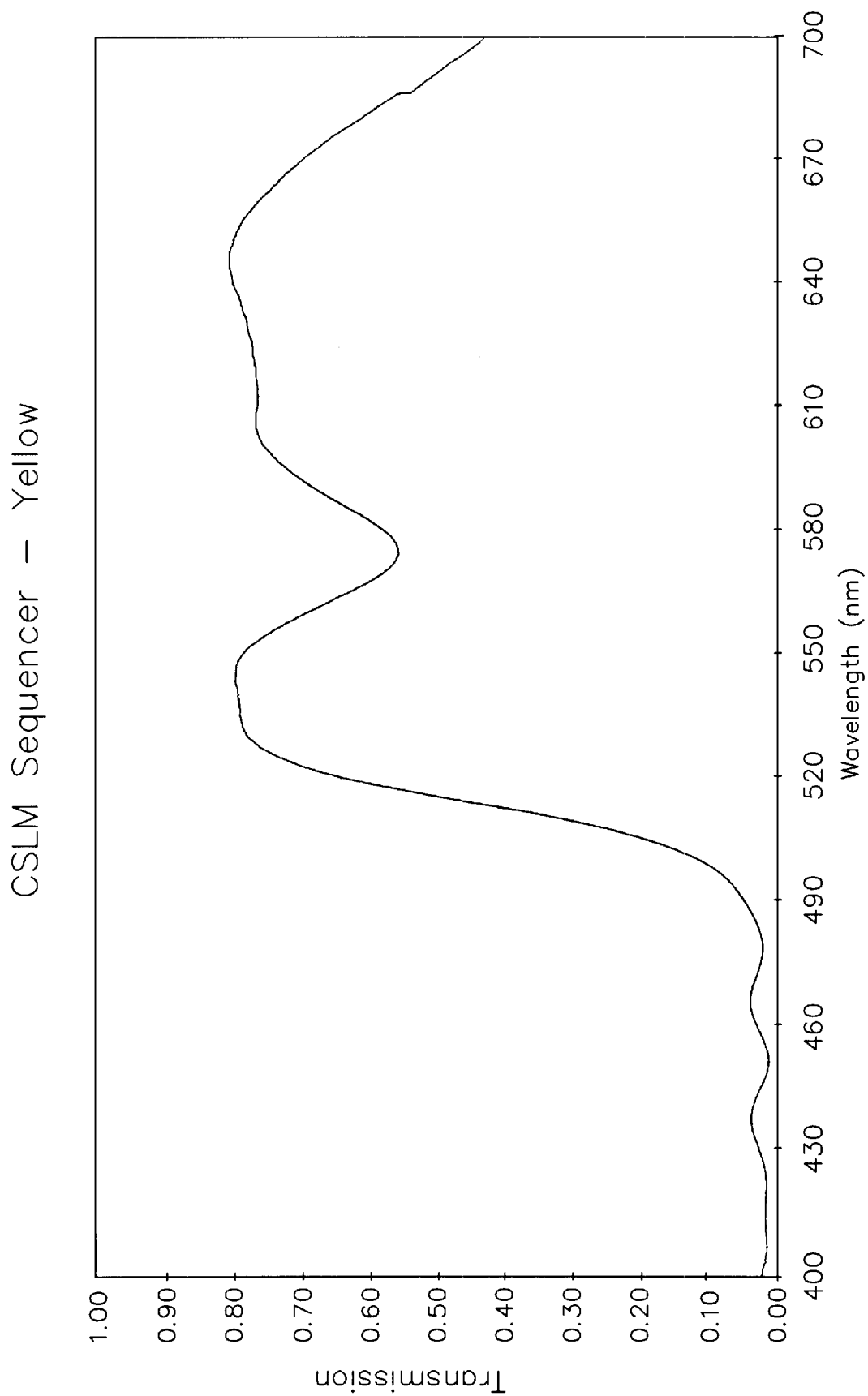
Figure 26A:
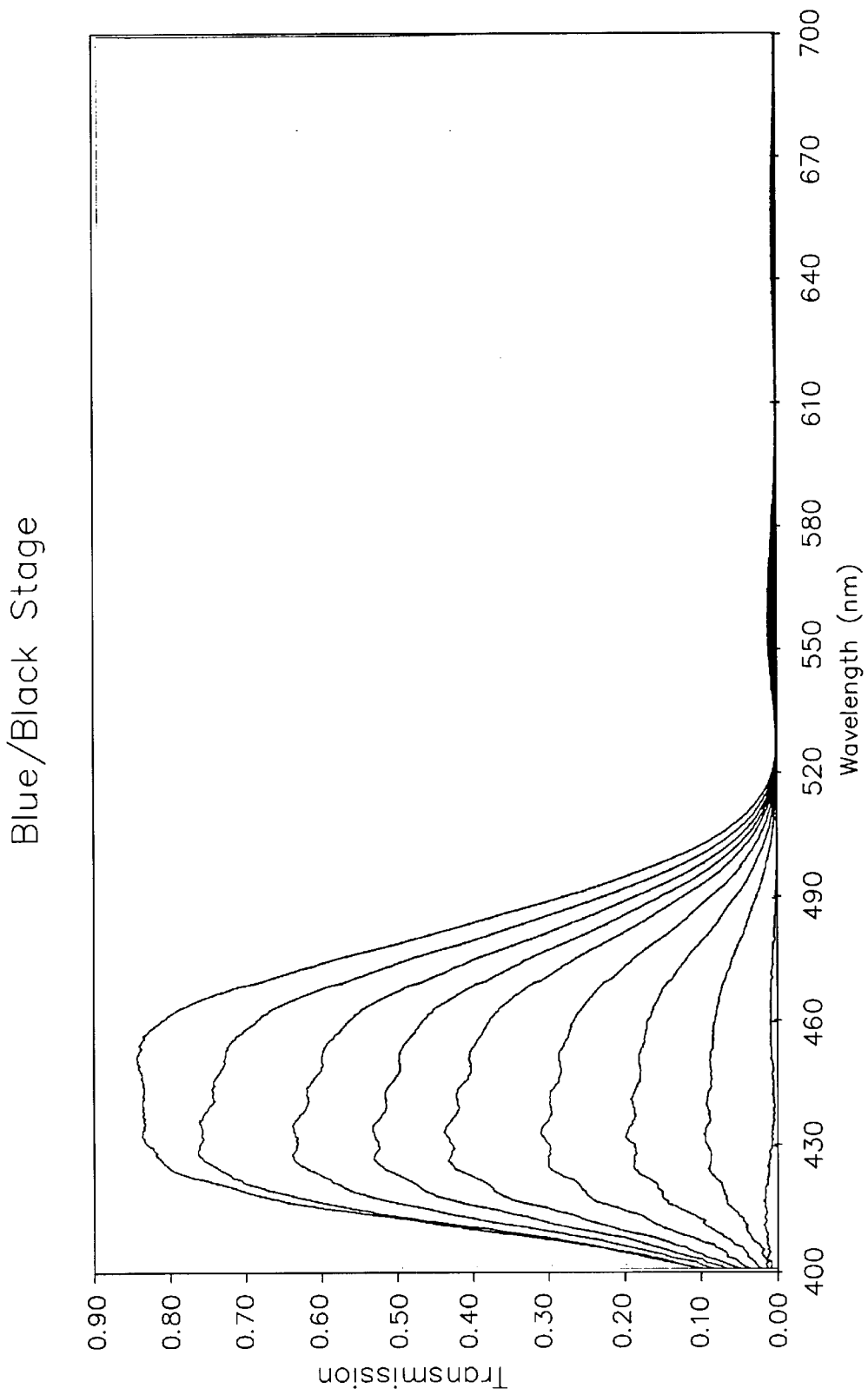
FIGS. 26A, 26B and 26C are plots of the measured outputs of blue, green, and red stages, respectively, before assembly into the CSLM color sequencers of FIG. 22A.
Figure 26B:
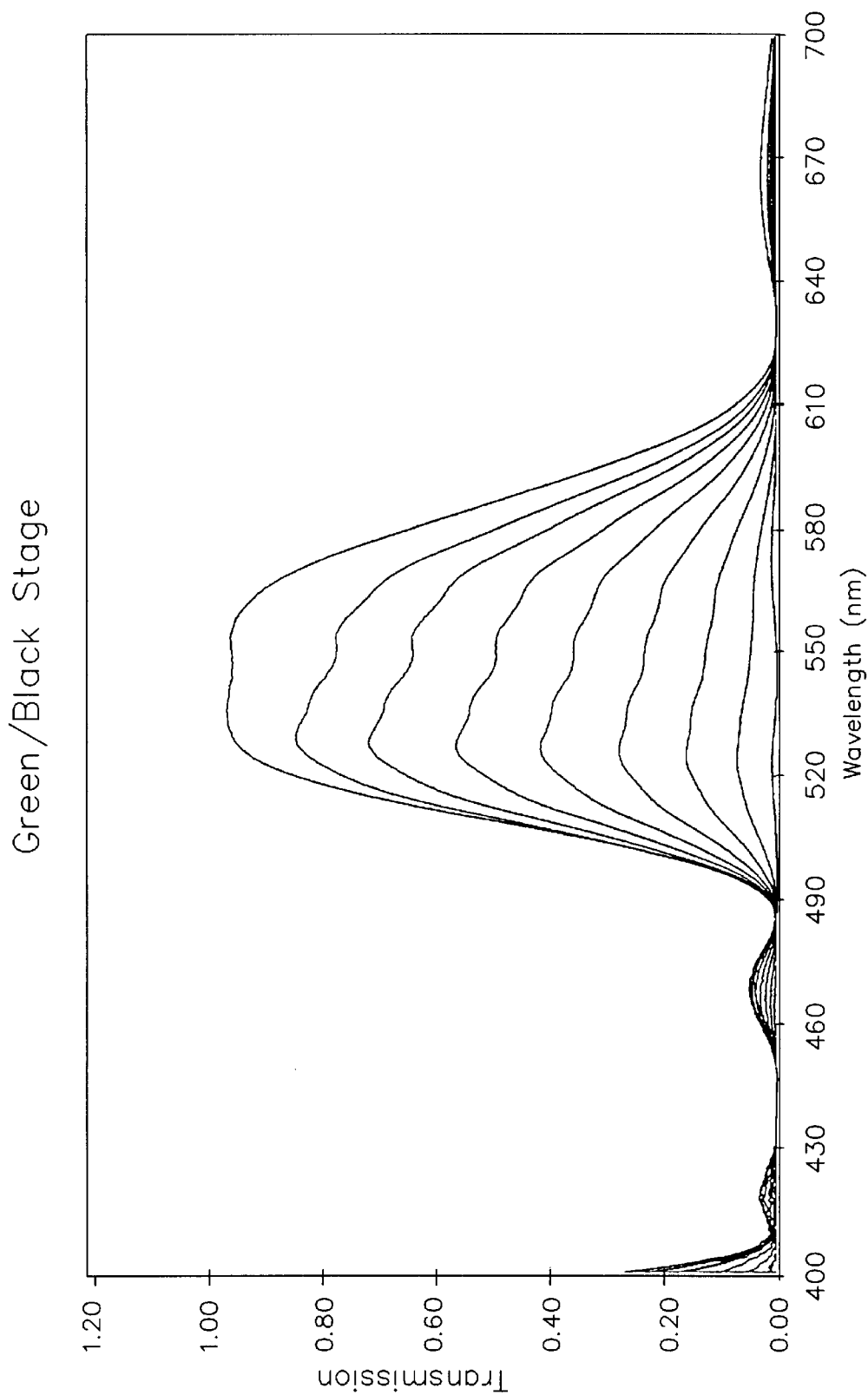
Figure 26C:
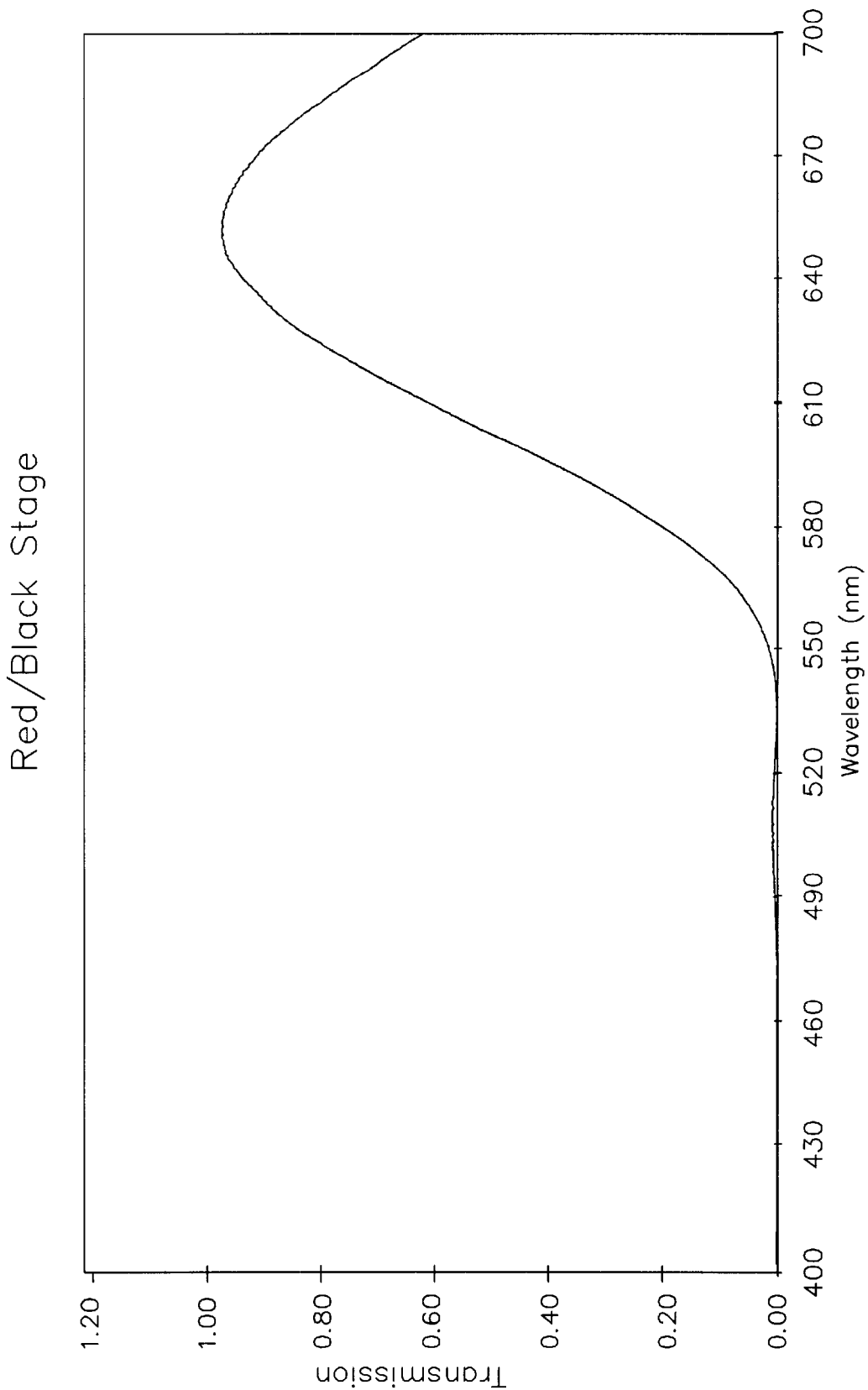

FIGS. 25A, 25B and 26C show additional measured cyan, magenta and yellow (MY) spectra that are also available with the RGB CCS of FIG. 22A. No attempt was made to optimize the MY spectra. Should more equal weighting be applied to the quality of the subtractive spectra, as opposed to considering the additive primaries only, adjustments can be made to improve the interaction between the stages.

While the CCS of FIGS. 22A and 22B can be operated in a cyclic R, G, B mode, which mimics the function of a rotating color filter wheel, it is capable of much more. For example, by changing the drive scheme, the viewing time for each primary (and white if appropriate) can be adjusted. More generally, within a single frame period, the number of viewings of each color, their duration, the order in which they are presented, and the transmission level are all arbitrary and electronically selectable. By driving the LC modulators 1480, 1510 and 1540 in an analog mode, arbitrary admixtures of the primary colors can be generated for color balance in sequential systems, or for color balance of a true white frame. FIGS. 26A, 26B and 26C show the measured output of the red stage 1440, green stage 1430 and blue stage 1420, respectively, before they were assembled into the CSLM color sequencer of FIG. 22A. FIGS. 26A and 26B show the measured output of the blue stage 1420, green stage 1430 and red stage 1440, respectively, at different modulator driving levels, i.e., driving their respective LC modulators 1480 and 1510 in an analog mode. As can be seen in FIGS. 26A and 26B, discrete transmission levels can be achieved, thereby allowing full modulation capabilities. Although not shown in FIG. 26C the red stage 1440 can be driven in a similar manner.

Transient Behavior of a Two-Polarizer CCS

Asymmetric rise/fall times characterize the switching of nematic LC devices. A sufficient electric field applied across an LC film, which opposes the elastic forces, reconfigures the molecular director distribution in approximately 50–100 microseconds. When the field is removed, there is a relatively slow (approximately 500 microseconds to more than 1 millisecond) relaxation to the original distribution. Because this restoration is not electric field assisted, improvements in the reset time are accomplished by modifying the cell geometry, the surface treatment and the physical properties of the LC fluid. Surface mode devices are attractive because they provide sub-millisecond relaxation to the half-wave state, where other LC effects are either significantly slower or require very thin cell gaps. Surface mode devices can be driven to zero retardance in roughly 50 microseconds without difficulty.

The transient behavior of the preferred CCS design takes advantage of this difference in switching speed to maintain color coordinates, thereby eliminating the tradeoff between view time and saturation. For most ZTN modulator devices, maximum retardation is provided in the undriven state, with nearly zero in-plane retardation in the driven state. In the context of the preferred CCS design, this allows one to drive from any filtered state to a black state very rapidly.

Figure 27:
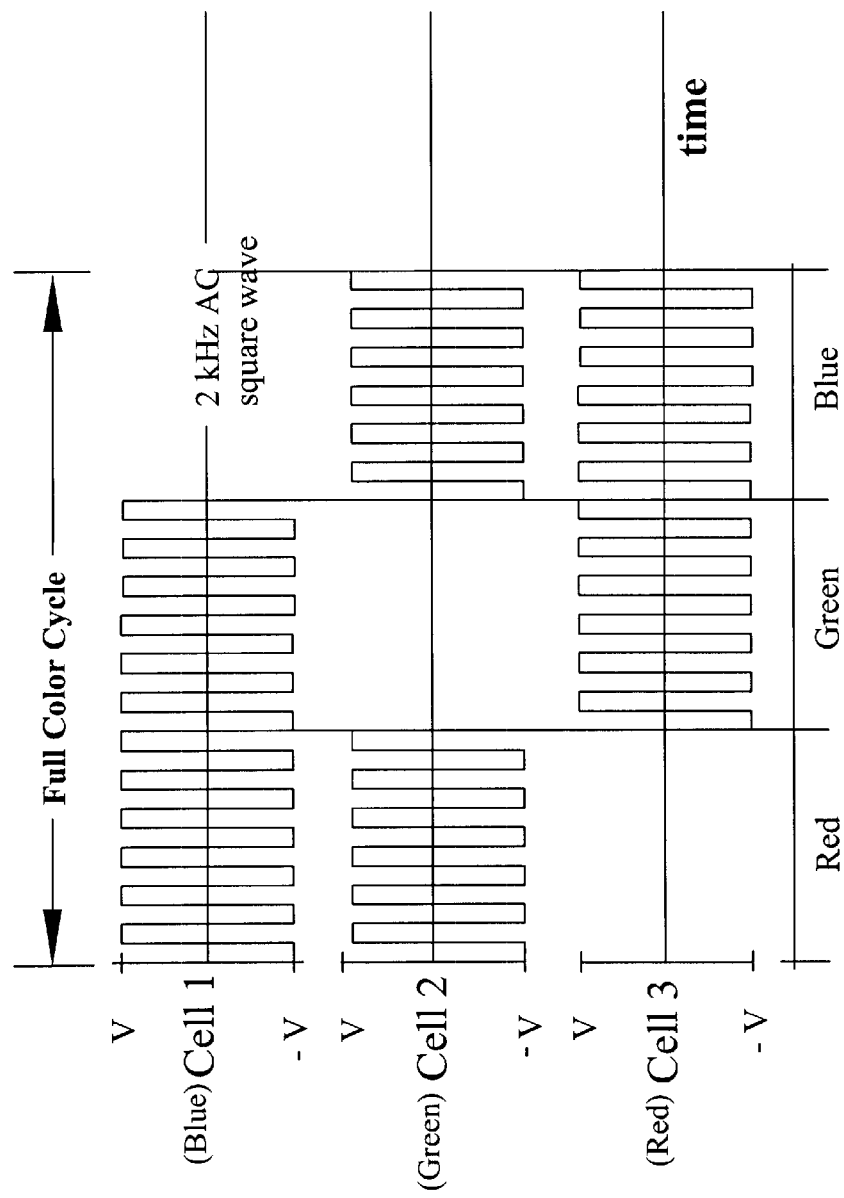
FIG. 27 shows a drive scheme for sequencing a full-color CSLM color sequencer through the additive primaries, in accordance with the present invention.

FIG. 27 shows one type of drive scheme that can be used for sequencing a full-color CSLM color sequencer to the additive primaries. The CSLM color sequencer is assumed to consist of three SO black stages with no internal polarizers. For the drive scheme shown in FIG. 27, the driven state is a two KHz square wave with sufficient amplitude to substantially eliminate the in-plane retardance of each cell. The on driven state is shown as zero volts which produces maximium switching (relaxation) speed to the fully transmitting state. It should be noted that this represents the behavior for a typical nematic LC cell, for which the molecules orient parallel to the electric field applied across transparent conductors. For example, a CSLM color sequencer based on homogeneous aligned ZTN cells driven in this mode typcially gives the fastest switching speed and the best field of view. Conversely, a zero volt transmitting state may not be appropriate for use with an LC cell in which the molecular director configuration does not stablize for the duration of the transmitting state.

Figure 28:
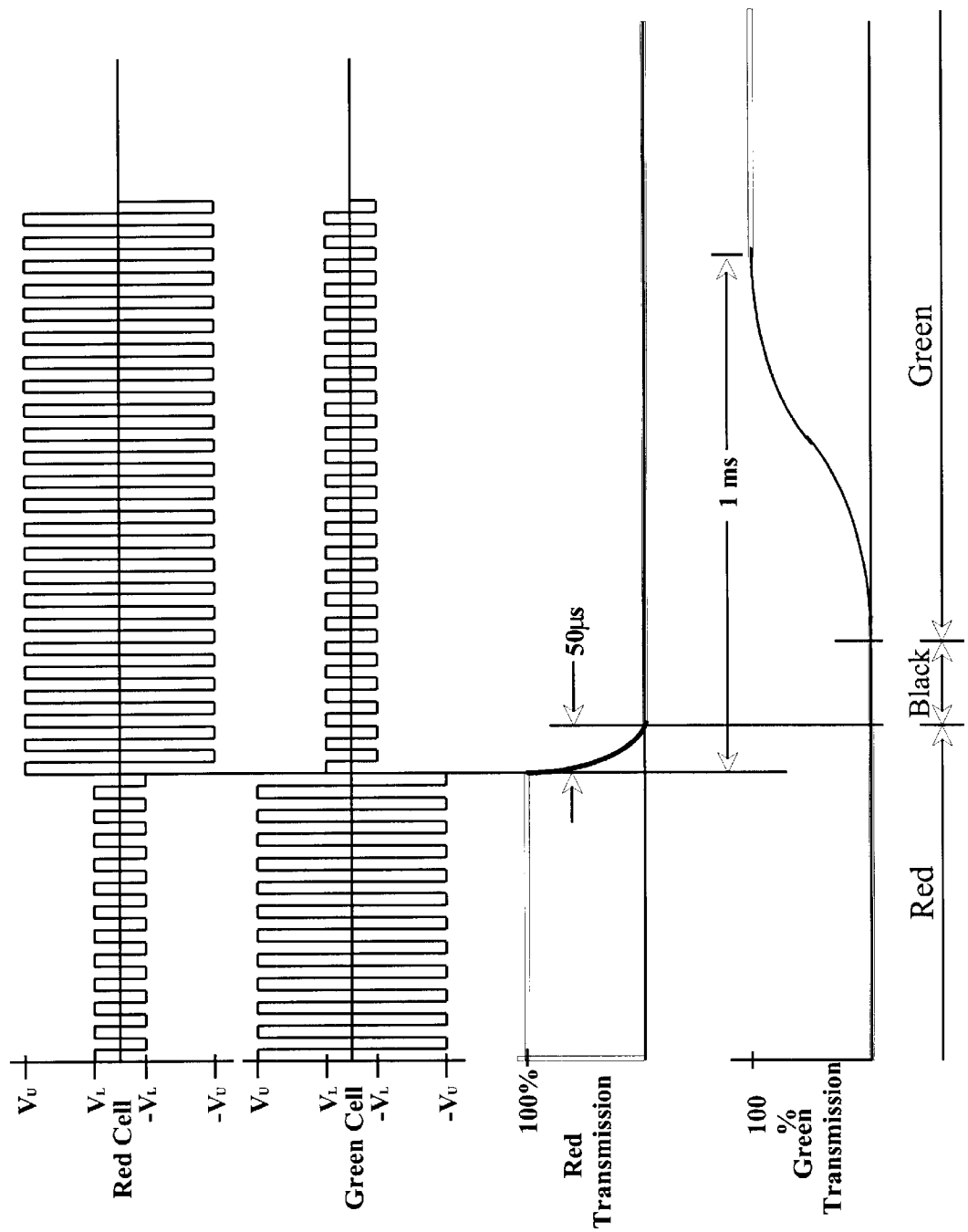
FIG. 28 shows electrical drive signals and corresponding optical transmission for two CSLM stages of the CSLM color sequencer of the present invention.

FIG. 28 shows the electrical drive signals and the corresponding optical transmission for two filter stages (red and green) during the transition between color states. As the stage corresponding to one primary color, e.g., green, is driven low, the modulator for the subsequent color, e.g., red, is driven high. In less than 50 microseconds, the CSLM color sequencer switches from red to black. Over the course of approximately 1 millisecond, the retardance of the green modulator increases, allowing green transmission to increase to 100%. During the time following the initial 50 microseconds, only the wavelength band established by the retarder stacks of the green stage is allowed to be transmitted, independent of the modulator retardance. As such, the color coordinate remains substantially constant as the transmission increases. It is only the relatively inconsequential chromatic behavior of the modulator over the additive primary band that can influence the color coordinate (at normal incidence). Using this scheme in a full-color sequential system, the CSLM color sequencer can be viewed continuously, without blanking the display, with no impact on color quality.

There are also display modes in which the one-millisecond transition to the 100% transmission state can be beneficially used. In pulse width modulated displays, the resolution can be limited by the luminance step of a single frame. This step is determined by the minimum view time of a single frame under full illumination. A method for increasing resolution is to insert one or more frames of imagery with reduced illumination level, thereby increasing the view time to a manageable duration.

If there is a throughput benefit in decreasing the transition time between colors, alternative drive schemes may be considered. In a two-polarizer CCS, the interval between the driven state (black mode) and the undriven state (filtered mode) can determine throughput if the display is relatively fast. It is important to reach a half-wave retardance in the center of the operating band as quickly as possible, and to maintain that retardance throughout the view time.

Typically, the retardance in the low-voltage state is maintained at a particular value with the use of a small (2–4 volt rms) holding voltage. However, the effect of a holding voltage is to reduce the relaxation time to the half-wave retardance state. For instance, a particular modulator was found to have a 1.2 ms relaxation time (1.2 ms to go from, 10% transmission to 90% transmission between crossed polarizers) when operated with a 3 V rms holding voltage. The holding voltage was selected to provide the desired half-wave retardance throughout the 5.6 ms view time.

Figure 29:
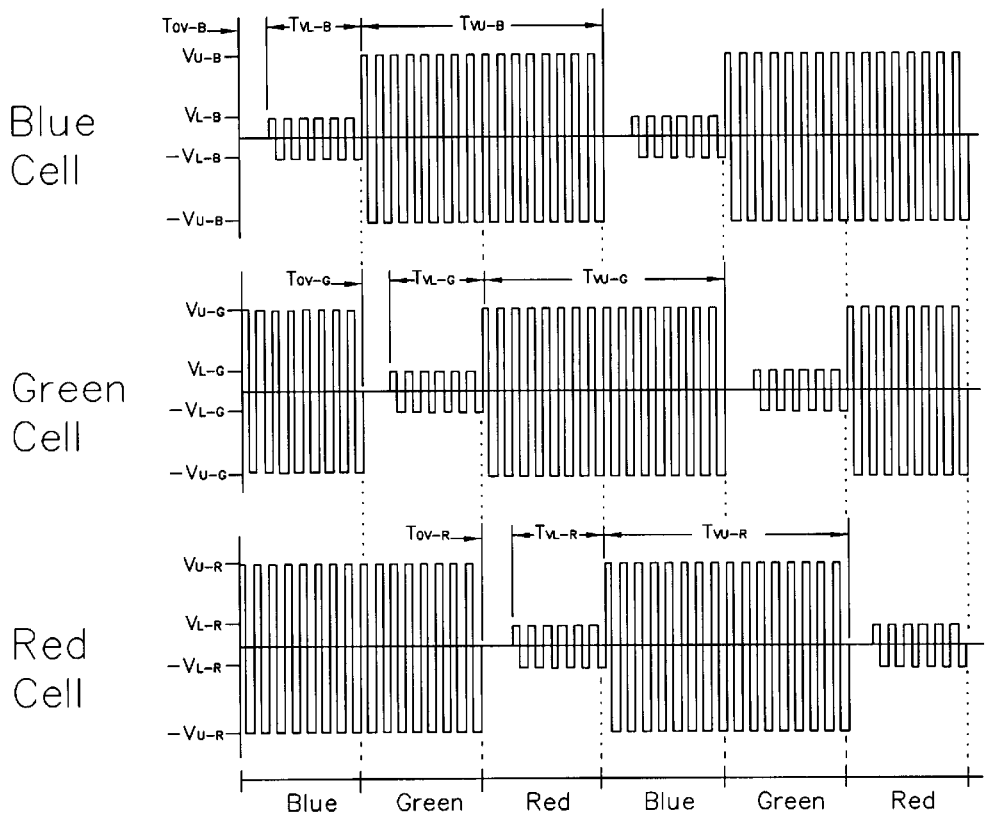
FIG. 29 shows a three-level drive scheme for the CSLM color sequencer of the present invention.

By using a three-level drive scheme, such as the one shown in FIG. 29, the relaxation time can be reduced. FIG. 29 shows the drive scheme for a CSLM color sequencer comprising red, green and blue CSLM stages. The voltages and drive times shown in the table are for a typical CSLM color sequencer operating at 180Hz at an operating temperature of 50° C.

Referring to the red cell driving scheme shown in FIG. 29 for illustration, the modulator in the red stage is initially switched from the maximum voltage state ($V_{U-R}$), which represents the off state, to a zero voltage state. The zero voltage state maximizes the relaxation to the half-wave state (decreases the turn-on time of the LC cell). After the desired retardance is achieved, the modulator can be driven with a small holding voltage ($\pm V_{L-R}$) for the remainder of the view time ($T_{\pm VL-R}$) in order to maintain that retardance. The result is a 0.6 ms switching speed, which corresponds to an increase in throughput over that obtained with a two-level drive scheme.

In the four-polarizer multi-stage CSLM, neutral polarizers are inserted between each stage. Because the polarization is analyzed after each stage, the overall transmission is the product of the power transmission function of each stage. For this reason, a white state must be common to every stage. Note that this is not the case if dye-based color polarizers are used rather than neutral polarizers. Unlike the two-polarizer case, cell chrominance of a stage in the white state does not effect the polarization introduced into other stages. This makes the filter less susceptible to color coordinate degradation from SA states and off-normal light. On the other hand, the addition of two polarizers does reduce overall throughput. Below we consider two four-polarizer examples; one using SO additive primary stages, the other using SO subtractive primary stages (or SA subtractive primary stages). We do not consider SA additive primary stages, due to the poor color coordinates obtained.

Four-Polarizer CCS: SO Additive Primary

Figure 30:
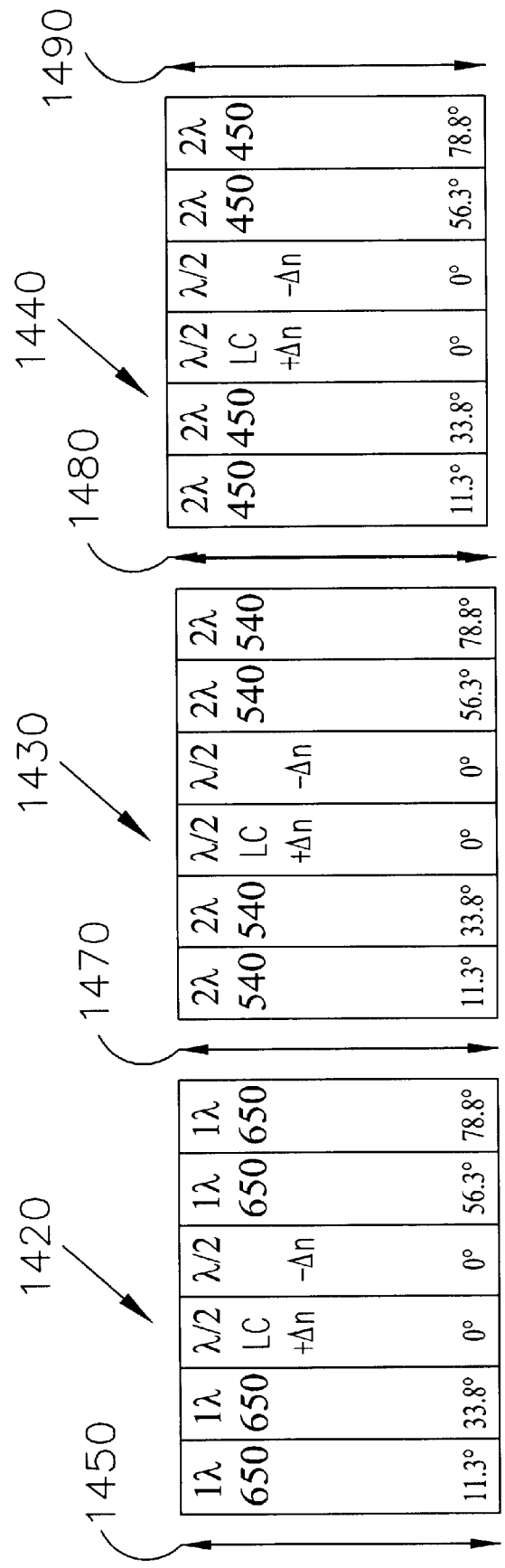
FIG. 30 shows a four-polarizer CSLM color sequencer with SO additive primary stages, in accordance with the present invention.

FIG. 30 shows a four-polarizer CCS with SO additive primary stages. The CCS comprises input polarizer 1450, red stage 1420, polarizer 1470, green stage 1430, polarizer 1480, blue stage 1440 and output polarizer 1490. In this embodiment, we again make generation of red, green, blue, and a high density black state the driving design objective, at the expense of the complementary states. The CCS is constructed using R/W, G/W and B/W SO additive primary stages. Because each stage has a SA white state with internal polarizers, we anticipate that the accumulation of the chromatic effects of the modulator will attenuate the white output. More importantly, because the filtering operation from each stage blocks two additive primaries, it is not feasible to generate the subtractive primaries at all using neutral polarizers. However, the stages are independent when additive primaries are generated, and it is possible to generate a high density black state. Thus, while this embodiment may not be preferred for subtractive display implementations, it can, for example, be used as a color sequencer.

Note that every primary color that is output is the product of the color generated by one stage, and the white state from the remaining stages. In order to provide high throughput in the presence of significant modulator chrominance, it is necessary to tune the white state to provide maximum transmission at the center wavelength of the selected color. This affects the design of the modulators, since the half-wave retardance must be sufficient to provide a white state at the longest wavelength primary color that it accommodates. For example, the blue and green stages must give a half-wave retardance in the red, while the red stage must provide a half-wave retardance in the green.

There are additional benefits of tuning the white state. One benefit is the additional blocking provided by the low contrast filtering operations. For instance, additional blue rejection occurs from blue and green stages with their white states tuned to a red peak transmission. Conversely, the white state can be used in an analog mode to control color balance. A particular output primary color is substantially modulated by each of the other stages. As such, tuning the "white" stages from SA to SO modulates the desired output primary color between full transmission and zero transmission.

FIG. 31 is a table that shows the results of tuning the white state and a four-polarizer CCS with SO additive primary stages. In case number 1, the white, the red and green stages are in the on-state and the white states are tuned to a blue peak transmission, and the blue stage is in the off-state. The output of the color sequencer in this state is blue.

In case number 2, the red and blue stages are in the on-state and their white states are tuned to a green peak transmission and the green stage is in the off-state. The output of the color sequencer in this state is green.

In case number 3, the green and blue stages are in the on-state and their white states are tuned to a red peak transmission, and the red stage is in the off-state. The output of the color sequencer in this state is red.

In case number 4, all three stages are in the off-state, and the output of the color sequencer is black. The black output in this state is high density because of the filtering operation from each stage blocks two additive primaries. Thus, there is blocking redundancy.

Cases 5–7 illustrate that it is not feasible to generate the subtractive primaries using neutral polarizers. As discussed above, the white output generated by case number 8 is glossy because of the accumulation of the chromatic effects the modulator in each stage.

Another benefit of using SO additive primaries is that it is possible to generate a high density black state. Because each filtered state effectively blocks two additive primaries, there is a great deal of redundancy when each stage is in the SO mode. In fact, each additive primary band is blocked by two stages. If the modulators are implemented with nematic LCs, which have asymmetric switching rates, the beneficial transient behavior discussed above in connection with the two-polarizer CCS is exhibited. Specifically, the CCS can be driven rapidly to black, and the independence of stages provides high quality color coordinates during relaxation. Unlike the two-polarizer case, all three stages simultaneously generate additive primaries during the black output. The transmitted color is therefore determined by which combination of stages are switched to the white state. It is only the distortion of the transmission band caused by the evolution of the white states that can effect the color coordinate.

Four-Polarizer CCS: SO White

If the objective is to generate subtractive primaries, as is the case for certain electronic camera applications, the opposite of the above design considerations is true, except when a high density black state is also required. With parallel polarizers, cyan, magenta and yellow are generated independently by each of the three stages, and white can, in principle, be substantially lossless. However, the difficulty in obtaining a high density black state subtractively persists. Specifically, generation of the black state requires the cooperative action of C, M, and Y stages to achieve acceptable density. Even when cooperation between stages is optimized, the density of the black state is relatively poor. As such, the additive approach to producing subtractive primaries is usually preferred when a high density black state is required.

In this case, we obtain a CCS with behavior much like the two-polarizer SO subtractive primary CCS. Because each modulator modulates only one additive primary, the four-polarizer CCS can operate in either a SO subtractive or SO white mode with little difference in performance. The four-polarizer CCS is also suitable for implementing subtractive three-panel display systems.

Because the chromatic effects of the modulator are not significant, a high transmission white state can be generated in either SO subtractive primary or SO white modes. This eliminates the need to tune a chromatic white state. Using this design scheme, high quality subtractive primaries can be generated as well. However, the additive primaries can suffer from non-ideal cooperation between stages. The symptoms are much like those found in the two-polarizer CCS, including a true cyan side lobe in the red output, a true yellow side-lobe in the blue output, and a black state with relatively poor density. However, the exact behavior is different because the output in the four-polarizer CCS is the product of the transmission function of each stage. This means, for example, that stages cannot interact to improve rejection in the interprimary bands.

Figure 32:
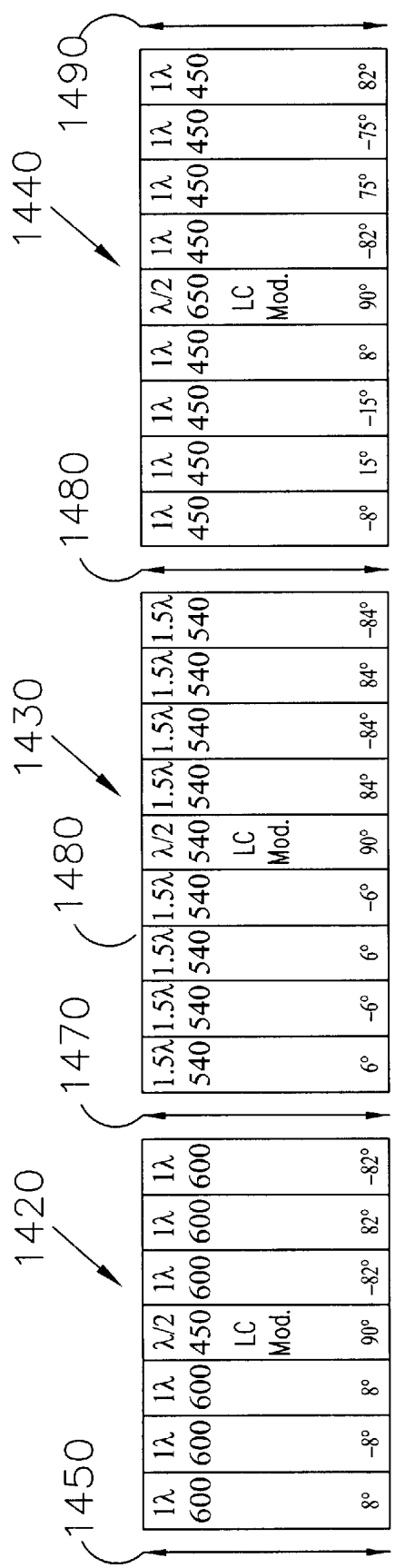
FIG. 32 shows a four-polarizer CSLM color sequencer that generates a SO white state, in accordance with the present invention.

FIG. 32 shows a four-polarizer CCS that generates a SO white state. The CCS comprises an input polarizer 1450, a red a stage 1420, polarizer 1470, green stage 1430, polarizer 1480, blue stage 1440 and output polarizer 1490.

Field of View

Selection of the modulator and the CSLM configuration is typically influenced by the field of view (FOV) requirement for a particular application. The FOV requirement can have a significant influence on the CSLM design and the modulator selection. In complementary color polarizer based systems, such as polarizer retarder stack (PRS), approximately equal weight is assigned to the FOV of the two voltage states, because both voltage states have a role in generating filtered spectra. Conversely, a system based on white/primary CSLMs permits unequal weights to be assigned to the voltage states. Specifically, a CSLM stage can be biased to generate a fixed color coordinate at large incidence angles in the filtered state, at the expense of the viewing angle in the white state. This design works best when a polarizer separates each stage, because such stages interact on a power transmission basis.

A benefit of the CSLM's of the present invention is that the modulator retardance does not represent a color shift. This is because, the transition bandwidths are defined by the retarder stacks and are independent of the state of the modulator. The modulator functions as a valve that determines the extent to which the spectral window established by the passive retarder stacks is filled.

Wide FOV Four-Polarizer RGB CSLM

Consider a four-polarizer three-color CSLM designed to give maximum FOV, as is required for sequential electronic camera applications. For this type of application, the switching speed is not critical, but a fixed color coordinate is desirable. Consider a CSLM structure that utilizes antiparallel aligned ZTN modulators. An anti-parallel aligned nematic LC cell gives a large field of view in the undriven state, because it consists only of a zero-order uniaxial in-plane half-wave retardance. Accordingly, there is no first-order shift in retardance with off-normal angles. Conversely, the driven state has a z-dependent director distribution that is not self-compensating. As such, the LC cell provides better FOV performance in the undriven state when uncompensated.

As discussed above, an RGB four-polarizer CSLM gives the best color coordinates using the SO filtered mode. Using an antiparallel nematic LC cell for the modulator means that the filtered output is assigned to the driven state, which has an inferior FOV. This problem can be solved by passively inverting the states. This is preferably accomplished by combining a negative birefringence in-plane uniaxial retarder film with the antiparallel nematic LC cell. The negative birefringence in-plane uniaxial retarder film is suitably polystyrene (Y. Fujimura et al., SID 92 Digest, p.397) or a styrene derivative (U.S. Pat. No. 5,430,565). It could also be a preimidized polyamide or a liquid crystal polymer (H. Mori et al., European SID 97, M88). These references are incorporated by reference herein in their entirety.

A negative birefringence uniaxial in-plane half-wave retarder film oriented parallel to the antiparallel nematic half-wave retarder optic axis gives zero net retardance, as long as the dispersions are matched. Furthermore, the compound structure maintains zero retardance to very large angles of incidence and for all azimuths. Thus, the undriven state is converted from a half-wave retarder, with some sensitivity to incidence angle, to a zero-retardance that is substantially less sensitive to incidence angle. This gives the desired preference to the quality of the undriven state for the filtering operation.

Using this configuration, the color coordinate established by a stage in the filtering state is only marginally affected by the quality of the white states generated by the other stages. It is only the chrominance of the white states within the primary band that can shift the color coordinate. The effect is mainly to reduce the transmission of the primary, as the retardance shifts away from the half-wave retardance at the center of the band. This shift is enhanced by the relatively poor FOV of the driven state, in addition to the zero-order in-plane half-wave retardance from the film. In most cases, the associated loss in efficiency is much less objectionable than a color shift.

Figure 33:
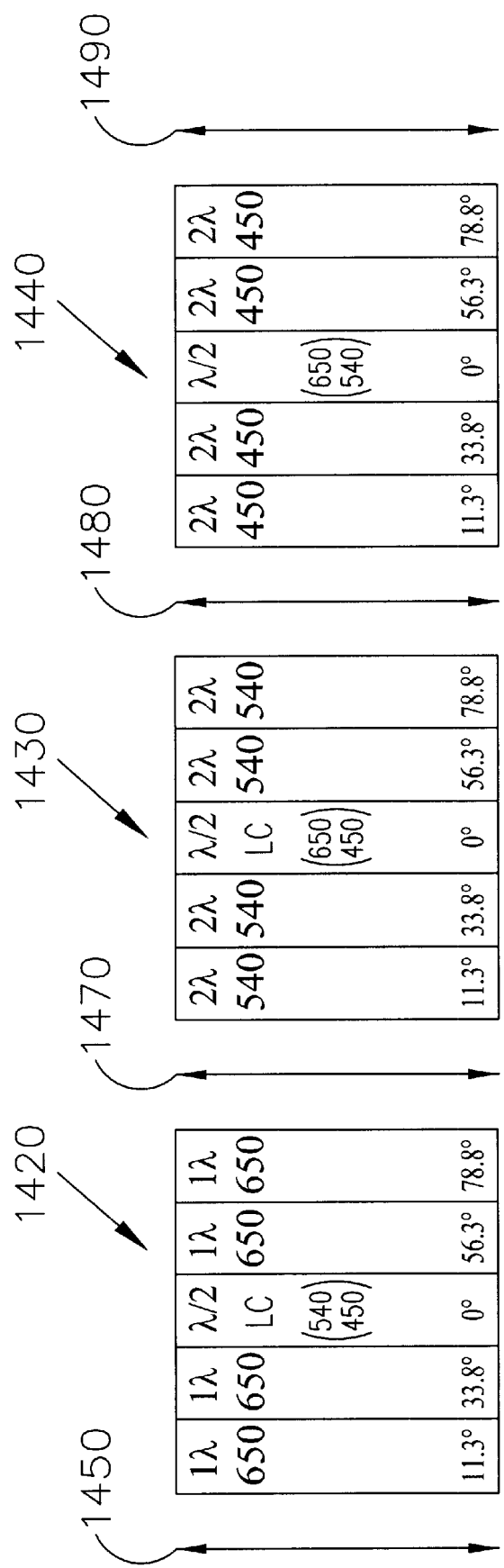
FIG. 33 shows a wide field of view four-polarizer RGB CSLM that utilizes an SO additive primary design, in accordance with the present invention.

FIG. 33 shows a wide field of view four-polarizer RGB CSLM that utilizes an SO additive primary design. The CSLM comprises input polarizer 1450, red stage 1420, polarizer 1470, green stage 1430, polarizer 1480, blue stage 1440 and output polarizer 1490.

CSLM Materials (A) Retarder Stacks

The retarder stacks can in principle be constructed of any transparent material that imparts differing optical path lengths to orthogonal polarizations. The typical range for color generation is 0.5–2.5 waves of visible retardance Other desirable characteristics include low-cost, large area, uniform, thin, and durable under high illumination levels and harsh environments. Potential linear retarder technologies include form-birefringence structures, crystalline retarders, stretched polymer retarder sheets, and liquid crystal polymer films.

Form birefringence devices are based on periodic structures with features smaller than a wavelength. A grating with sufficiently high spatial frequency, for instance, does not diffract light from the zero order, and has optically distinct path lengths parallel and perpendicular to the grooves.

Conventional crystalline retarder materials, such as quartz, mica and calcite, are well suited to applications requiring higher resolution than is feasible with polymer films. They are also useful for applications requiring low wavefront distortion and/or high power handling requirements. They are more expensive than polymer retarders and do not lend themselves to large area, particularly when low retardances are required.

Polymers are chemical compounds or mixtures of compounds consisting of repeating structural units formed by a chemical reaction, where two or more small molecules combine to form larger molecules. Retarders can be formed using sheets of oriented organic polymers. By unidirectional or bidirectional stretching of polymer films at elevated temperatures, a linear birefringence can be induced. For most materials, such as polyvinyl alcohol or polycarbonate, the refractive index increases in the direction of the stretch, typically forming a positive in-plane uniaxial retarder. Materials such as polystyrene, and styrene derivatives give a negative in-plane birefringence after stretching, as described in U.S. Pat. No. 5,430,565, which is herein incorporated by reference in its entirety. Such materials are useful for producing wide-view angle CSLM structures. Retardation films exhibiting fixed retardation with off-normal view angles are produced using one of two techniques, biaxial stretching or compound retarders. The combination of a positive uniaxial film crossed with a negative uniaxial film of equal retardation results in a compound retarder with an isotropic, angle-insensitive retardation, as described in U.S. Pat. No. 5,138,474, which is herein incorporated by reference in its entirety.

As an alternative, a single layer biaxial film with wide view angle can be fabricated using stretching along both x and z, as described in U.S. Pat. No. 5,245,456, U.S. Pat. No. 5,472,538, and U.S. Pat. No. 5,559,618, which are all herein incorporated by reference in their entirety. Such stretching can produce a biaxial film with a z direction refractive index that is substantially intermediate between the in-plane refractive indexes. This single film behaves much like the two-layer film in providing a large isotropic view angle.

Stretched polymer films are available in arbitrary retardances topically from 0–2,000 nm, using a variety of materials with unique birefringence dispersion characteristics. Large sheets can be purchased at low cost, permitting large clear aperture filters. Polycarbonate is the most common material for display applications and is available from vendors such as Nitto Denko, Sumitomo, and Sanritz. Other materials, such as poly-vinyl alcohol, can be purchased from Polaroid, Polarvision, Inc., and International Polarizer. High dispersion materials, such as polysulphone and polyarylate films, are available from Nitto Denko and Sumitomo. Several other polymer materials are potentially useful in producing stacks including, but not limited to, mylar, polyamide, polypropylene, polyethylene terapthalate, triacetate (tri-butyl-acetate), polytetrafluoroethylene, and polymethylmethacrylate.

As discussed above, spatially patterned CSLM structures, as for color filter arrays, can be implemented using spatially patterned polymer retarders. In this case, a film with a spatially patterned retardation replaces or works in concert with the active LC element. Such patterned retarder films can be fabricated by locally stressing an isotropic polymer film. Half-wave retarder stripes can be patterned on an isotropic substrate by locally stressing a film.

Liquid Crystal Polymers (LCP) are a class of polymers wherein liquid crystal monomers are incorporated into the macromolecular structure along the mainchain (backbone) or as side chain units. LCP's can be aligned by either mechanically rubbed surfaces, shearing, or by optical means. Optical methods involve first applying either linear photo-polymerizable (LPP) films or azo-based dyes in a polymer alignment layer.

If LPP films are used, (see Schadt, et al, Jpn. J. Appl. Phys. Vol. 34, pg. 3240–3249, 1995, which is incorporated by reference herein in its entirety), the LPP materials are deposited on a substrate and then cured at an elevated temperature. The cured film is then subjected to polarized UV light. LCPs are then spun-on or coated onto the same substrate, and aligned with the orientation of the LPP film. The LCPs are then cross-linked by exposure to unpolarized UV light.

If azo-based dyes are used, (see Shannon et al, Nature, vol. 368, pg. 532–533, 1994, which is incorporated by reference herein in its entirety), azo-dye molecules are intercalated into the polyimide alignment layer (or layers), which are deposited onto various substrates, e.g., glass, silicon, or others. A liquid crystalline monomer or polymer is either deposited onto one substrate, or sandwiched in between two substrates. The LC molecular director orients perpendicular to the direction of the polarized UV light which previously illuminated the alignment layer. Subsequent exposure will reorient the liquid crystals, which may be disadvantageous for some applications.

Liquid crystal polymer films, particularly UV cross-linkable polymer nematic retarders, are particularly suitable for forming retarder stacks. An attractive feature is the ability to produce thin retarders, since the material can have high birefringence relative to stretched materials. This can permit the fabrication of multi-layer retarder stacks on a single substrate, such as the polarizer substrate, with low cost. Because the films can be patterned at arbitrary angles, there is no waste, as is the case when cutting stretched polymer films at angles. Each LCP layer can essentially be bonded to the previous layer, avoiding the need for applying pressure sensitive adhesives to each film. In addition, LCPs are conducive to forming complex impulse response retarder stacks, because the retardation of each LCP layer is arbitrary. Such a capability increases the degrees of freedom, which results in greater design options. Conversely, there are significant cost pressures to minimize the number of unique retardation values in each retarder stack when using stretched polymer films.

The retarder stacks discussed above preferably comprise discrete retarder layers with specific orientations and retardance values. However, continuous retarder "stacks" or structures can be fabricated using layers of LCP with twisted structures. Thus, the retarder stack is not limited to a discrete number of individual zero-twist (linear) retarders. By selecting film thickness, birefringence, and the orientation of molecules at the boundary of each surface, films self-assemble into continuous retarder structures. Thin glassy films can be formed on a substrate using LCP materials. Such films are equivalent to a large number of very thin individual linear retarders, but avoids the need to physically stack individual retarder layers. Other color options are available by stacking twisted LCP layers or twisted and zero-twist LCP layers. Accordingly, when retarder stacks are described herein as being made up of "individual retarders", it should be understood that this refers to either the use of discrete retarder layers or the use of an equivalent continuous retarder stack or structure.

Currently available LCP materials have a positive anisotropy. In order to produce a wide view angle LCP, a biaxial retarder is required. A single film would require a true biaxial LCP (see P. Bladon et al., Macromolecules, 25, 4329 (1992), which is incorporated by reference herein in its entirety). An alternative is a two-layer compound retarder containing positive and negative birefringence LCPs. Yet another alternative is to take advantage of the out-of-plane tilt achievable with photoaligned LCP. By providing two identical parallel oriented LCP films with equal and opposite out-of-plane tilt angle, a compound retarder is formed with a view angle that is controlled by the tilt angle. At roughly 34-degrees, the off-normal dependence of retardation can be made to vanish in the plane containing the optic axis.

Because LCPs can be photoaligned, a spatially varying orientation, both in-plane and normal to the surface, can be achieved by photo-patterning. This is done using standard lithographic techniques. As such, spatially patterned versions of CSLM structures can be produced that behave as color filter arrays. Here, the active modulator of a CSLM is replaced by a spatially patterned LCP retarder that locally determines the transmitted color. In addition, hybrid structures using both spatially-switched and actively-switched layers can be incorporated. In one embodiment, patterned retarders are used in series with the active modulator, so that modulation between fixed spatial patterns can be accomplished using an LC modulator device with unpatterned electrodes.

Other LCP materials are potentially useful for either retarder stack materials or for increasing the view angle. Discotic LCPs from Fuji and Nippon Oil Company are negative birefringence materials fabricated on a CTA substrate (see H. Mori, Jpn. J. Appl. Phys., 36, 1068, (1997), which is incorporated by reference herein in its entirety). Some of the Discotic LCPs have the unique property that the optic axis has a splayed orientation that approximates that of the active modulator. This is quite useful for compensating the select state of, for instance, a TN device.

Other useful materials for increasing view angle are negative birefringent films with optic axes oriented along z. For instance, the cellulose triacitate (CTA) substrate of typical iodine display polarizers has 40–70 nm of retardance normal to the substrate on either side of the polarizer. Larger retardances can be obtained by biaxial stretching of polymers, such as polycarbonate Nitto Denko and Sumitomo). Typically, such films exhibit a small positive in-plane retardation. Other materials, such as preimidized polyamide, are negative birefringent materials that align with their optic axis normal to the substrate, giving zero in-plane retardance.

Multiple films of negative birefringent film can be combined to form a composite structure that can fully compensate one state of the LC modulator. Preferred LC modulators, such as the pi-cell, are those in which the passive structure improves the view angle of both the select and non-select states. Often, however, compensation improves field of view of one state at the expense of the other. This represents an advantage of CSLM structures, because the state providing the largest view angle can be assigned to the filtered state. The compromised state is thus the neutral state, which can be made to have little influence on the color coordinate.

(B) Polarizers

In the embodiments described and shown, the CSLM is illustrated with linear polarizers. In general, they can be linear, circular or elliptical polarizers. They can be neutral, or can exploit a wavelength-dependent polarization. Polarizer materials are available in a number of forms, the selection of which depends upon the application requirements. Suitable polarizers include absorption-based (e.g., crystal dichroism, long chain molecules of dye or iodine and oriented metal particles (Polarcor product, Corning, Inc.)), polymer multilayers (e.g., DBEF product, 3M, Inc.), birefringent (e.g., calcite or quartz-based Ahrens, Wollaston, Rochon, Nicol, or Glan polarizers) scatter polarizers using rough surfaces (Yamaguti) or LC in a polymer matrix, reflection (e.g., cholesteric LC, multilayers on 45-degree prisms, coated prismatic) and periodic structures (e.g., coated gratings, slits, wires, or oriented silver or copper particles (Polarcor product, Corning Inc.)).

Dichroic sheet polarizers are thin, low cost, large area, are easily integrated, and can perform well at large angles. High efficiency iodine polarizers, such as Nitto Denko EG1225 are appropriate for low power applications. Durable high luminance polarizer films for projection are typically based on dye-stuff (e.g., Polatechno and Polaroid KE product), with reduced throughput (84%). For normal incidence, the polarizer density need not be dramatically higher than is theoretically feasible based on side-lobe leakages from the retarder stack. As such, density can be traded for increased throughput if the polarizer technology permits.

In wide view-angle applications, polarizer FOV must be considered. Light leakages in the $\pm\pi/4$ azimuths, relative to the polarizer axis, are most pronounced. Due to geometrical effects, crossed polarizers cease to appear crossed in these azimuths at off-normal incidence. In addition, substrate retardance can contribute to a loss in density. Based on these considerations, polarizers such as HN22 (Polaroid), which exhibit high density and use a cellulose acetate butyrate (CAB) substrate, are preferred for large incidence angles. Methods for compensating geometrical effects and substrate retardance effects can also be implemented (see J. Chen et al., SID '98 Digest, 315–318, which is incorporated by reference herein in its entirety).

(C) Fabrication Methods and Techniques

CSLM structures can be fabricated using techniques that are standard to the industry. Liquid crystal cells (polarization modulators) are preferably fabricated using float glass or borosilicate glass panels, though plastic cells are also suitable. Borosilicate, such as Corning 7059, provides higher transmission than certain float glasses. The glass is coated with a transparent conductor for addressing the liquid crystal. A good conductor is indium tin oxide (ITO), typically with a resistivity of 100–1,000 $\Omega/cm^2$. By coating oxide films between the glass and the ITO, such as $Ta_2O_5/MgF_2$/ITO, reflection losses can be minimized. In so doing, modulator transmission can be increased by several percent, often yielding upwards of 99% transmission.

An alignment layer is coated on the transparent conductor for orienting the LC film. Standard materials are polymides, such as those from Nissan Chemical, though photoalignment materials (LPP) can also be used. The former is mechanically rubbed after processing, while the latter is exposed to UV light.

An adhesive gasket is dispensed or screen printed, typically with a 0.5–1.5 mm width around the perimeter of the cell, leaving a small fill hole. The glass substrates are mated and the adhesive is cured under pressure using either UV light, temperature, or a sequence of both. Spacers of glass rods, spheres, or flexible polymer balls are used to determine the spacing between conductors. Requirements for spacer density depend upon uniformity requirements, glass thickness/flatness, aperture size, and liquid crystal EO effect. Subsequently, the panel is broken into sticks for filling. The liquid crystal material is back-filled in the space between the conductors, and aligns according to the surface treatment used. In some cases, a filled part undergoes a post processing step to improve uniformity. The fill hole is then plugged using an adhesive. Contact is made to the ITO along one or two edges (depending upon whether cross-over dots are used). Conductors typically include pins or soldered wires.

Preferred retarder stacks are constructed from biaxial polycarbonate films and, when needed, neutral polarizer films. Typically, vendors supply both polarizer and retarder materials, and are therefore capable of building the complete retarder stack. Using pressure sensitive adhesives (PSAs), the complete retarder stack can be laminated together into a single unit, which is supplied with a protective layer on the polarizer and a release sheet on the retarder PSA. The retarder stacks can also be supplied die-cut to the appropriate product size.

Retarder stacks can be applied to the external surfaces of the LC modulator using the PSA, forming a single CSLM stage. Multiple stage CSLMs can be fabricated by cementing the stages together using standard materials. These includes UV, thermal, pressure cure epoxies, RTVs, and an adhesive gasket material with a back-filled index matching material. Should plastic LC devices be used for the modulator, the entire CSLM can be fabricated using lamination techniques with PSAs. Wavefront distortion of the assembled unit can be compromised by the texture of the external polymer surfaces. This problem is greatly alleviated by cementing a glass end-cap over the external polymer surface. Furthermore, transmission can be improved by using an end-cap which is antireflection coated.

Transmission losses in retarder stacks are the result of several loss mechanisms. Typically, the retarder stacks are comprised of several sheets of polycarbonate with acrylic based PSAs between them. Losses are thus a consequence of material absorption and random scatter, as well as reflections at the interface between each PSA and polycarbonate layer. Reflection at the interface between each PSA and polycarbonate layer is typically dominant, as PSA material often has a refractive index far below that of the polycarbonate. Thus, methods for increasing transmission focus on eliminating surface reflections. One method of eliminating surface reflections is to use a PSA that is better matched to the polycarbonate refractive index. Another method is to use chemical bonding. In chemical bonding, the polycarbonate sheets are welded together using a suitable solvent. For example, polycarbonate dissolved in methylene chloride provides an index matched material.

Color Display Modes

As discussed above, there are generally four ways to implement color displays: (1) spatial; (2) sequential; (3)

split-path; and (4) common-path. The CSLM can be used purely as a color sequencer in a sequential architecture, or can be used to implement a common-path display in a stacked-panel architecture. In addition, hybrid architectures can be implemented that use CSLM devices in displays that combine any of the four above-listed color generation techniques.

Figure 34B:
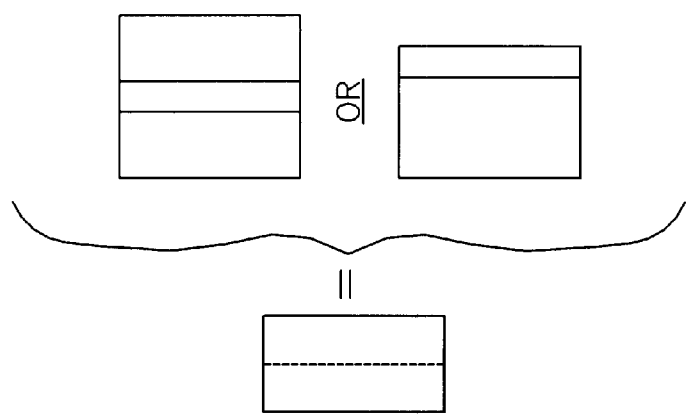
FIGS. 34A–34D show symbols used to represent various components in the schematics of FIGS. 35–44.
Figure 34A:
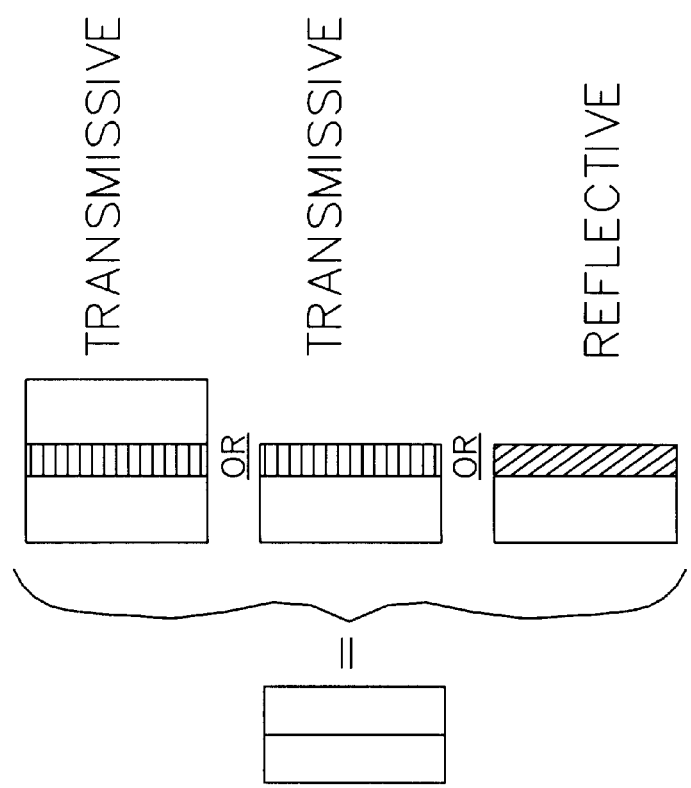
Figure 34D:
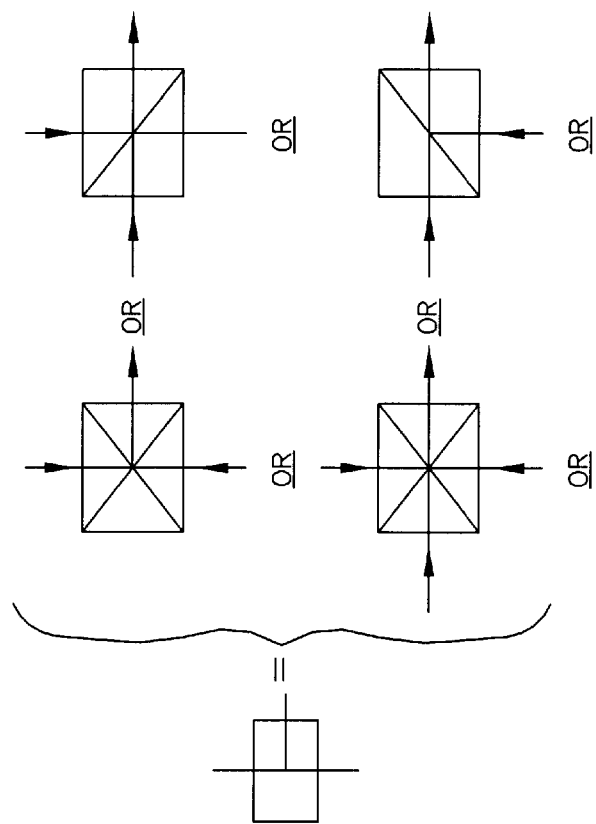
Figure 34C:
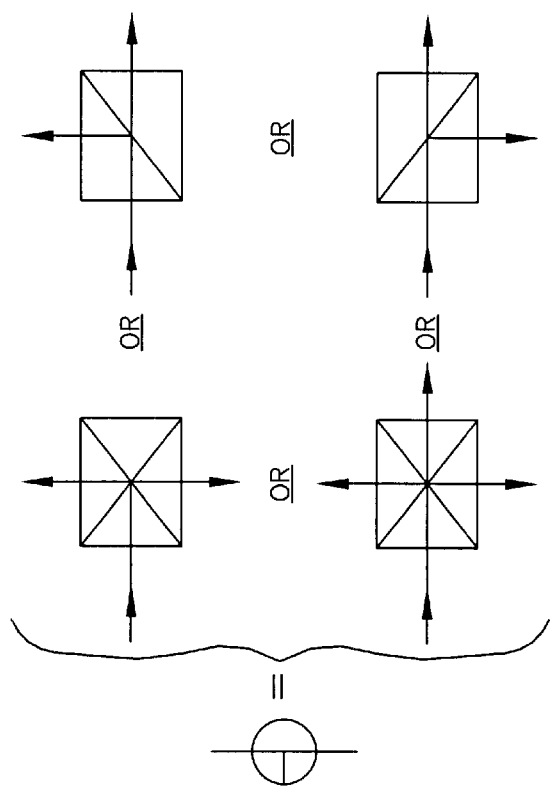

Various configurations of systems of the present invention can be created by combining several basic elements in various ways in order to satisfy particular design criteria. FIGS. 34A–34D show some of these basic elements. FIG. 34A shows the symbols used throughout FIGS. 35–44 to represent a pixelated stage such as, for example, a display stage (e.g., a transmissive or reflective CSLM display, as described above). The pixelated stage may include retarder stacks and/or polarizers. For simplicity, the term "display" will be used as a generic term to refer to the pixelated active device in a pixelated stage. FIG. 34B shows the symbols used throughout FIGS. 35–44 to represent a non-pixelated stage such as, for example, a non-pixelated CSLM as discussed above. The non-pixelated stage may include retarder stacks and/or polarizers. FIG. 34C shows the symbols used throughout FIGS. 35–44 to represent a light splitter. FIG. 34D shows the symbols used throughout FIGS. 35–44 to represent alight combiner. Splitters or combiners can be any appropriate beam splitter or combiner such as, for example, a polarization beam splitter or combiner or, in some cases, a dichroic beam splitter or combiner.

Various numbers of pixelated and non-pixelated stages can be positioned serially and/or in parallel. In addition, each display can be operated to display only one component (e.g., color component) of the system output, or can be operated sequentially to display multiple components of the system output. However, a display that is operated sequentially must be driven at a higher speed than if it is driven to display only one component of the system output. Also, transmissive displays and/or reflective displays can be used to further increase the number of possible configurations.

For clarity, FIGS. 35–44 will be described using the example of producing a color image. FIGS. 35–40, 42 and 44 show systems that produce outputs having three components and FIGS. 41A–41E and 43 show systems producing outputs having four components.

Initially, FIGS. 35–37 will be described as three exemplary embodiments of the system shown in schematic FIG. 38B.

Figure 35:
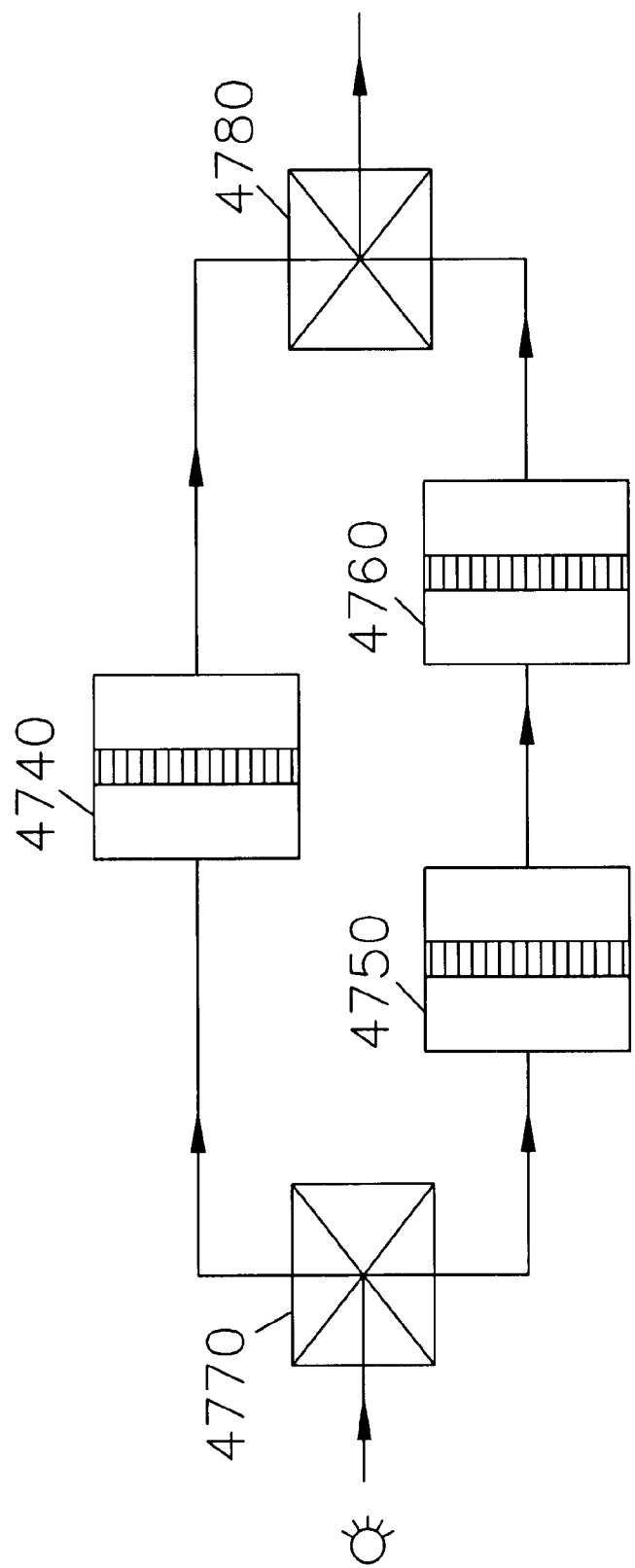
FIG. 35 is a schematic showing a split-path system using one transmissive pixelated stage on one path and two transmissive pixelated stages on another path, in accordance with the present invention.

FIG. 35 shows a split-path system using one transmissive pixelated stage on one path and two transmissive pixelated stages on another path. The light source is split by splitter 4770 into an upper path and a lower path. The upper path has a transmissive pixelated stage 4740 that produces one component of the image. The lower path is directed by splitter 4770 through transmissive pixelated stage 4750 and transmissive pixelated stage 4760. The lower path produces two components of the image. The single component of the upper path and the two components of the lower path are combined in combiner 4780 to form the output image.

Figure 36:
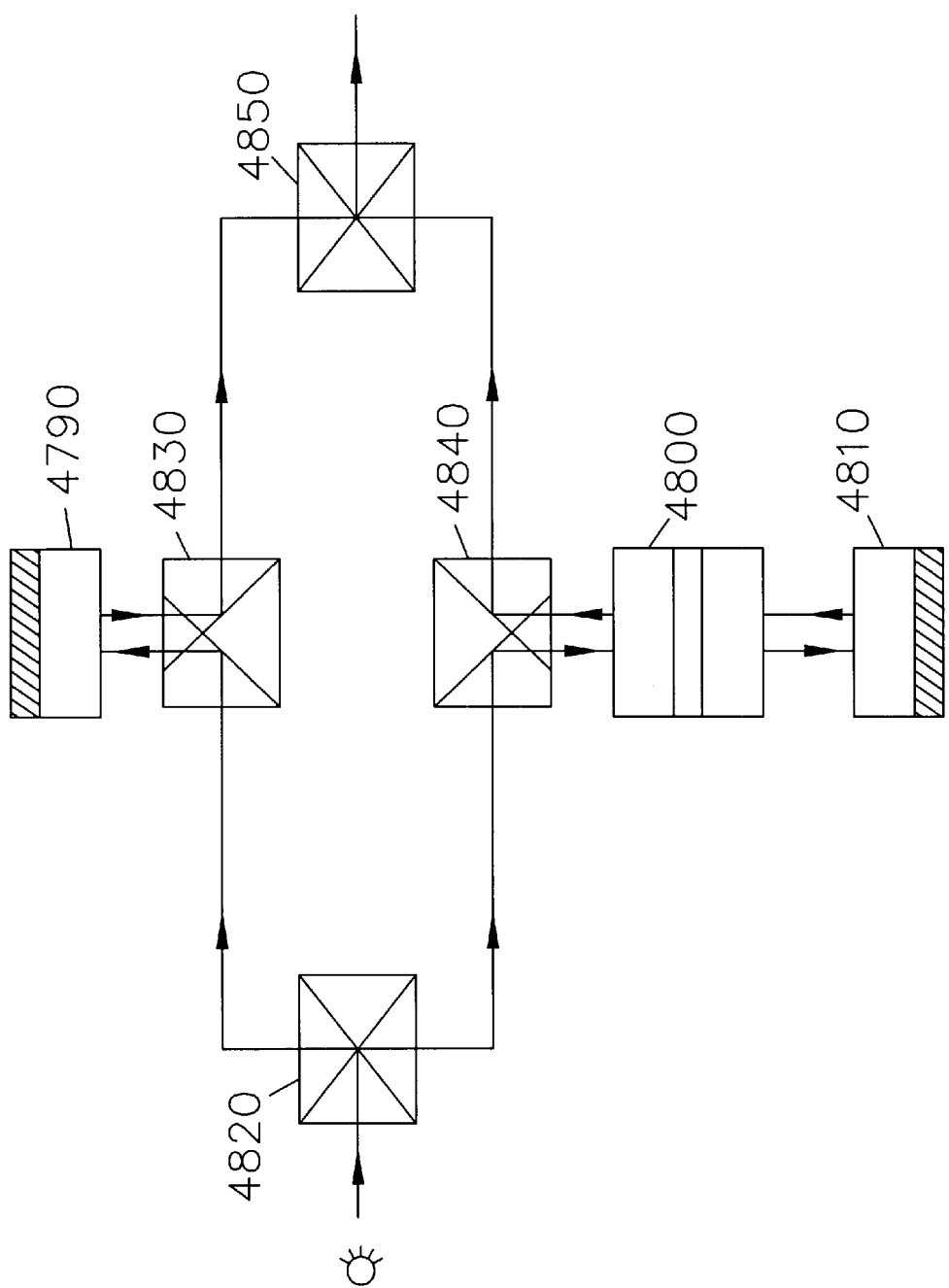
FIG. 36 is a schematic showing a split-path system using a reflective pixelated stage on one path, and a non-pixelated stage and reflective pixelated stage on another path, in accordance with the present invention.

FIG. 36 shows a split-path system using a reflective pixelated stage on one path, and a non-pixelated stage and a reflective pixelated stage on another path. The light source is split by splitter 4820 into an upper path and a lower path. The upper path is directed by reflector 4830 through reflective pixelated stage 4790 and produces one component of the image. The lower path is directed by reflector 4840 through non-pixelated stage 4800 and reflective pixelated stage 4810 and produces two components of the image. The single component of the upper path and the two components of the lower path are combined in combiner 4850 to form the output image.

Figure 37:
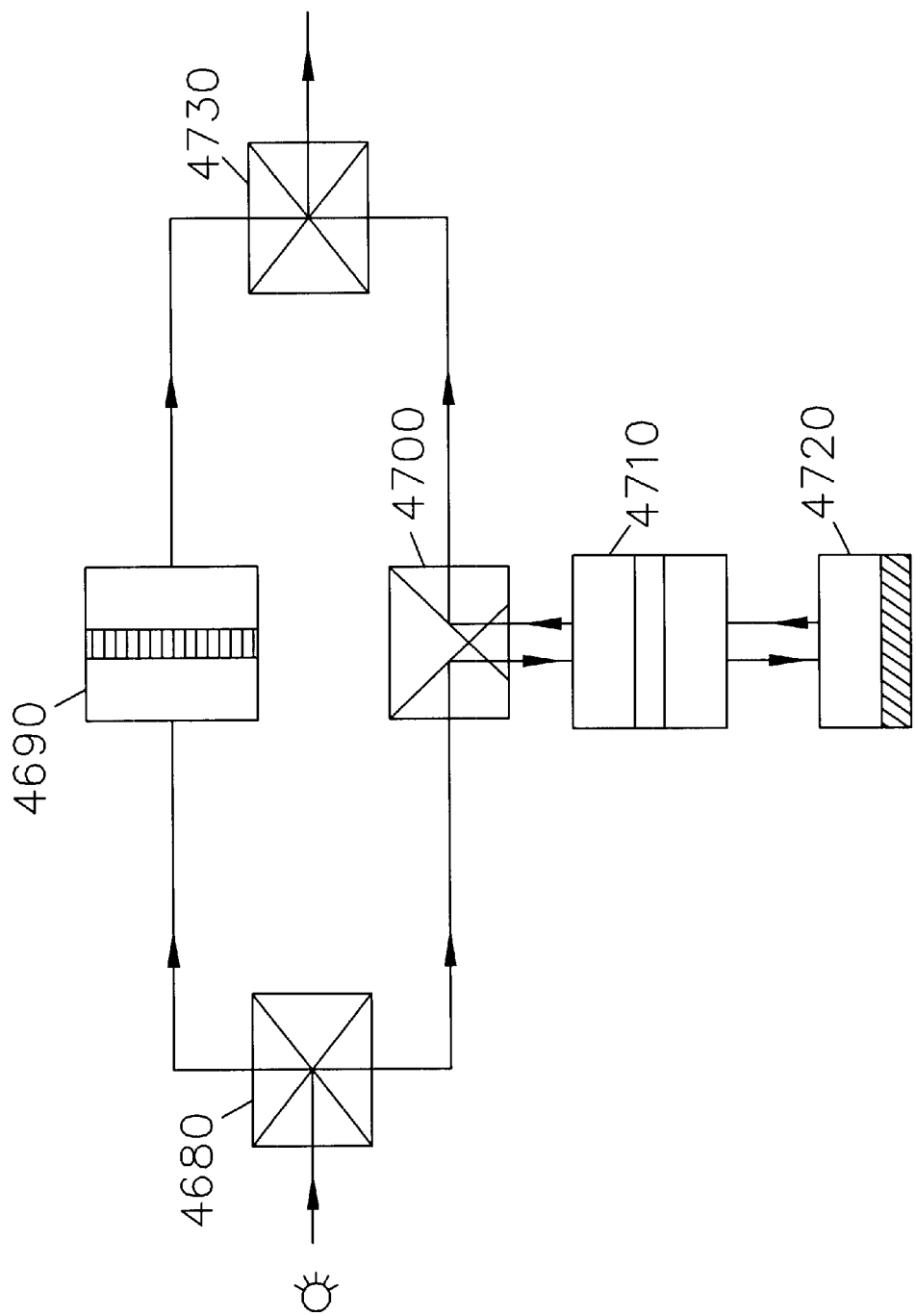
FIG. 37 is a schematic showing a split-path system using a transmissive pixelated stage on one path and a reflective pixelated stage on another path, in accordance with the present invention.

FIG. 37 shows a split-path system using a transmissive pixelated stage on one path and a reflective pixelated stage on another path. The light source is split by splitter 4680 into an upper path and a lower path. The upper path has a transmissive pixelated stage 4690 that produces one component of the image (similarly to the upper path in FIG. 35). The lower path is directed by reflector 4700 through non-pixelated stage 4710 and reflective pixelated stage 4720. The lower path produces two components of the image (similarly to the lower path in FIG. 36). The single component of the upper path and the two components of the lower path are combined in combiner 4730 to form the output image.

FIGS. 38A–41E are schematic figures showing some of the possible configurations of systems of the present invention. As shown by FIG. 34A, the pixelated stages shown in FIGS. 38A–41E can be transmissive or reflective pixelated stages. Further, the transmissive pixelated stages can have retarders and/or polarizers on one or both sides of the pixelating device.

Figure 38A:
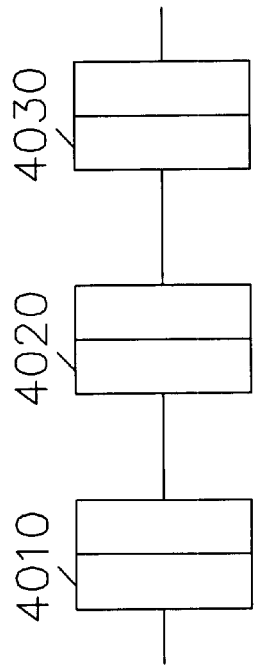
FIGS. 38A–38C are schematics showing display systems having three pixelated stages.
Figure 38B:
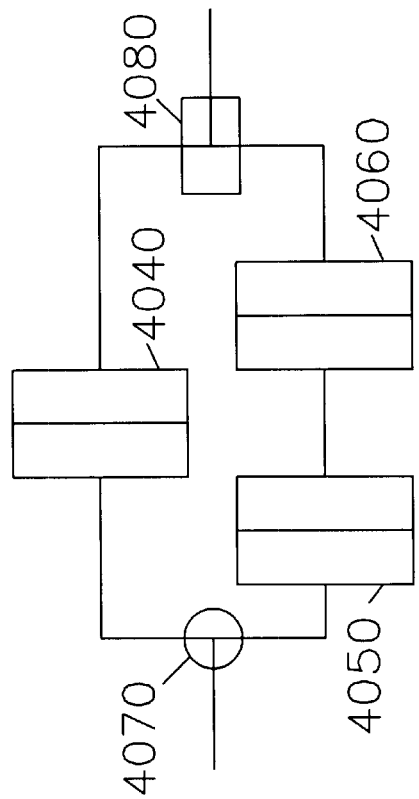
Figure 38C:
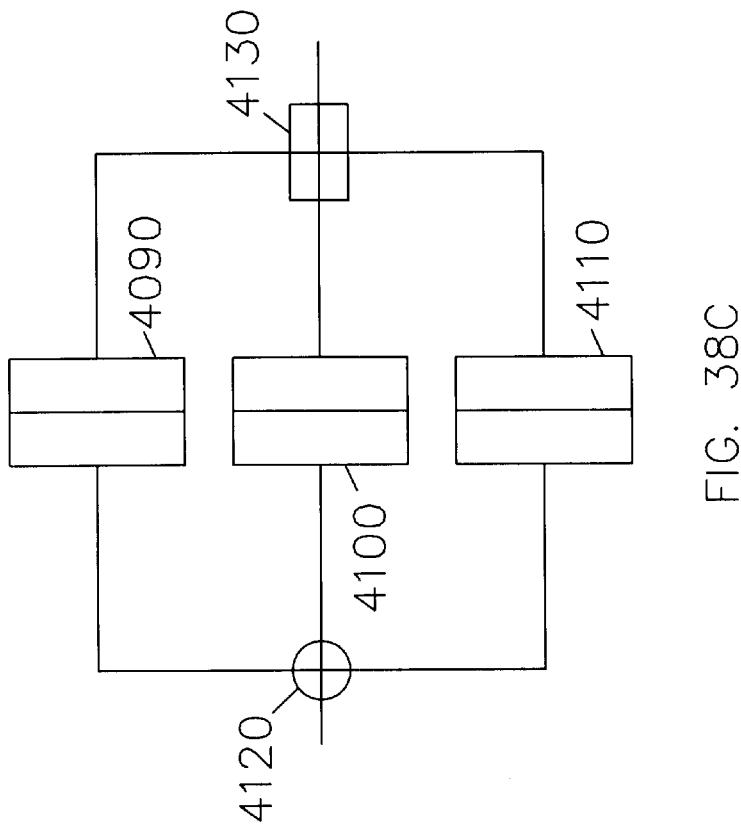

FIGS. 38A–38C show systems having three pixelated stages. FIG. 38A shows three pixelated stages 4010, 4020 and 4030 positioned on a common path. Each of the pixelated stages 4010, 4020 and 4030 produce a different component, for example, red, green or blue, of the output image.

FIG. 38B shows a split-path system having one pixelated stage 4040 on one path and two pixelated stages 4050 and 4060 on another path. A common light source is split by splitter 4070 so that light is simultaneously transmitted along both paths. The one component produced by the upper path and the two components produced by the lower path are combined in combiner 4080 to produce the output image. Although a single light source and splitter 4070 are shown in FIG. 38B, it is noted that multiple light sources could be alternatively used.

FIG. 38C shows another example of a split-path system. In FIG. 38C, the light source is split by splitter 4120 into three paths, each path having one pixelated stage 4090, 4100 and 4110. The single components produced by each path are combined by combiner 4130 to produce the output image.

Figure 39B:
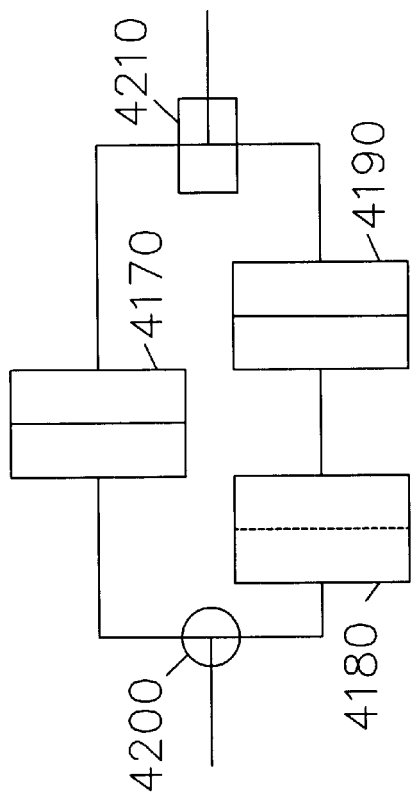
FIGS. 39A and 39B are schematics showing display systems having two pixelated stages, in accordance with the present invention.
Figure 39A:
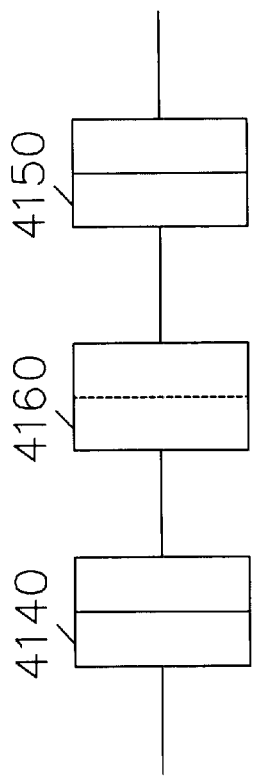

FIGS. 39A and 39B show systems having two pixelated stages. FIG. 39A shows a common-path system for processing three components of an image using only two pixelated stages. In the configuration shown in FIG. 39A, pixelated stage 4140 can processes one component of the output image and the other two components of the output image can be processed by pixelated stage 4150. The display of pixelated stage 4150 is sequentially operated so as to produce the two components of the image not produced by pixelated stage 4140. The retarder stacks of non-pixelated stage 4160 are switched in conjunction with the sequential operation of the display of pixelated stage 4150. As an alternative, the locations of pixelated stage 4140 and non-pixelated stage 4160 can be swapped.

FIG. 39B shows a split-path system similar to FIG. 38B except that one of the pixelated stages on the lower path has been replaced by non-pixelated stage 4180. In FIG. 39B, the light source is split by splitter 4200 into two paths. The upper path passes through pixelated stage 4170 and the lower path passes through non-pixelated stage 4180 and pixelated stage 4190. The upper and lower paths are then combined by combiner 4210. In this configuration, pixelated stage 4190 can be sequentially operated such that the lower path produces two components of the output image.

Figure 40:
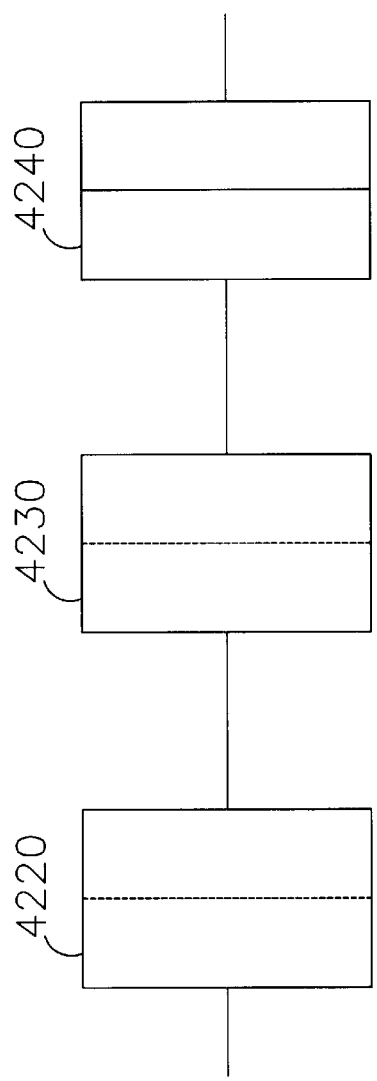
FIG. 40 is a schematic showing a display system having one pixelated stage, in accordance with the present invention.

FIG. 40 shows a system having one pixelated stage. FIG. 40 shows a common path system using one pixelated stage and two non-pixelated stages. In this system, the display of pixelated stage 4240 is sequentially operated to produce all three components of the output image. Switching of the retarder stacks of non-pixelated stages 4220 and 4230 is coordinated with the sequential operation of the display of pixelated stage 4240.

FIGS. 41A–41E show examples of systems producing outputs having four components. One application of such a system is to add a fourth component (such as a white component) to the three component systems shown in FIGS. 38A-40. Because of the large number of possible configurations of systems producing output having four components, FIGS. 41A–41E only show examples using four pixelated stages that are not operated sequentially. It should be noted that the examples shown in FIGS. 41A–41E can be modified by, for example, the methods shown in FIGS. 39A–40.

Figure 41A:
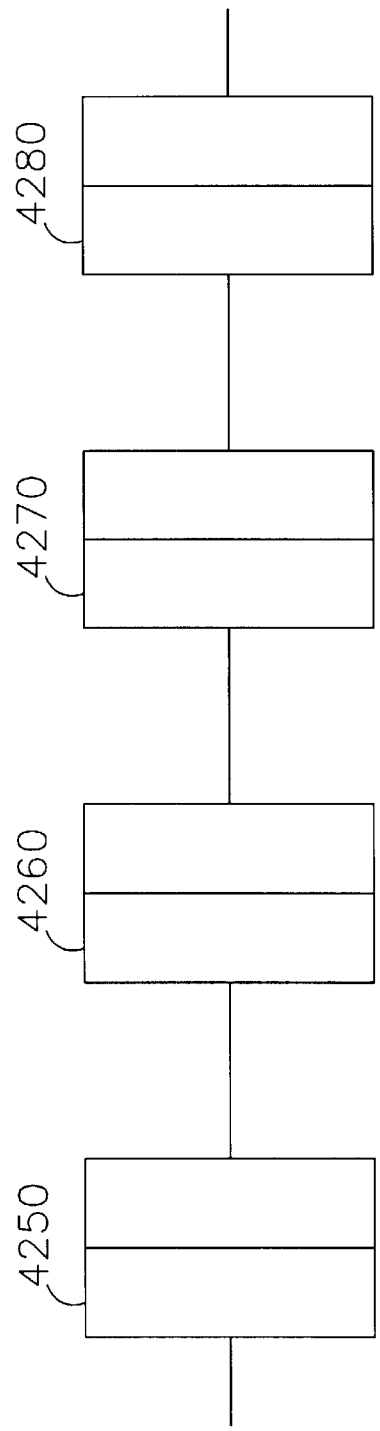
Figure 41E:
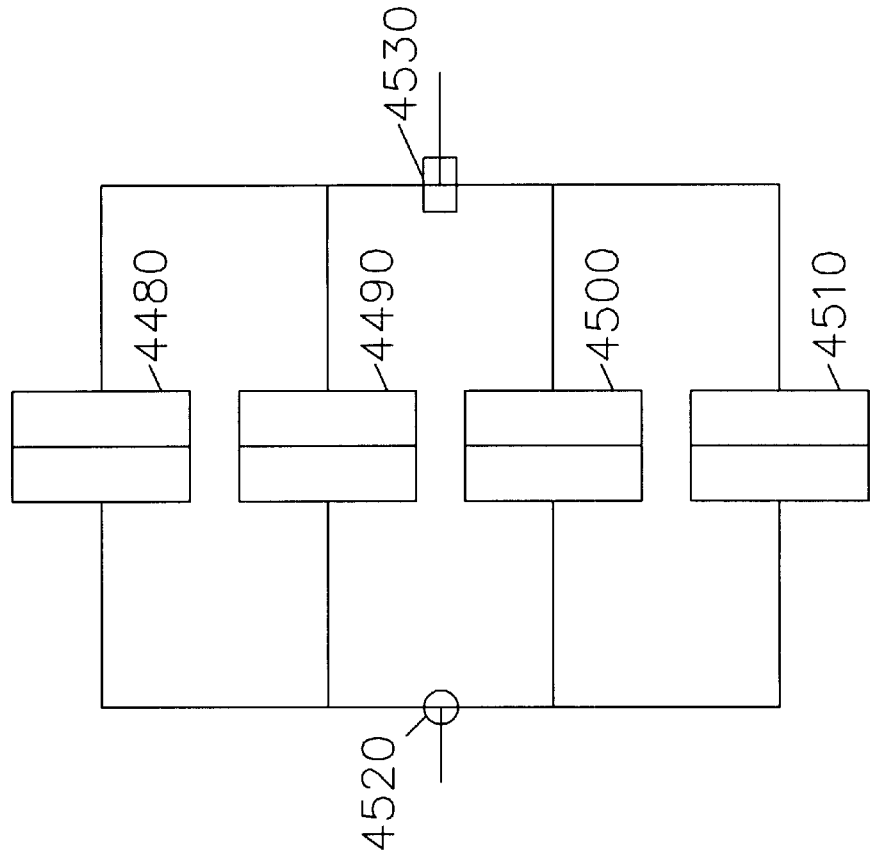
Figure 41D:
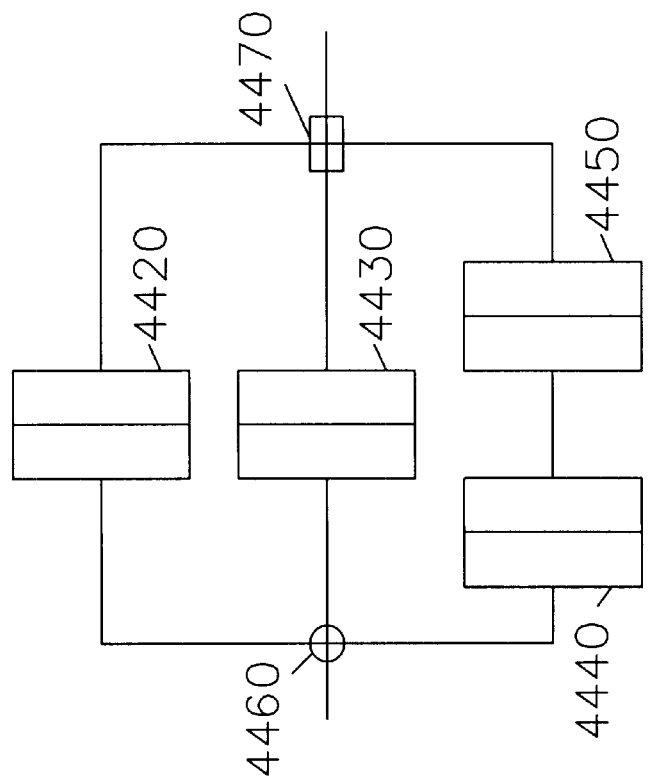

FIG. 41A shows a common-path system having four pixelated stages 4250, 4260, 4270 and 4280. FIG. 41B shows a split-path system in which the light source is split by splitter 4340 into an upper path and lower path. The upper path has two pixelated stages 4290 and 4300, and the lower path has two pixelated stages 4310 and 4320. The upper and lower paths are then combined by combiner 4350 into the output image. FIG. 41C shows a split-path system in which the light source is split by splitter 4400 into an upper path and a lower path. The upper path has three pixelated stages 4360, 4370 and 4380 and the lower path has a single pixelated stage 4390. The upper and lower paths are combined by combiner 4410 to produce the output image. FIG. 41D shows a split-path system in which the light source is split by splitter 4460 into three paths. The first path has a single pixelated stage 4420, the second path has a single pixelated stage 4430, and the third path has two pixelated stages 4440 and 4450. The three paths are then combined by combiner 4470 to produce the output image. FIG. 41E shows a split-path system in which the light source is split by splitter 4520 into four paths. Each of the four paths has a single pixelated stage 4480, 4490, 4500 and 4510. The four paths are then combined by combiner 4530 into the output image.

Figure 43:
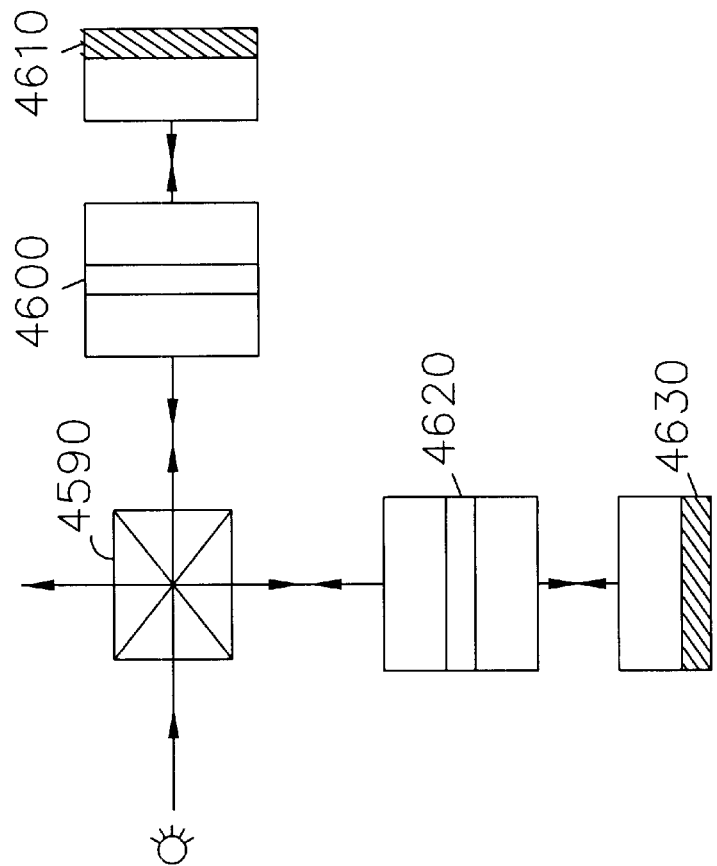
FIG. 43 is a schematic showing a split-path display system using two reflective pixelated stages in conjunction with two non-pixelated stages, in accordance with the present invention.
Figure 42:
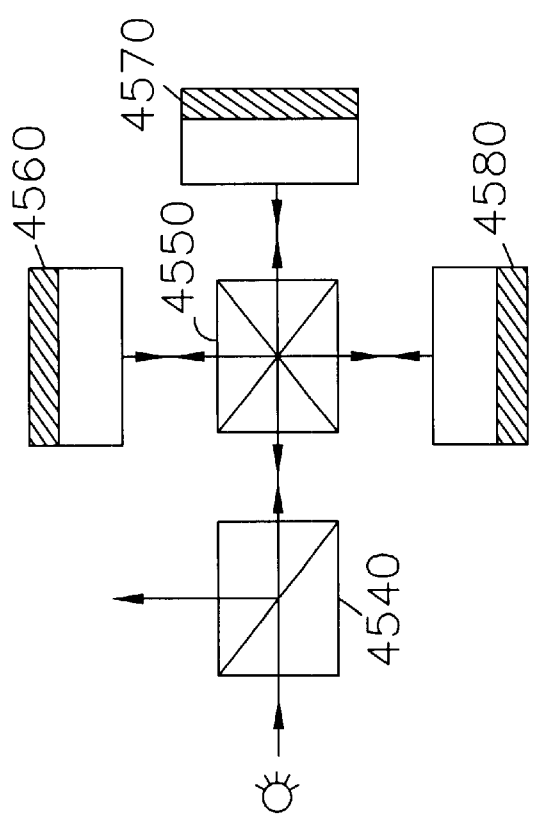
FIG. 42 is a schematic showing a display system having three reflective pixelated stages, in accordance with the present invention.
Figure 44:
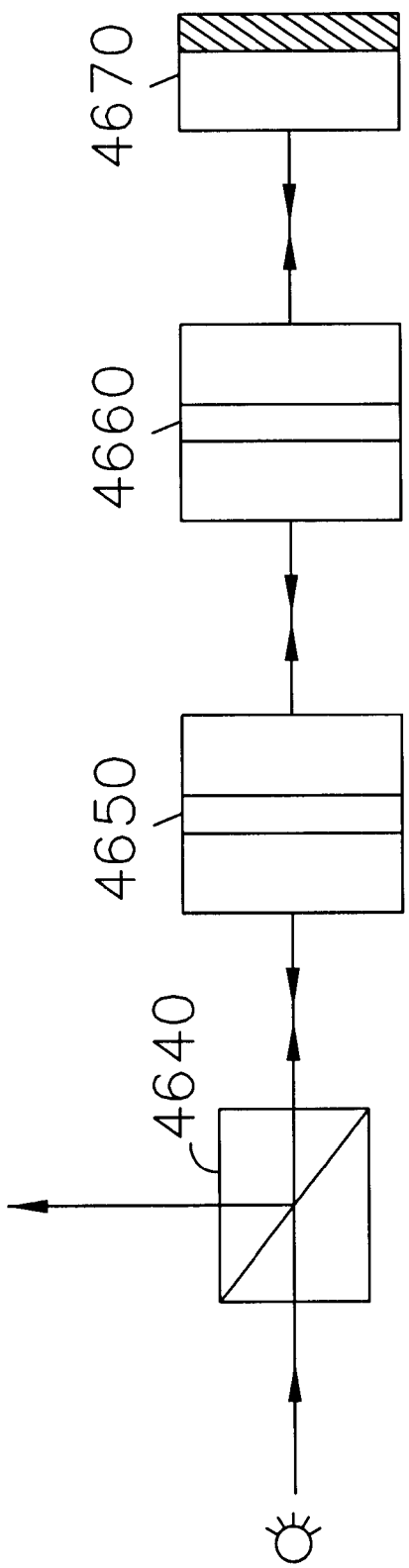
FIG. 44 is a schematic showing a common-path display system using a single reflective pixelated stage and two non-pixelated stages, in accordance with the present invention.

FIGS. 42–44 show some other examples of system configurations of the present invention. FIG. 42 shows a system having three reflective pixelated stages as an example of the split-path system shown in schematic FIG. 38C. The light source passes through reflector 4540 and is then split by splitter/combiner 4550 into three paths. On each path, a reflective pixelated stage 4560, 4570, 4580 is located. Each reflective pixelated stage 4560, 4570 and 4580 produces one of the components (in this example three) of the output image. The three components are then passed back through splitter/combiner 4550 where they are combined into the output image. The output image can then be reflected by reflector 4540, if necessary.

FIG. 43 shows a split-path system using two reflective pixelated stages in conjunction with two non-pixelated stages. The light source is split by splitter/combiner 4590 into two paths. Each path has a non-pixelated stage 4600, 4620 and a reflective pixelated stage 4610, 4630. Each of the paths in FIG. 43 operates similarly to the lower path shown in FIG. 36. As a result, the system shown in FIG. 43 can produce an image having four components, two produced by each path. The two components produced by each of the two paths are combined in splitter/combiner 4590 to produce the output image.

FIG. 44 shows a common-path system using a single reflective pixelated stage and two non-pixelated stages. The system of FIG. 44 is an example of the system shown in FIG. 40, using a reflective pixelated stage 4670. The light source passes through reflector 4640, non-pixelated stages 4650 and 4660, reflective pixelated stage 4670, back through non-pixelated stages 4650 and 4660, and is then reflected by reflector 4640, if necessary. By coordinating switching of non-pixelated stages 4650 and 4660 with the sequencing of the display of reflective pixelated stage 4670, an output having three components can be produced by the system of FIG. 44.

FIGS. 35–44 are examples of only a few of the many combinations possible in the present invention. Although images having three or four components were used as examples, images having any number of components can be produced. Further, split-path systems having more than four paths can also be used. In addition, although visible images were used as an example, waves having frequencies outside the visible range can also be used in systems of the invention for purposes of, for example, communication. Also, the pixelated stages can be analog or binary.

FIG. 45 is a table listing 18 examples of display types that can utilize CSLM technology in either a common-path or sequential capacity. When using two or less display panels, it becomes necessary to resort to either spatial, sequential, or both in order to display full-color. When the number of displays is three or more, it is not in necessary, though it is still possible, to use spatial or sequential techniques. Many such examples are therefore omitted from the table.

(A) Sequential Color Display

A full color sequential display (design #2 in FIG. 45) is implemented using a single image engine, operating at three times the composite system frame rate, synchronized with three-color illumination.

Figure 46:
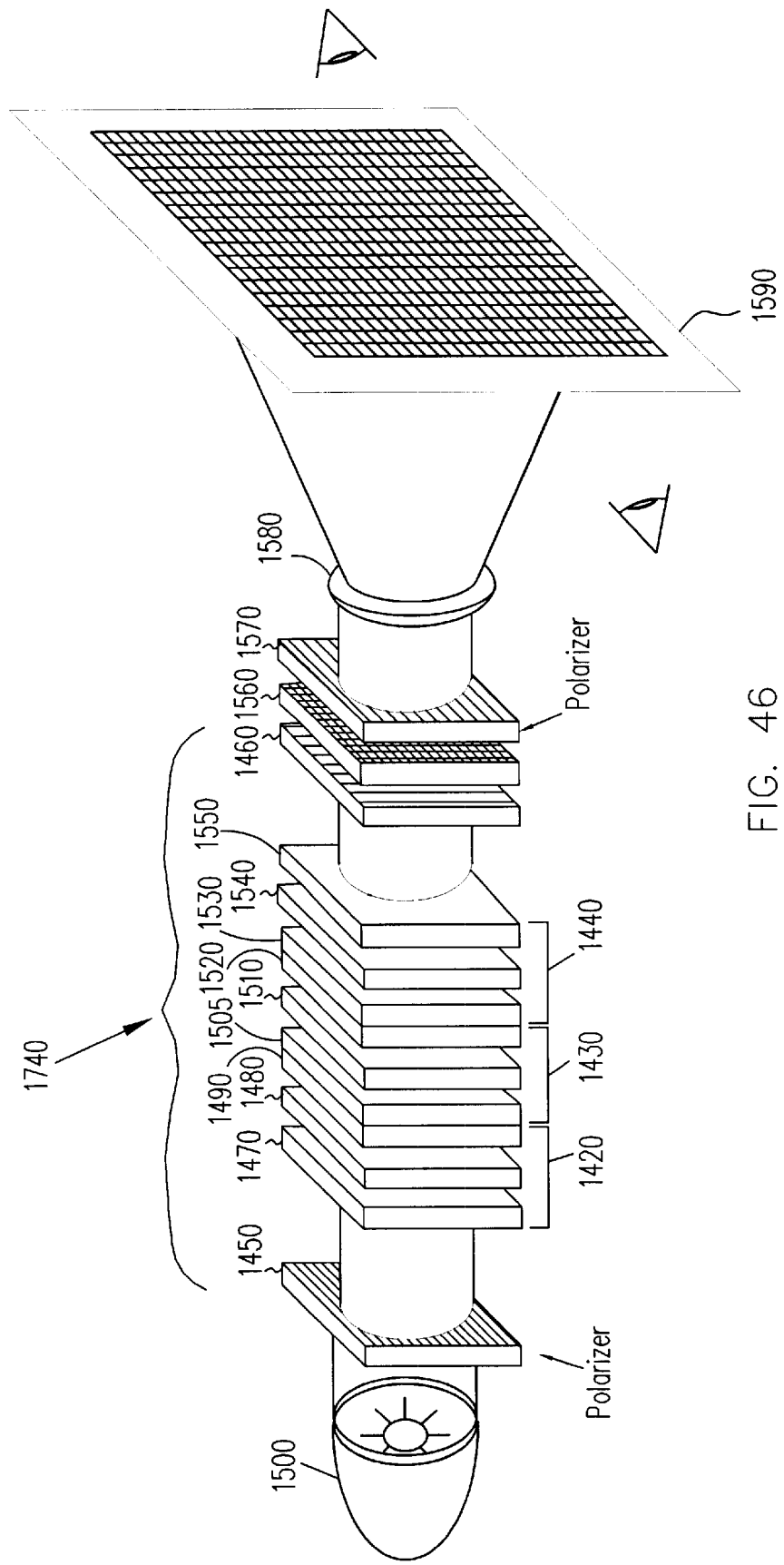
FIG. 46 shows a full color sequential display implemented with a transmissive liquid crystal display, and utilizing the CSLM color sequencer of the present invention.

FIG. 46 shows a full color sequential display implemented with a transmissive liquid crystal display, and utilizing the CSLM color sequencer of the present invention. The sequential display comprises a light source 1500, a two-polarizer CSLM color sequencer 1550, a transmissive pixelized liquid crystal display 1560, a polarizer 1570, a projection lens 1580 and a display screen 1590.

The light source 1500 is suitably a metal halide lamp and preferably emits optical power in all three primary color bands. Alternatively, the light source 1500 can be implemented with an active lamp system or with a lamp/color wheel combination.

For illustrative purposes, the two-polarizer CSLM color sequencer 1550 is of the type shown in FIG. 18. The CSLM color sequencer 1550 comprises an input polarizer 1450, a blue stage 1420, a green stage 1430 and red stage 1440.

The blue stage 1420 comprises a first retarder stack 1470, an LC modulator 1480 and a second retarder stack 1490. The green stage 1430 comprises a first retarder stack 1505, an LC modulator 1510 and a second retarder stack 1520. The red stage 1440 comprises a first retarder stack 1530, an LC modulator 1540 and a second retarder stack 1550. The input and output polarizers 1450 and 1460 are crossed.

In operation, the light source 1500 and the sequencer 1550 sequentially illuminate the liquid crystal display 1560 with red, green and blue light. The liquid crystal display 1560 is sequentially driven with red, green and blue image information in synchronism with the red, green and blue illumination from the light source 1500 and the color sequencer 1550. The liquid crystal display 1560, in combination with the polarizer 1570, modulates the intensity of the light that is sent to the screen 1590 in accordance with the image information. The full color sequential display of FIG. 24 can be implemented as a front projection display, in which the screen 1590 is viewed from the same side as the projection optics, or as a rear projection display, in which the screen 1590 is viewed from the side opposite the projection optics.

Figure 47:
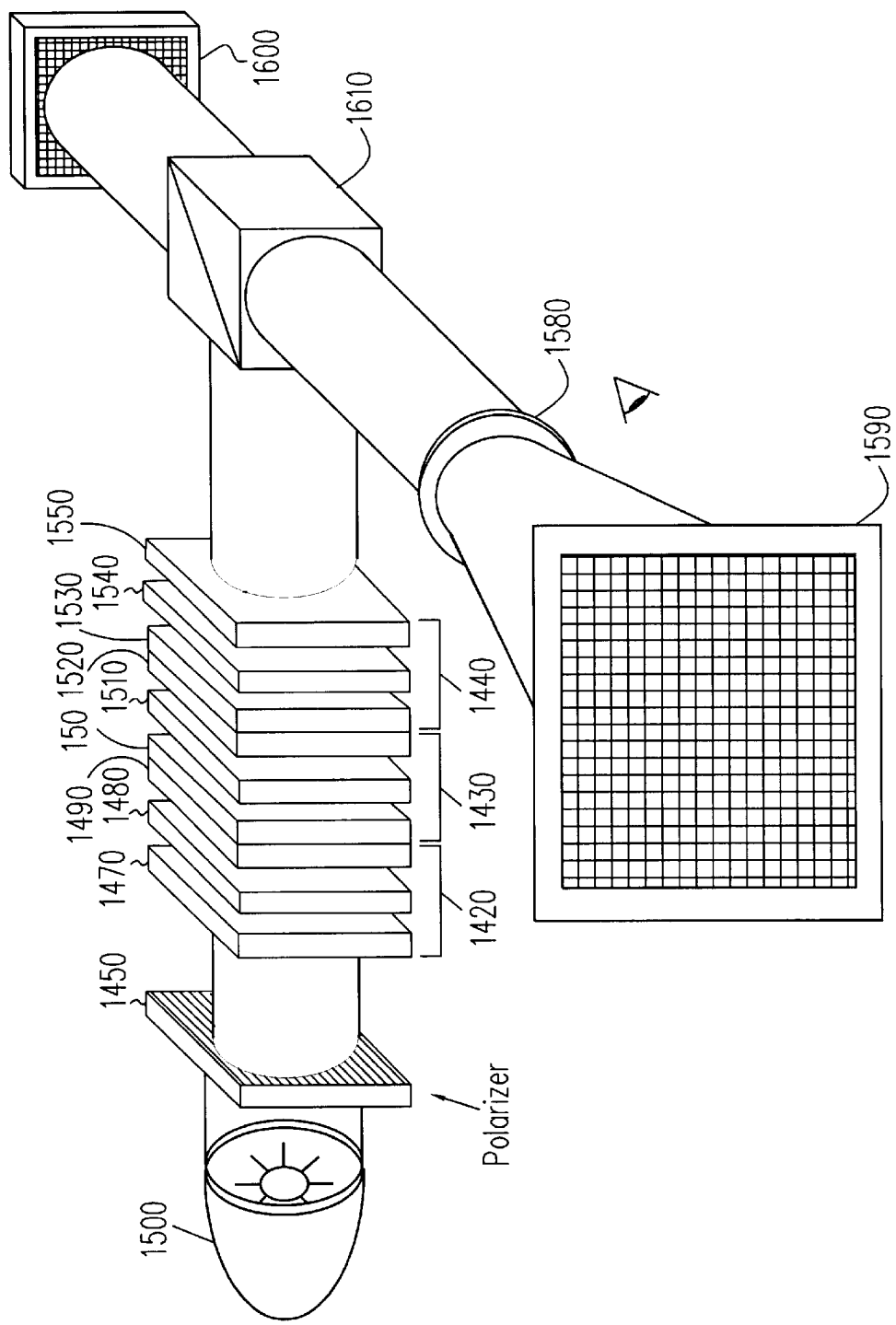
FIG. 47 shows a full color sequential display using a reflective liquid crystal display, and utilizing the CSLM color sequencer of the present invention.

FIG. 47 shows a full color sequential display using a reflective liquid crystal display, and utilizing the CSLM color sequencer of the present invention. The display of FIG. 47 is similar to the display shown in FIG. 46, except that a reflective liquid display 1600 is used instead of a transmissive liquid crystal display. In this configuration, a polarizing beam splitter 1610 is used as both as the output polarizer for the CSLM color sequencer and as the input/output polarizer for the reflective liquid crystal display 1600. Thus, the polarizing beamsplitter 1610 reflects light whose polarization is crossed with respect to the polarization axis of the input polarizer 1450. In operation, light that passes through the blue, green and red stages 1420, 1430 and 1440 is reflected by the polarizing beamsplitter 1610 to the reflective liquid crystal display 1600. The reflective liquid crystal display 1600 polarization modulates the light in accordance with the image information and reflects the polarization modulated light back towards the polarizing beamsplitter 1610. The polarizing beamsplitter 1610 passes components of the light reflected from the liquid crystal display 1600 that are orthogonally polarized with respect to the light that was reflected from the polarizing beamsplitter 1610 towards the liquid display 1600. Accordingly, image information is displayed on the screen 1590.

As discussed above, other types of illumination systems can be used in place of the light source 1500 in the displays of FIGS. 46 and 47. For example, lamps or light emitting diodes can be packaged which function as true color sequential sources. In a three-lamp system, it is difficult to obtain red and green phosphors with a rapid decay. One solution is to use a lamp system in combination with the CSLM of the present invention in order to eliminate color cross-talk between frames, as required in OCB mode displays.

In the displays shown in FIGS. 46 and 47, the CSLM color sequencer is positioned between the light source 1500 and the liquid crystal displays (1560 in FIG. 46 and 1600 in FIG. 47). However, the CSLM color sequencer 1550 can be positioned at other locations in the display system, provided that it effectively controls the illuminating color at the output, i.e., the screen 1590. By placing the digital color sequencer between the light source 1500 and the liquid crystal display 1560 or 1600, the image at the screen 1590 is not sensitive to any wave-front distortion caused by the CSLM color sequencer 1550.

The CSLM color sequencers 1550 can be made relatively small, even though the power handling is relatively high when the CSLM color sequencer 1550 is positioned as shown in FIGS. 27 and 28. UV and IR filters (not shown) are preferably inserted between the light source 1500 and the CSLM color sequencer 1550.

Alternative locations for the CSLM color sequencer 1550 are between the liquid crystal display 1560 or 1600 and the projection lens 1580, and between the projection lens 1580 and the viewing screen 1590. If the CSLM color sequencer 1550 is located between the projection lens 1580 and the viewing screen 1590, the CSLM color sequencer 1550 must have a relatively large clear aperture and low wave-front distortion. In addition, this location will reduce the power handling requirements of the CSLM color sequencer.

For a high-frame rate system, the LC display 1560 or 1600 is preferably a silicon-based display, rather than a TFT. Typical reflective LCDs integrate ferroelectric LC, or a variety of nematic LC modes, between a glass substrate coated with a solid ITO electrode and a reflective active matrix structure on a silicon substrate. In such systems, the analyzing polarizer of the CCS 1550 can serve as the input polarizer to the LCD panel, or vice versa. In a system that uses off-normal illumination, such as a digital micromirror device, the sequencer can be placed in either the illumination or projection arms of the system. However, in a retroreflecting arrangement, a beam splitting polarizer functions both to create a crossed polarizer and to route the beam through the system. In such a configuration, the sequencer can also be inserted in the arm between the beam splitting polarizer and the LCD. However, additional constraints are imposed on the design of such a CSLM color sequencer.

In the above-described CSLM configurations, the CSLM stages are used primarily for chromatically preconditioning the polarization of light for an analyzing polarizer, which has orthogonal transmitting and blocking axes. The CSLM structures modulate between filtered and neutral outputs. However, it should be understood that CSLM structures need not be limited to modulate between filtered and neutral spectra.

In a typical sequential display architecture using the CSLM color sequencer of the present invention, such as the transmissive display shown in FIG. 46, a polarizer polarizer 1460 in FIG. 46) serves as both an analyzing polarizer for the color sequencer, and as an input polarizer for generating local grey scale via the LC display. The polarizer blocks the undesired inverse spectrum, thereby illuminating the LC display with the desired color and polarization.

The sequential architecture can be modified by removing this polarizer, thereby making both color and grey level generation means share the same polarization analyzer. In this way, an entire sequential display can be implemented using only two neutral polarizers. Because the entire spectrum is incident on the LC display, the polarization must be manipulated such that the LC display can only modulate the state of polarization of the desired additive primary color. For all LC display states, the inverse spectrum must arrive at the analyzing polarizer along the blocking axis. This spectrum must therefore be polarized along an LC display eigenpolarization, while the additive primary must be polarized along a modulation state. Color selective elements must therefore be inserted between the color sequencer and the LC display, as well as between the LC display and the polarization analyzer. This represents a redundant filtering operation. A more elegant solution is to integrate the LC display into the color sequencer.

One technique for integrating color and grey level generation for sequential display systems is to make the retarder stacks of the CSLM active. In this way, the LC display can be nested between several active partial retarder stacks, each of which can be made to vanish with the application of an appropriate voltage.

Figure 48:
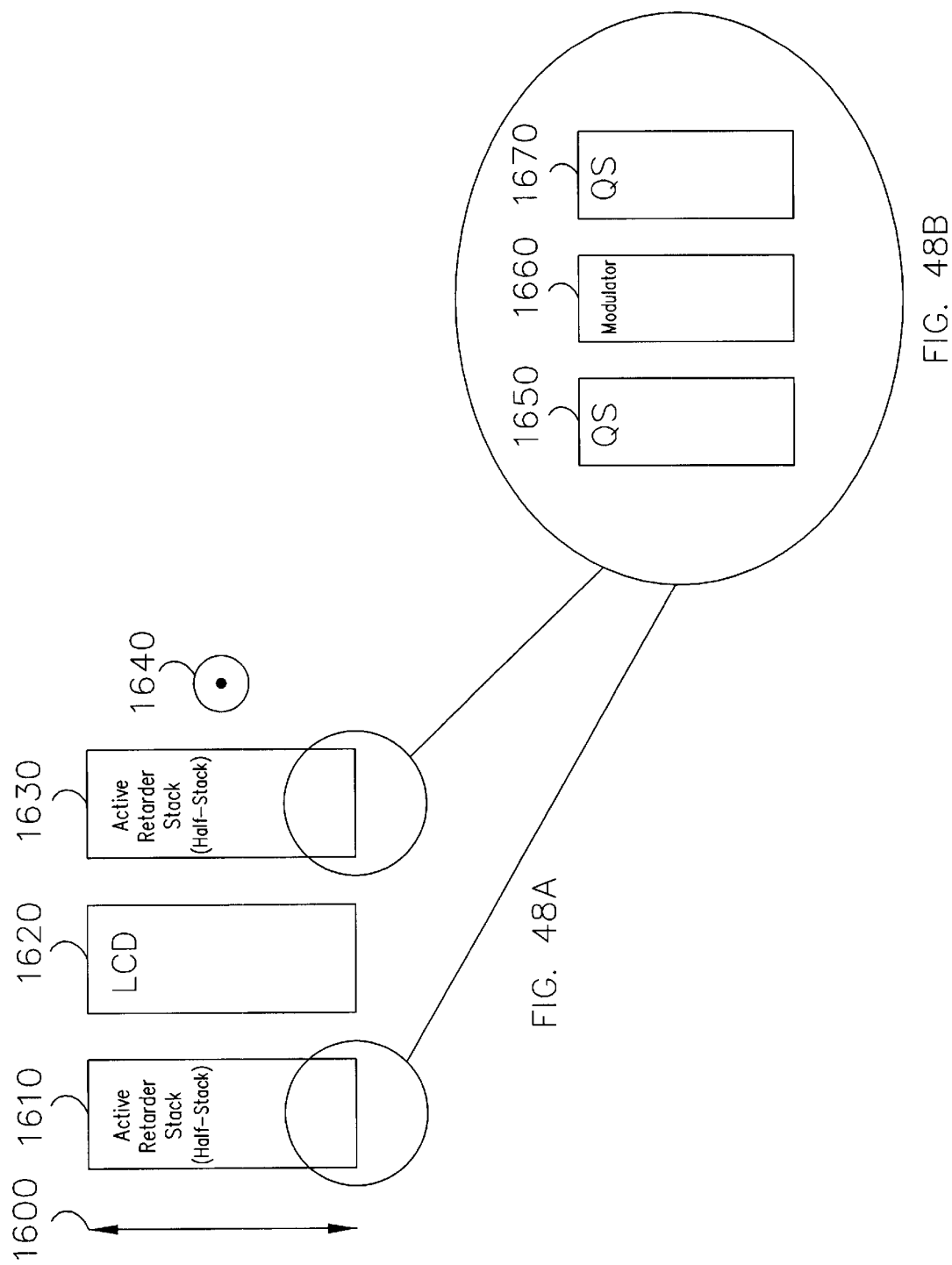
FIGS. 48A and 48B show a CSLM with active retarder stacks, in accordance with the present invention.

FIGS. 48A and 48B illustrate such a system. The system comprises an input polarizer 1600, a first active retarder half stack 1610, an LC display 1620, a second active retarder half stack 1630 and an output polarizer 1640. In the example shown in FIGS. 29A and 29B, the orientation of the output polarizer 1640 is orthogonal of the orientation the input polarizer 1600. However, it should be understood that this system can also be implemented with parallel polarizers.

As shown in FIG. 48B, each of the active retarder half stacks 1610 and 1630 are made up of a first retarder quarter stack 1650 (denoted as "QS"), an active polarization modulator 1660 and a second retarder quarter stack 1670. The retarder stacks 1650 and 1670 are termed retarder "quarter stacks" because, as discussed above one of the passive retarder stacks (on either side of the polarization modulator) is considered a "half stack". This is because, as discussed above, the two retarder stacks work cooperatively to generate a neutral spectrum or a filtered spectrum. The two retarder quarter stacks 1650 and 1670 work together to form a single retarder half stack.

The polarization modulator 1660 is used to modulate the apparent orientation of one retarder quarter stack relative to the other. In one state of the modulator 1660, the retarder quarter stacks 1650 and 1670 cooperate to prepare one spectrum along a modulation state of the LC display 1620 and the complementary spectrum along isotropic states of the LC display 1620. In the other state of the polarization modulator 1660, the retarder quarter stacks 1650 and 1670 cancel, yielding a neutral input to the LC display 1620, which is either an isotropic state or a modulation state. The neutral output enables either a white frame or additional colors to be generated by additional CSLM structures.

By placing active retarder half stacks 1610 and 1630 on either side of the LC display 1620, the active retarder half stacks 1610 and 1630 can be sequentially switched in and out using a single pixel active polarization modulator 1660. In a reflection mode configuration, the hardware requirements can be simpler. This is because the two active retarder half stacks 1610 and 1630 represent two passes through a single retarder half stack. However, the design options are further constrained using this configuration.

If one uses a true analog LC display in a retroreflecting arrangement, multiple polarization states exist in the arm between the LC display and the polarizing beamsplitter. In a binary display, the counterpropagating beams have either the same polarization or are orthogonally polarized. It is ultimately the component that is converted to the orthogonal state that is transmitted the most, with intermediate polarization states representing grey levels. Because multiple polarization states must be accommodated, it is impractical to insert polarizers in this arm. As such, conventional color shutters, such as those based on dye polarizers or complementary polarizer retarder stacks, are not appropriate. Rather, the technology used must manipulate polarization chromatically, without blocking light. This requires that the polarizing beamsplitter function as the analyzer for both the CSLM color sequencer and the LC display. The CSLMs of the present invention lend themselves to such a requirement.

(B) Common-Path Color Display

By using transmissive LC display panels in place of single pixel LC devices for the polarization modulator between the retarder stacks, the CSLM color sequencer can be converted to a stacked panel full color display (design #11 in FIG. 45). Such common path display systems have traditionally been termed "subtractive" systems, although the CSLM technology of the present invention permits a stacked panel display to be operated in an additive mode. Many of the benefits discussed above in connection with a two polarizer CSLM color sequencer used in an additive mode are relevant to the stacked panel display system.

Figure 49:
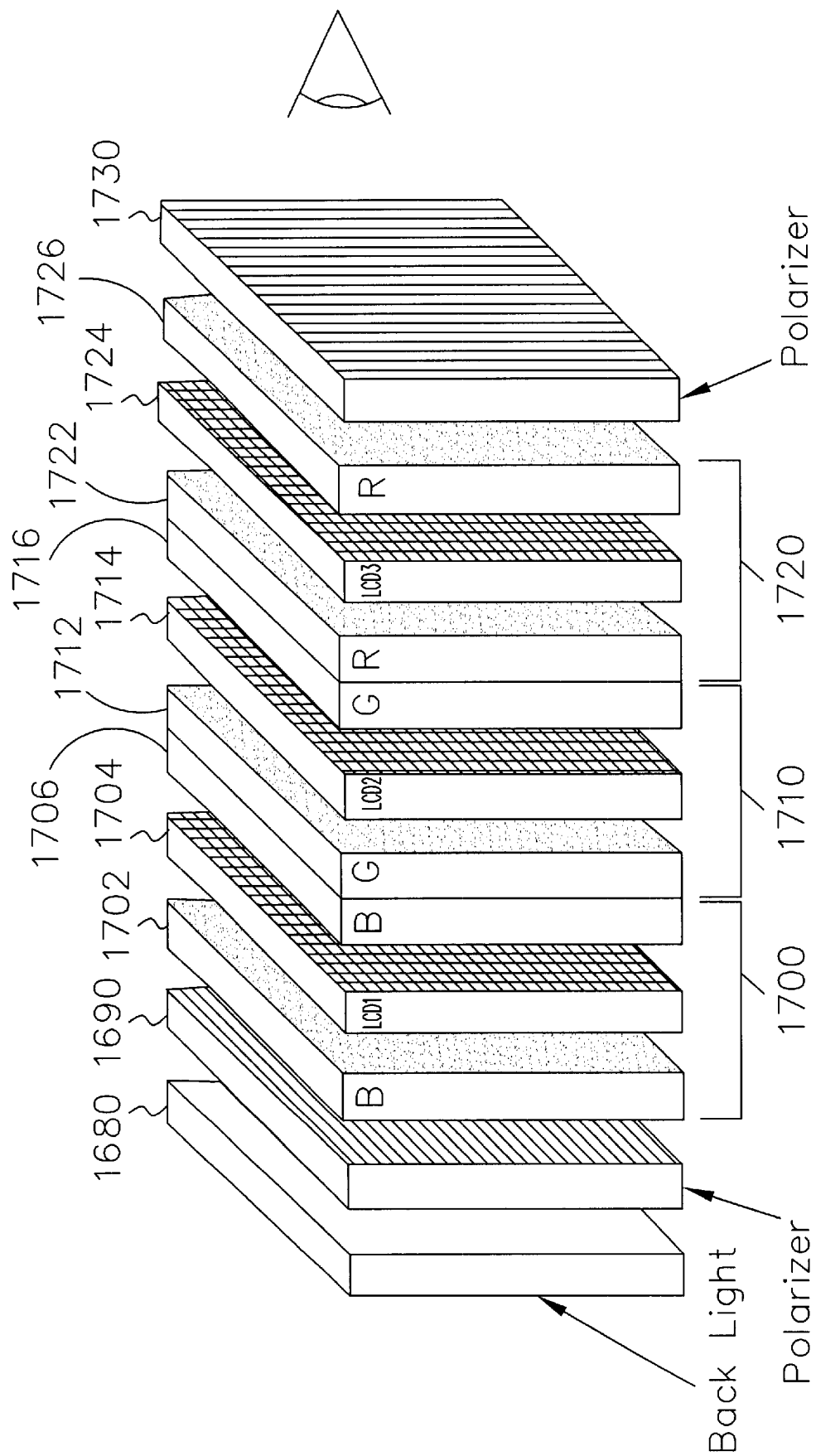
FIG. 49 shows a CSLM stacked-panel direct-view display, in accordance with the present invention.

Stacked panel displays can in principle be implemented in either direct view systems or in projection systems (front or rear). FIG. 49 illustrates a stacked panel direct view display in accordance with the present invention. The display comprises a backlight 1680, an input polarizer 1690, a blue stage 1700, a green stage 1710, a red stage 1720 and output polarizer 1730.

The blue stage 1700 comprises a first retarder stack 1702, an LC display 1704 and a second retarder stack 1706. The green stage 1710 comprises a first retarder stack 1712, an LC display 1714 and second retarder stack 1716. The red stage 1720 comprises a first retarder stack 1722, an LC display 1724 and second retarder stack 1726. The input and output polarizers 1690 and 1730 have orientations that are crossed (orthogonal).

In operation, the LC display 1704 is driven with blue image information, the LC display 1714 is driven with green image information, and the LC display 1724 is driven with red image information. The first retarder stack 1702 in the blue stage 1700 polarizes the blue spectrum along a modulation state of the LC display 1704. Similarly, the first retarder 1712 in the green stage 1710 polarizes the green spectrum along a modulation state of the LC display 1714, and the first retarder stack 1722 in the red stage 1720 polarizes the red spectrum along a modulation state of the LC display 1724. The LC displays 1704, 1714 and 1724 can be either passive matrix or active matrix displays.

In direct view systems, unique challenges arise regarding maintaining the display quality as a function of view angle. Factors that affect display quality include color shift, contrast ratio, parallax and resolution. Methods for improving the performance of direct view systems include maximizing the ratio of pixel pitch to distance between LC film layers and/or using relay optics for imaging one LC display panel on to the next LC display panel.

To maximize the ratio of pixel pitch to distance between LC film layers, substrate thickness can be minimized by using LC displays fabricated on plastic substrates. Retarder thickness can also be minimized using retarder stacks that are comprised of high birefringent liquid crystal polymer layers. Internal polarizers can either be eliminated from the design, or their thickness minimized by using the polarizer substrate with no CAB or CTA backing substrates.

Although the direct view system illustrated in FIG. 49 uses a backlight 1680, the direct view system can also be operated in transmission mode with an effective backlight implemented with edge lighting, in a transflective mode, or in a true reflection mode using a suitable reflection mode CLSM design.

Another potential technique for descreasing the thickness of the display system is to combine the functionality of the first and second retarder stacks in each stage. As is shown in FIG. 49, a retarder stack is positioned on each side of each LC display. By analyzing the functionality of each pair of retarder stacks, single retarder stacks can in principle be designed to replace them. Such single retarder stacks have the potential of requiring fewer films then those needed for two seperate retarders stacks.

Projection display systems, which can be used for presentations or projection television, can utilize the stacked panel structures of the present invention to perform highly integrated, compact and lightweight projection display systems. In principle, stacked panel projection display systems have the potential to provide brightness equivalent to conventional three panel display systems, without the need for color separation/combining optics.

Figure 50:
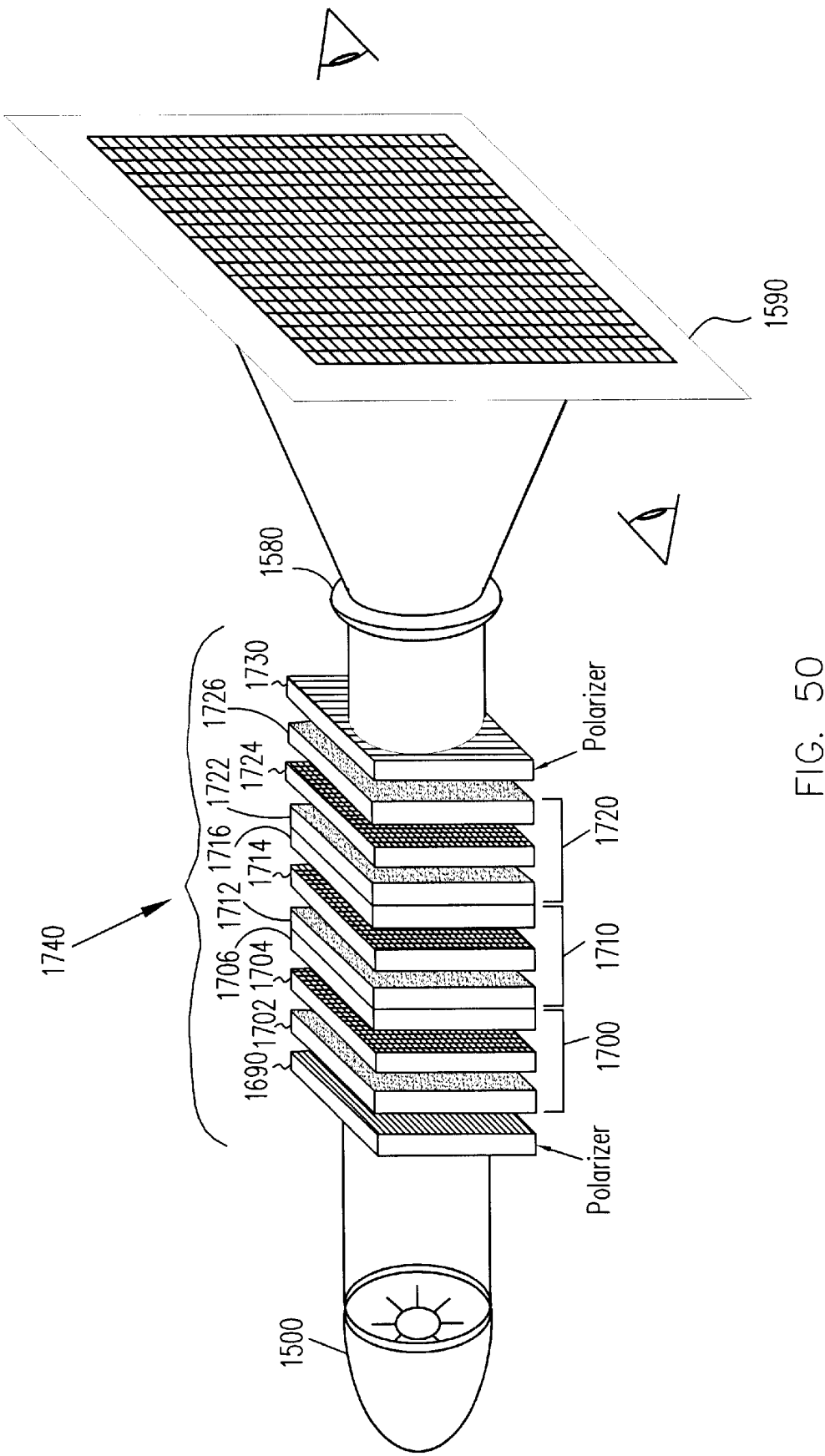
FIG. 50 shows a CSLM stacked-panel projection display system, in accordance with the present invention.

FIG. 50 shows a stacked panel projection display system, in accordance with the present invention. The projection display system comprises a lamp assembly 1500, a CSLM-based stacked panel color image engine 1740, a projection lens assembly 1580 and a viewing screen 1590. The lamp essembly 1500 can include collimation optics, IR/UV filtering, and/or polarization recovery systems.

The color image engine 1740 comprises an input polarizer 1690, and blue stage 1700, a green stage 1710, a red stage 1720 and an output polarizer 1730. The blue stage 1700 comprises a first retarder stack 1702, an LC display 1704 and a second retarder stack 1706. The green stage 1710 comprises a first retarder stack 1712, an LC display 1714 and a second retarder stack 1716. The red stage comprises a first retarder stack 1722, an LC display 1724 and a second retarder stack 1726. The stacked panel color image engine 1740 operates in a manner similar to the stacked panel system described above in connection with FIG. 49. The stacked panel projection display system of FIG. 50 can be implemented as a front projection display, in which the viewing screen 1590 is viewed from the same side as the projection optics 1580, or as a rear projection display, in which the viewing screen 1590 is viewed from the side opposite the projection optics 1580.

If the stacked panel projection display system is implemented as an active matrix front projection television, the three LC displays 1704, 1714 and 1724 are used in an analog mode for full color generation. In this case, each LC display must be capable of independently controlling the transmission of an additive primary band with a resolution of 4–8 bits. In addition, a particular transmission level selected by one stage must be substantially independent of the transmission level selected by the remaining two stages. This independence at intermediate voltages is possible in a two polarizer configuration because of the way in which the structure operates on polarization.

In order to achieve independence of stages at all voltage levels, it is necessary that the polarization manipulation that occurs via the action of stages that follow a particular stage are not meaningful in a power transmission sense. For example, a particular color can be converted to a circular polarization state by the first stage 1700 in order to achieve a 50% transmission level. In subsequent stages, the retarder stacks are assumed not to change this polarization state, because they operate on other colors. The LC displays in subsequent stages do not modulate the state of polarization of the circular input. Because the LC displays are oriented parallel to the input polarizer 1690, they only change the ellipticity of the polarization state, while the projection onto the output (analyzing) polarizer 1730 remains fixed. As such, transmission cross-talk between stages can be substantially avoided.

(C) Hybrid Color Displays and Other Considerations

Designs Nos. 3–7, 12, 16 and 17 in FIG. 45 are hybrid color displays and color sequencer sub-systems in which color generation modes are combined in a variety of ways. Hybrid configurations utilize combinations of color generation schemes, which include color filter array (CFA), time-sequential, multiple-path, and common-path methods. It is even possible to design hybrid systems that use combinations of three color generation technologies, i.e., multi-path/common-path/sequential. The motivation for selecting a particular configuration comes from overall performance issues (e.g., brightness, color-balance and/or color purity), weight, size and cost. Motivation is also driven by the specific behavior of the components, particularly the light source and the image engine(s).

Because the CSLM is polarization-based, it is most efficiently used with light generated in a polarized state (e.g., light from a laser), light efficiently converted to a polarized state, or a system that provides two display paths for independently processing the light. In polarization recovery schemes, the main objective is a method for creating a polarized source with greater use of the lamp emission. This is part of the illumination optics, and can be regarded as external to the display.

A polarization recovery scheme can be implemented with a split-path color sequencer. Should the image engine be independent of polarization, such as the Texas Instruments Digital Micromirror Device (DMD), emphasis is placed on avoiding polarization losses. One way to avoid polarization losses is to construct a split-path color sequencer that acts independently on the orthogonal polarizations that comprise an unpolarized light input.

Figure 51:
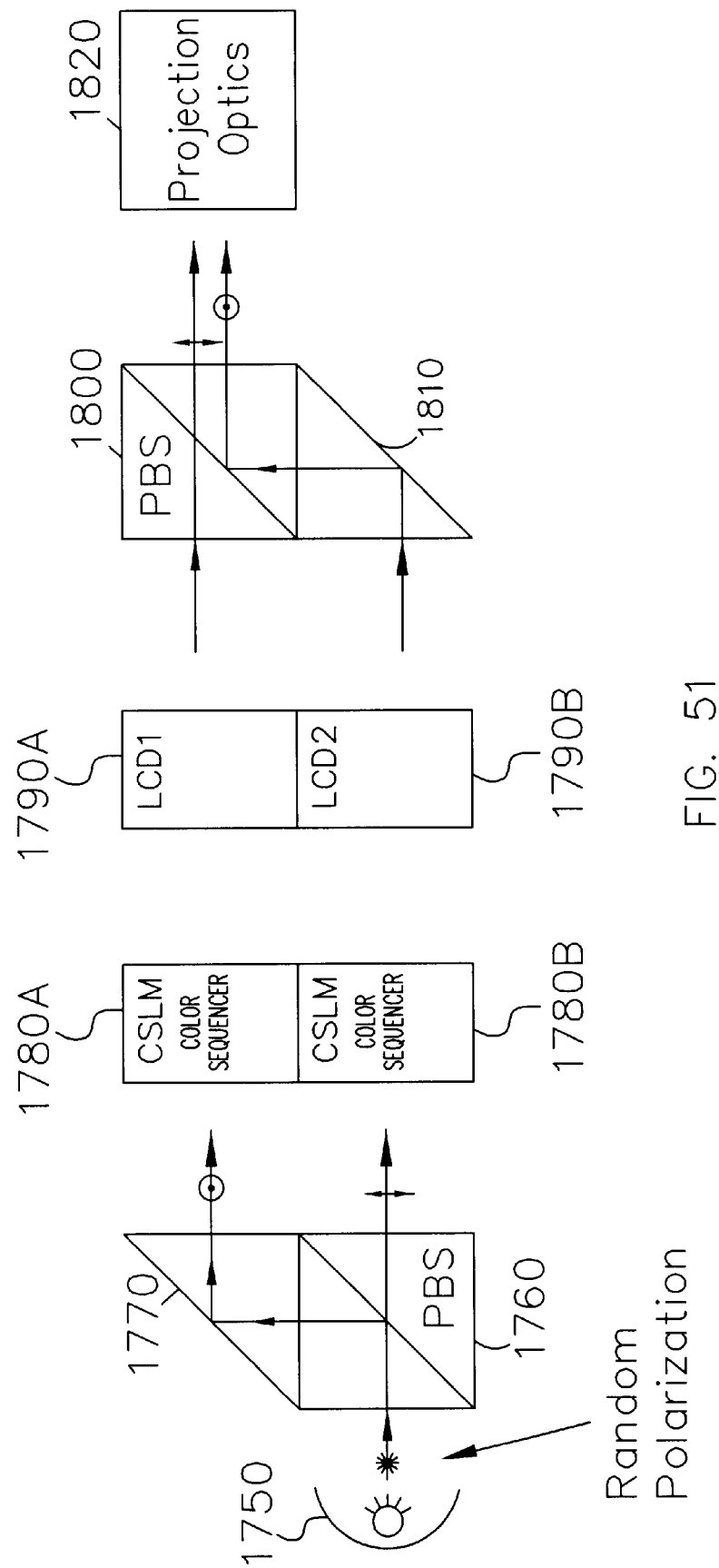
FIG. 51 shows an embodiment of a CSLM transmissive split-path sequential display system, in accordance with the present invention.

FIG. 51 shows an example of a transmissive split-path sequential display, in accordance with the present invention. The display comprises a lamp system 1750, that emits light with random polarization, a polarizing beamsplitter 1760, a reflector 1770, two CSLM color sequencers 1780A and 1780B, two LC displays 1790A and 1790B, a second polarizing beamsplitter 1800, a second reflector 1810, and projection optics 1820.

In operation, randomly polarized light from the lamp system 1750 enters the first polarizing beamsplitter 1760. The polarizing beamsplitter 1760 transmits light having a first polarization state, and reflects light having a second polarization state that is orthogonal to the first polarization state. The light that is transmitted by the polarizing beamsplitter enters one of the CSLM color sequencers 1780B. The light that is reflected by the polarizing beamsplitter 1760 is again reflected by reflector 1770 and enters the other CSLM color sequencer 1780A.

Each CSLM color sequencer/LC display combination operates in a manner similar to that described above in connection with either of the sequential display embodiments shown in FIGS. 46 and 47. In particular, the color sequencers 1780A and 1780B sequentially illuminate their respective LC displays 1790A and 1790B with light spectra, e.g., red, green and blue light. The LC displays 1790A and 1790B are sequentially driven with image information in synchronism with the light spectra sequentially output by their respective color sequencer. For example, if the color sequencers 1780A and 1780B sequentially illuminate the LC displays 1790A and 1790B with red, green and blue light, the LC displays 1790A and 1790B are sequentially driven with red, green and blue image information in sychronism with the red, green and blue illumination from color sequencers 1780A and 1780B.

The LC displays 1790A and 1790B modulate the polarization of the illuminating light in accordance with the image information. The polarization modulated light from LC display 1790A is transmitted to polarizing beamsplitter 1800. The polarization modulated light from LC display 1790B is also directed to polarizing beamsplitter 1800 via the reflector 1810. The polarizing beamsplitter 1800 performs the dual function of analyzing the state of polarization of the polarization modulated light from LC displays 1790A and 1790B, thereby filtering the light, and also combining the polarization modulated light from the two LC displays 1790A and 1790B. By combining the light from the two LC displays 1790A and 1790B, the display system of FIG. 32 doubles the brightness, provided that there are no optical components downstream of color sequencers 1780A and 1780B that are polarization sensitive. Light that exits polarizing beamsplitter 1800 is imaged by projection optics 1820.

Although reflectors 1770 and 1810 are shown as prisms in the system of FIG. 51, it should be appreciated that other types of reflectors can be used while still falling within the scope of the present invention. Further, although the system of FIG. 32 shows two CSLM color sequencers 1780A and 1780B, it should be appreciated that a single CSLM color sequencer that is designed to accommodate both light paths can also be used and still fall within the scope of the present invention.

Figure 52:
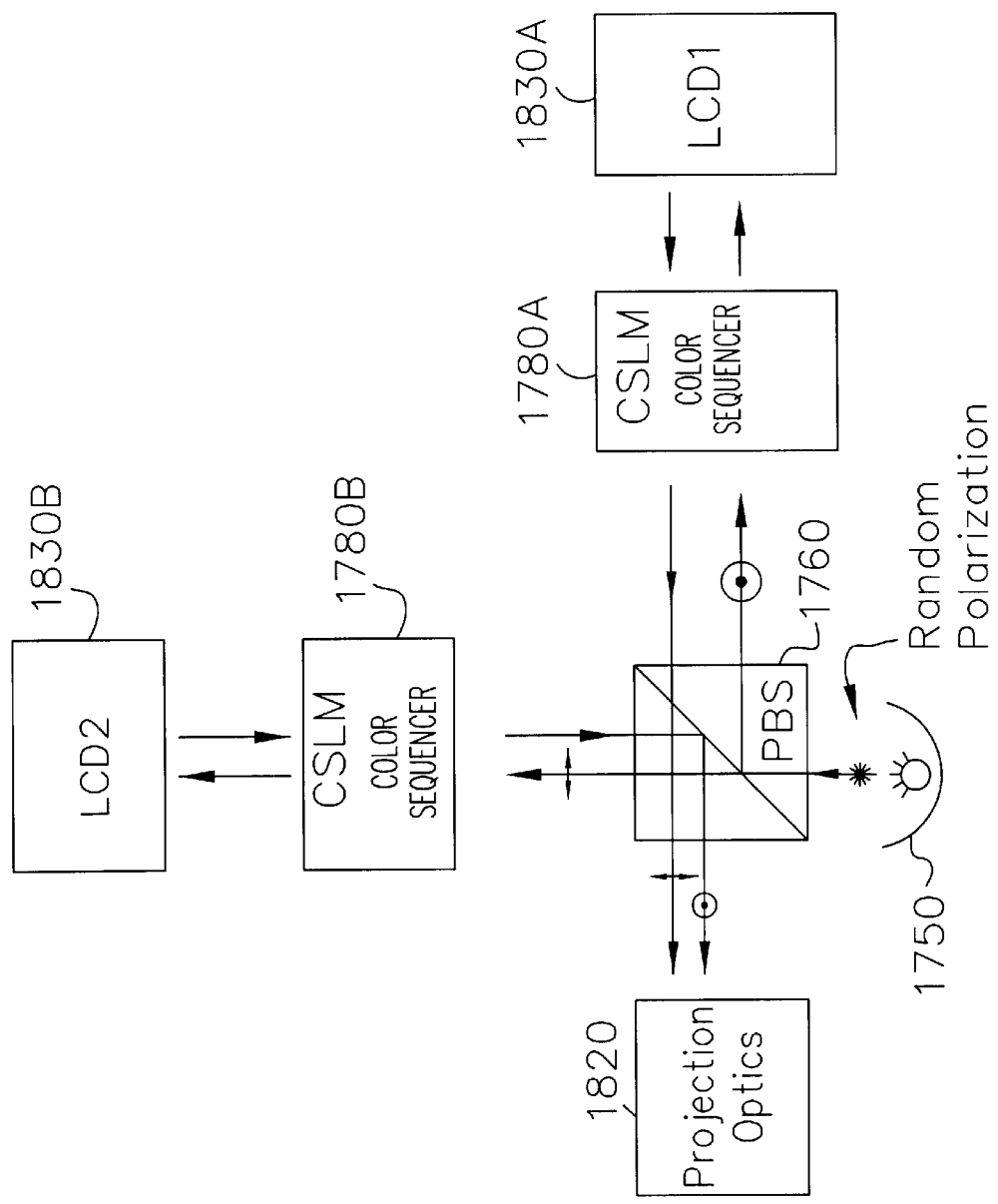
FIG. 52 shows a CSLM reflective split-path sequential display system, in accordance with the present invention.

FIG. 52 shows a reflective split-path sequential display. The reflective display of FIG. 33 is similar to the display shown in FIG. 51, except that reflective LC displays 1830A and 1830B are used instead of transmissive LC displays. In this configuration, polarizing beamsplitter 1760 is used as both the path splitter for the randomly polarized input light from the lamp system 1750, and the analyzing polarizer for the LC displays 830A and 1830B. In operation, the randomly polarized light from the lamp system 1750 enters polarizing beamsplitter 1760 and is split into two orthogonally polarized components, one of which is transmitted and the other of which is reflected by the polarizing beamsplitter 1760. The CSLM color sequencers 1780A and 1780B, and their associated LC displays 1830A and 1830B, operate in manner similar to that described above in connection with the display of FIG. 51, except that LC displays 1830A and 1830B reflect the light back towards the polarizing beamsplitter 1760 after polarization modulating the light in accordance with the image information.

Figure 53:
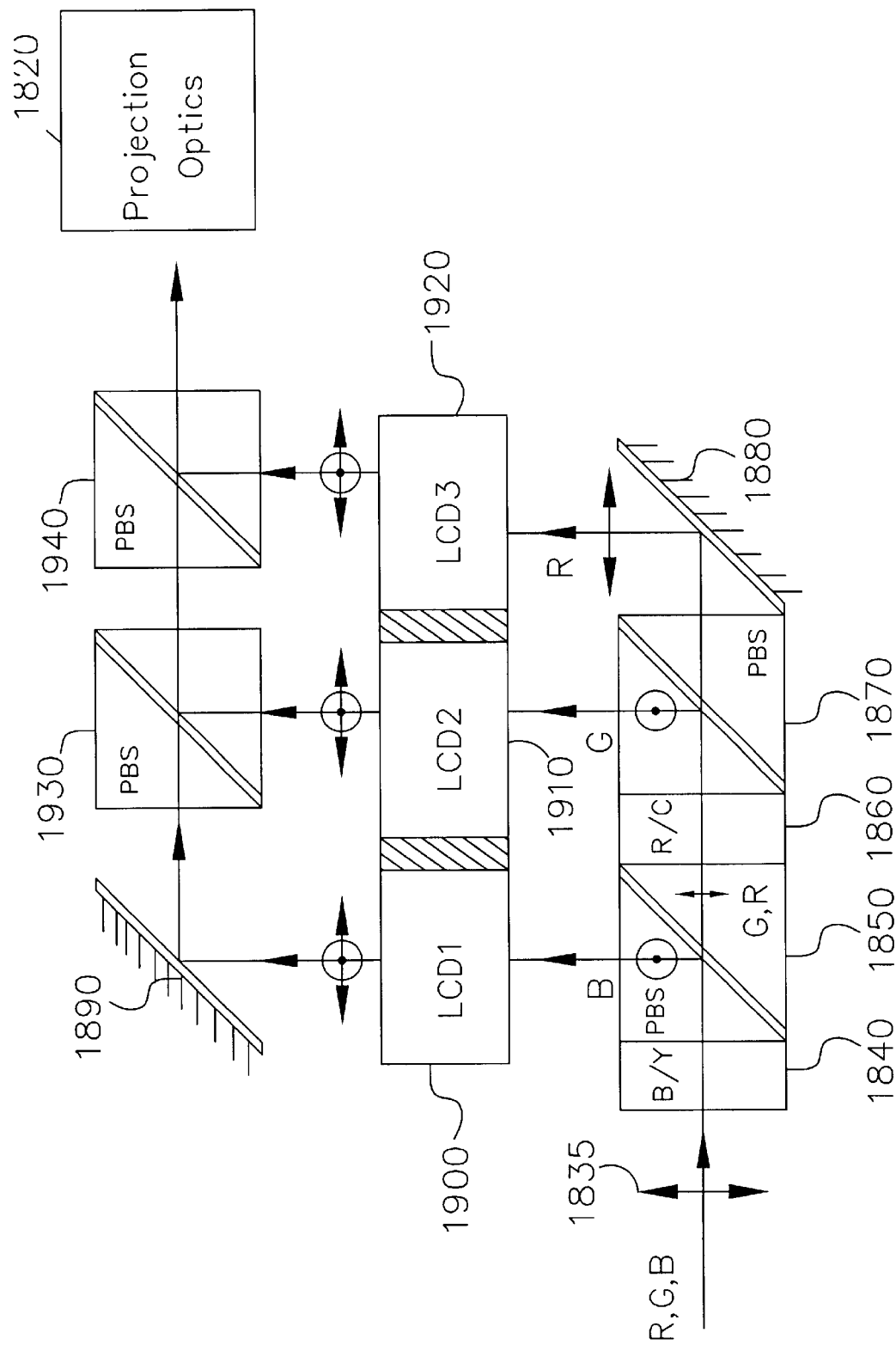
FIG. 53 shows a split-path additive display system in which polarization is used to split the light paths, in accordance with the present invention.

FIG. 53 shows a split-path additive display system, in which polarization is used to split the light paths. The system comprises an input polarizer 1835, a blue/yellow retarder stack 1840, a first polarizing beamsplitter 1850, a red/cyan retarder stack 1860, a second polarizing beamsplitter 1870, mirrors 1880 and 1890, three LC displays 1900, 1910, and 1920, a third polarizing beamsplitter 1930, a fourth polarizing beamsplitter 1940 and projection optics 1820.

In operation, randomly polarized white light from a white light source (not shown) is polarized by input polarizer 1835, and enters the blue/yellow retarder stack 1840. The blue/yellow retarder stack 1840 polarizes the blue component of the white light along one polarization axis and the yellow component (green and red) along an orthogonal polarization axis. In the example shown, the input polarizer 1835, the blue/yellow retarder stack 1840 and the first polarizing beamsplitter 1850 are oriented so that the polarized yellow component is transmitted and the polarized blue component is reflected by the polarizing beamsplitter 1850.

The polarized yellow component enters the red/cyan retarder stack 1860, which polarizes the red portion of the yellow component along one polarization axis and the cyan portion (green and blue) of the yellow component along an orthogonal polarization axis. In the example shown, the red/cyan retarder stack 1860 and the polarizing beamsplitter 1870 are oriented so that the polarized red component is transmitted and the polarized cyan component is reflected by the polarizing beamsplitter 1870. Because the blue component was reflected by the first polarizing beamsplitter 1850, only the green portion of the cyan component is available for reflection at the polarizing beamsplitter 1870.

The reflected blue component is directed to the first LC display 1900, the reflected green component is directed to the second LC display 1910, and the transmitted red component is directed to the third LC display 1920 by mirror 1880.

The first, second and third LC displays 1900, 1910 and 1920 are driven with blue, green and red image information, respectively. Thus, the blue, green and red components are polarization modulated in accordance with the image information on their respective LC displays. The polarization modulated light from the first LC display 1900 is directed to polarizing beamsplitters 1930 and 1940 by mirror 1890. The polarization modulated light from the second LC display 1910 is directed to polarizing beamsplitter 1930 and the polarization modulated light from the third LC display 1920 is directed to polarizing beamsplitter 1940. The polarizing beamsplitters 1930 and 1940 together have the dual function of analyzing the state of polarization of the light from LC displays 1900, 1910 and 1920, and also combining the light from the three light paths. The combined light is then directed to projection optics 1820 for imaging.

Figure 54:
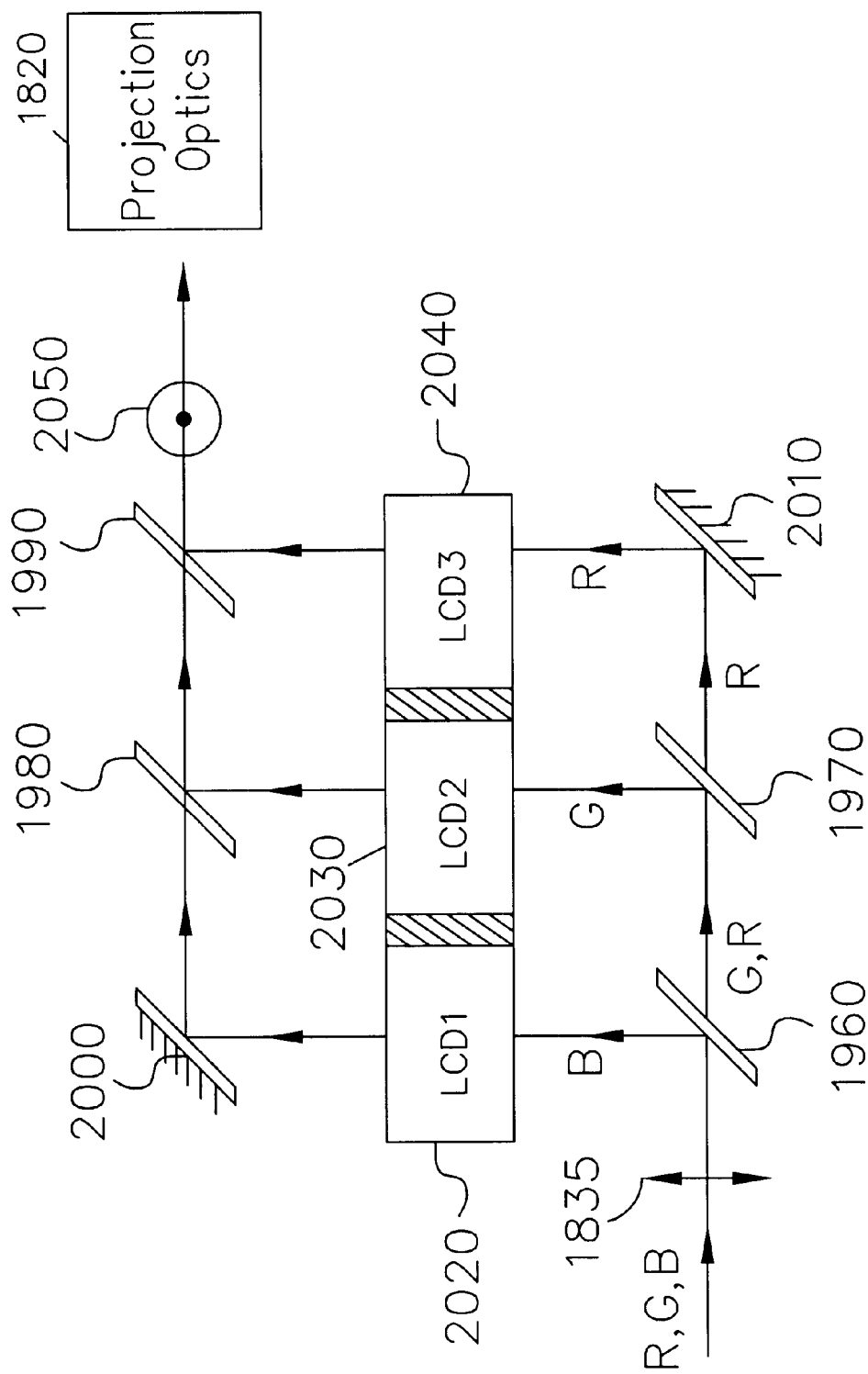
FIG. 54 shows a split-path three-panel additive display system that utilizes color to split incoming white light into three separate light paths, in accordance with the present invention.

FIG. 54 shows a split-path three panel additive display system that utilizes color to split incoming white light into three separate light paths. The display system comprises an input polarizer 1835, dichroic beamsplitters 1960, 1970, 1980 and 1990, mirrors 2000 and 2010, LC displays 2020, 2030 and 2040, output polarizer 2050, and projection optics 1820. The orientations of input polarizer 1835 and output polarizer 2050 are crossed (orthogonal).

In operation, incoming white light is polarized by polarizer 1950, and is directed to the first dichroic beamsplitter 1960. Dichroic beamsplitter 1960 reflects the blue component of the white light and transmits the green and red components toward dichroic beamsplitter 1970. Dichroic beamsplitter 1970 reflects the green component of the light and transmits the red component of the light towards mirror 2010. Mirror 2010 directs the red component to the third LC display 2040. The blue and green components are directed to LC displays 2020 and 2030, respectively.

LC displays 2020, 2030 and 2040 are driven with blue, green and red image information, respectively. Thus, LC displays 2020, 2030 and 2040 polarization modulate the intensity of the blue, green and red components, respectively, in accordance with the image information. The polarization modulated blue component is reflected by mirror 2000 towards dichroic beamsplitters 1980 and 1990, which transmit the blue component. The polarization modulated green component is directed to dichroic beamsplitter 1980, which reflects the green component towards dichroic beamsplitter 1990. Dichroic beamsplitter 1990 transmits the green component.

The polarization modulated red component is directed to dichroic beamsplitter 1990, which reflects the red component. The output polarizer 2050 analyzes the state of polarization of the blue, green and red polarization modulated components. The analyzed light is then directed to projection optics 1820 for imaging.

Figure 55:
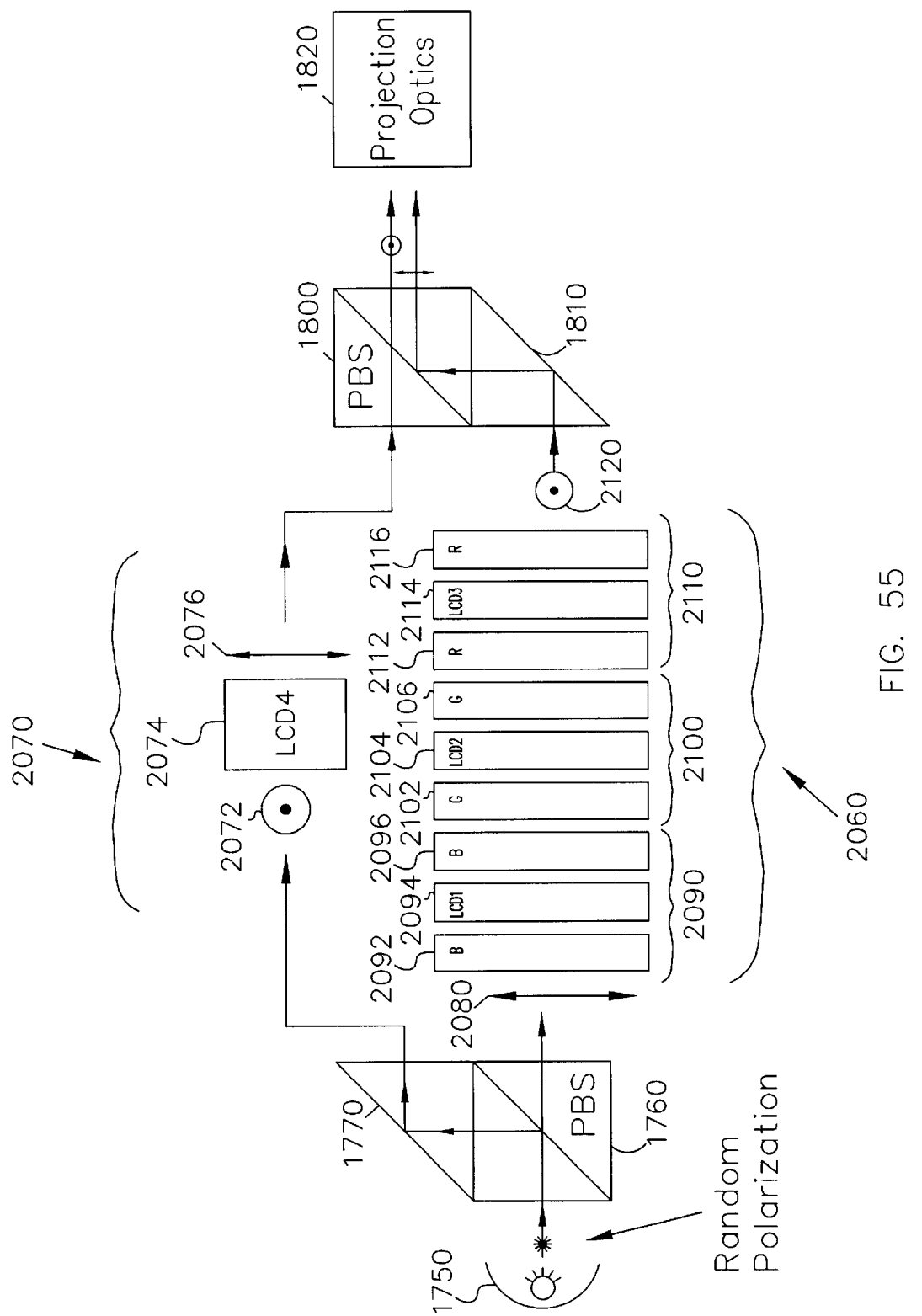
FIG. 55 shows a CSLM hybrid architecture for implementing full color using split polarization light paths, in accordance with the present invention.

FIG. 55 shows another hybrid display architecture for implementing full color using split polarization light paths. The hybrid display architecture shown in FIG. 36 is termed "split-path/common-path." This display architecture is a four panel system which contains red, green and blue stacked display panels in one arm (the "common-path" arm), and a single white display panel in the other arm (the "split-path" arm). The display system comprises a lamp system 1750 that generates randomly polarized white light, a first polarizing beamsplitter 1760, a reflector 1770, a stacked three panel display 2060, a single panel display 2070, a second polarizing beamsplitter 1800, a second reflector 1810 and projection optics 1820.

The stacked three panel display 2060 comprises an input polarizer 2080, a blue stage 2090, a green stage 2100, a red stage 2110 and an output polarizer 2120. The blue stage 2090 comprises a first retarder stack 2092, an LC display 2094 and a second retarder stack 2096. The green stage 2100 comprises a first retarder stack 2102, an LC display 2104 and a second retarder stack 2106. The red stage 2110 comprises a first retarder stack 2112, an LC display 2114 and a second retarder stack 2116.

The single panel LC display 2070 comprises an input polarizer 2072, an LC display 2074 and an output polarizer 2076. The input and output polarizers 2072 and 2076 in the single panel display 2070 have crossed orientations. Similarly, the input and output polarizers 2080 and 2120 in the stacked three panel display 2060 have crossed orientations.

In operation, the randomly polarized white light is split into orthogonal polarization components by polarizing beamsplitter 1760. One polarization component is transmitted and the other is reflected by polarizing beamsplitter 1760. The transmitted polarization component is directed to the three panel stacked display 2060. The three panel stacked display 2060 operates in a manner similar to the three panel stacked display shown in FIG. 31.

The reflected polarization component is directed by reflector 1770 to the single panel display 2070. Single panel display 2070 is a "white panel" display that modulates the intensity of the white light. The output from the single panel display 2070 and the three panel stacked display 2060 are recombined by the polarizing beamsplitter 1800 and the reflector 1810. The combined output is then directed to projection optics 1820 for imaging.

The hybrid display shown in FIG. 55 can be configured so that the three LC displays 2094, 2104 and 2112 in the three panel stacked display 2060 have a lower pixel count than the LC display 2074 in the single panel white display 2070. This configuration uses the concept that higher resolution monochrome imagery, such as that produced by the single panel white display 2070, can be "painted" with lower resolution color imagery, such as that produced by the three panel stacked display 2060, with little impact on perceived resolution.

The hybrid display shown in FIG. 55 can also be configured so that one additive primary band is modulated by an LC display in one arm, with a two panel stacked display modulating the complementary spectrum in the second arm. This would be implemented by replacing the three panel stacked display 2060 with a two panel stacked display for modulating the complementary spectrum, and the single panel LC display 2070 would then modulate one additive primary band.

In this configuration, the single panel display 2070 may be used to modulate an additive primary band in which the lamp system 1760 is relatively weak. For example, if a metal halide lamp system is used, the single panel display 2070 may be used for modulating red, and a two panel stacked display may be used in the second arm for modulating blue and green. Some liberties may be taken with resolution of the blue portion of the spectrum, because the human eye relies less on the blue portion of the spectrum for determining position information. This may be useful for increasing throughput when imaging between blue and green panels.

Figure 56:
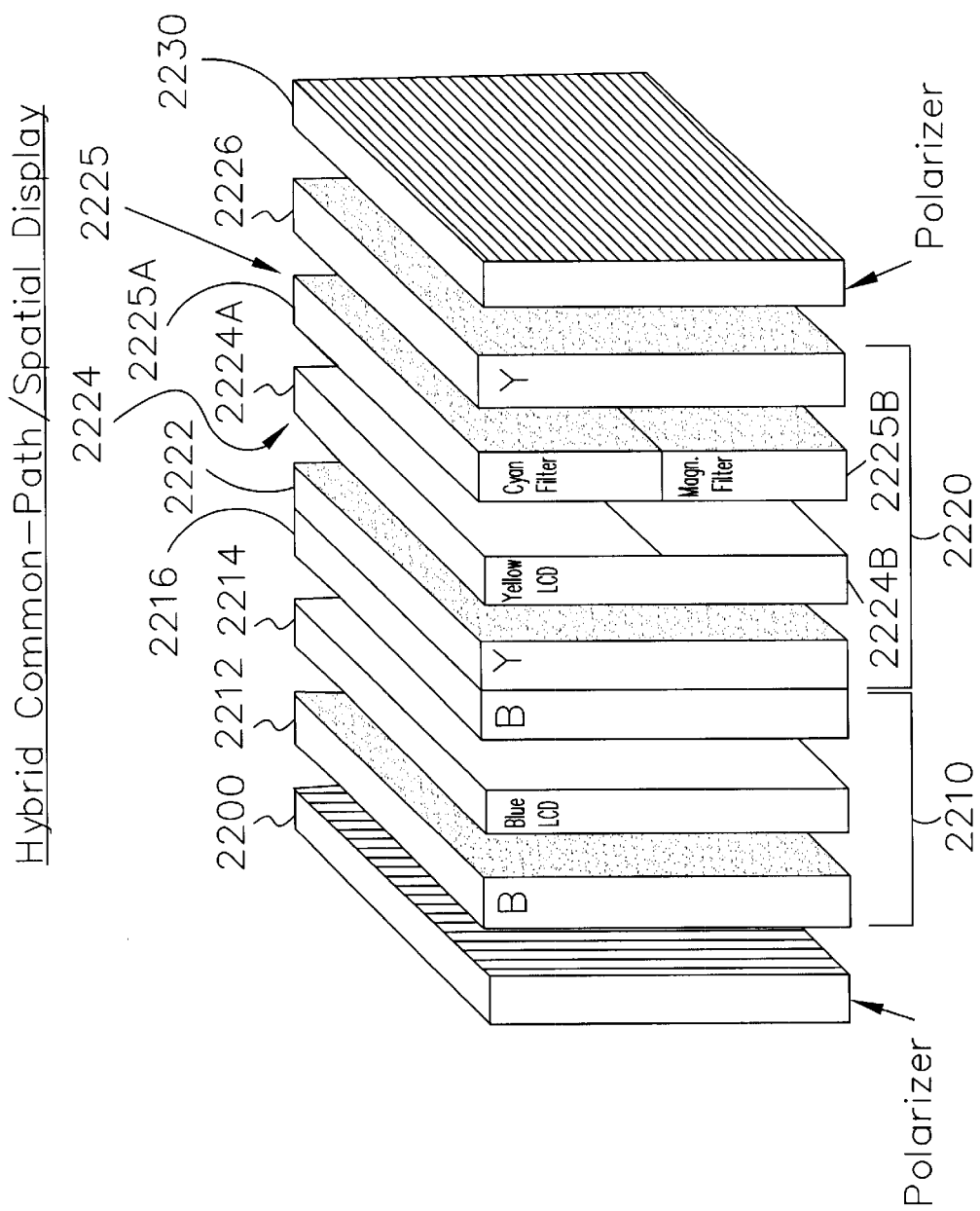
FIG. 56 shows a CSLM hybrid common-path/spatial display, in accordance with the present invention.

FIG. 56 shows a hybrid common-path/spatial CSLM display. This display provides an alternative to sequentially illuminating one LC display with two additive primaries. This display of FIG. 56 comprises an input polarizer 2200, a blue stage 2210, a yellow stage 2220 and output polarizer 2230. The blue stage comprises a first retarder stack 2212, an LC display 2214 and a second retarder stack 2216. The yellow stage comprises a first retarder stack 2222, a segmented LC display 2224, a segmented filter 2225, and a second retarder stack 2226. The segmented LC display 2224 is divided into a first (green) section 2224A and a second "red" section 2224B. Each section has the same number of image pixels as the entire LC display 2224. The first section 2224A is driven with green image information, and the second section 2224B is driven with red image information.

The segmented filter 2225B comprises a first cyan filter section 2225A that blocks red light, and a second magneta filter section 2225B that blocks green light.

In operation, the first retarder stack 2212 and the blue stage 2210 preconditions the polarization of input light such that green and red components along eigen state of the LC display 2214. Thus, blue light is modulated by the LC display 2214, and the second retarder stack 2216 is used to complete the polarization transformation. The first retarder stack 2222 and the yellow stage 2220 preconditions the light such that the blue component is polarized along an eigen state of the yellow LC display 2224. Thus, yellow light, (green and red) is modulated by the LC display 2224. The cyan filter section 2225A passes the green and blue light and blocks the red light. The magneta filter section 2225B passes the blue and red light, and blocks the green light.

The hybrid structure of FIG. 56 illuminates one LC display from the full-color common path architecture, but has some spatial color sampling.

CSLM structures are frequently used to modulate a portion of the spectrum between a polarization state coinciding with that of another spectral portion, and the orthogonal polarization state. However, CSLM structures can also be used to modulate between arbitrary polarizations. For example, for a suitable adjustment of retarder stack design, the CSLM modulated portion of the spectrum between non-orthogonal states, even though the modulator switches by a half-wave of retardance.

As an example consider an SO neutral CSLM using a ZTN device that is used to control the polarization of light entering a second a ZTN device. In the driven state, the retarder stack vanishes and all light is polarized along the eigen state of the second ZTN. In this state, all light is passed by the second modulator with no change in the state of polarization. Alternatively, the second ZTN could be oriented at 45°, so that all light can be modulated by the second ZTN in the driven state.

In the undriven state, the CSLM modifies the polarization such that a portion of light remains along in eigen state, which is in general unmodulated. A second portion of the spectrum has polarization modified by the CSLM to have equal projections along the eigen state of the second ZTN (i.e., 45° linear).

For this particular example, the combined action of the partial retarder stack is substantially half of that normally called for in modulating between orthogonal states. One class of designs has partial stacks composed of half-wave plates at the wavelength coinsiding with the modulated portion of the spectrum. The polarization state of modulated light exiting the first partial retarder stack is $$\alpha_N - \alpha_{N-1} + \alpha_{N-12} - \ldots \alpha_2 \pm \alpha_1 \pi/16 + m\pi/4,$$

where m is an integer, N is the number retarder elements, and the final sign is determined by whether N is odd or even.

The proceeding example applies to reflective liquid crystal on silicon displays in which the CSLM is placed between the polarizing beamsplitter and the LC display. When unfolded, the LC display lies at the center of the structure, with the CSLM structures effectively on either side of the LC display. Clearly, because these correspond to two passes through the same structure, the orientations of the retarders are identical, with the order reversed.

Figure 57:
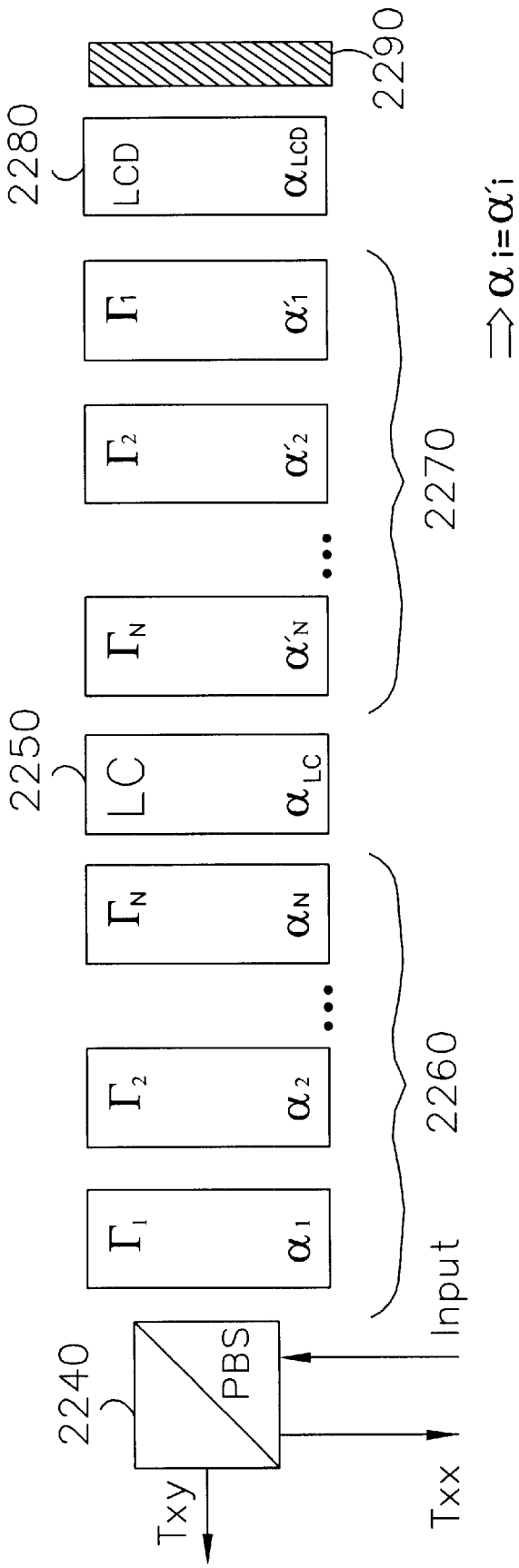
FIG. 57 shows a CSLM structure inserted into the LC display port of a retroreflecting LC display architecture, in accordance with the present invention.

In a retroreflecting LC display arrangement using a polarizing beamsplitter, conventional color shutters cannot be inserted in the LC display arm. This is because the LC display port must accommodate counter-propagating beams with orthogonal polarizations. Therefore FIG. 57 shows a CSLM structure inserted into the LC display port of a retroreflecting LC display arrangement using a polarizing beamsplitter 2240. A single pixel LC switch 2250 is used to control the interaction of the two partial stacks 2260 an 2270.

Consider the case where the reflective LC display 2280 (the reflecting portion of the LC display 2280 being represented by mirror 2290) is a ZTN device and the CSLM is used to control the color exiting the polarizing beamsplitter 2240. If a crossed retarder stack arrangement is used in the CSLM, the LC display 2280 modulates all light when the single pixel LC switch 2250 is in the driven state. When the single pixel LC switch 2250 is in the undriven state, the combined transformation of the retarder stack 2260 and 2270 served to present one portion of the spectrum along the LC display eigen polarization, whcih is not modualted by the LC display 2280, and one portion of the spectrum has equal projections along the LC display 2280 eigen polarizations, which is modulated by the LC display 2280. In this sense, the partial retarder stacks 2260 and 2270 function much like that of a transmission mode CSLM, except that the polarization transformation is halved. In this case, light exiting the first partial stack 2260 made be rotated by 22.5°. The single pixel LC switch 2250 is suitably rotated to accept this light. The action of the second partial stack 2270 is two "undo" the transformation of the first partial stack 2260 in the driven state, and to complete the polarization transformation in the undriven state. For the later, this polarization transformation presents one portion of the spectrum to be modulated by the LC display 2280. This portion has equal projections along the LC display 2280 eigen states, such that the level of light exiting the polarizing beamsplitter 2240 in support can be fully modulated. Conversely, light exiting the second partial retarder stack 2260 oriented along an LC display 2280 eigen state is returned to the entrance port.

Figure 58:
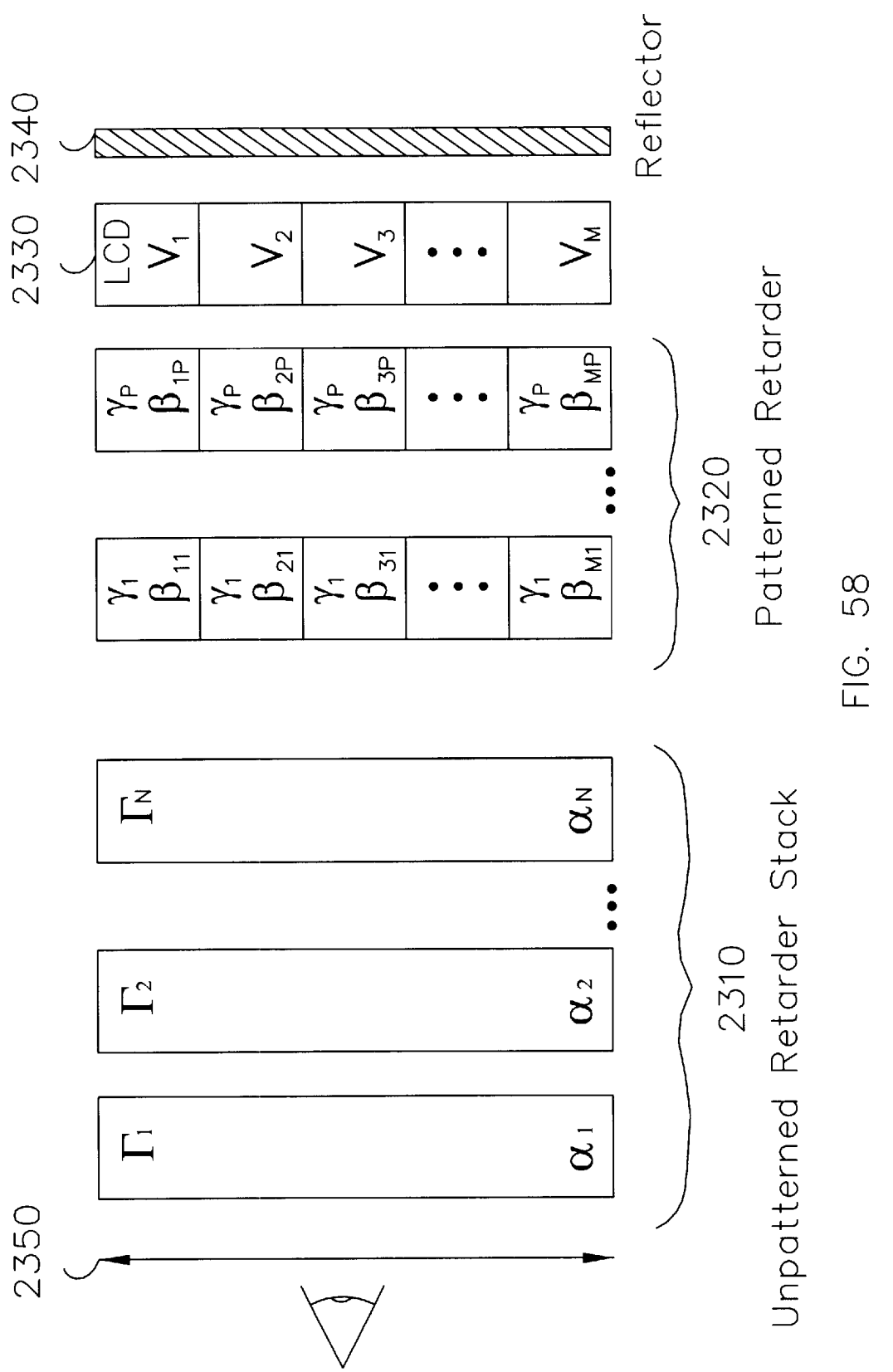
FIG. 58 shows a reflective spatial color display device utilizing a patterned CSLM, in accordance with the present invention.

The CSLMs of the present invention are also useful for forming spatial color devices. FIG. 58 shows a patterned CSLM 2300 which contains an unpatterned retarder stack 2310, one or more spatially patterned retarder film 2320, an active LC display 2330, a reflector 2340 and a polarizer 2350.

The reflector 2340 following the LC display 2330 provides two passes through the structure. The patterned retarder films 2320 are suitably formed from liquid crystal polymer or a locally stressed polymer film. Due to the enhanced symmetry of a reflection-mode arrangement, the design space is constrained relative to a transmission mode device. In the unfolded version, the effective angles of the patterned retarder films forming the partial retarder stacks on either side of the LC display 2330 must be equivalent.

In one particular configuration, the patterned retarder stack comprises a zero-order or compound achromatic retarders. For example, pixels comprising half-wave retardation layers with the appropriate orientation can form a polarization rotator. The same retardation layers with cross-orientation is locally isotropic. Finally, when the two half-wave retardation layers are parallel, the resulting structure degenerates to a full-wave (chromatic) plate. Such patterned structures can be used to precondition the polarization locally for the interaction to the LC display 2330.

In order to avoid parallax problems, the patterned retarder stack is positioned as close as possible to the active pixels of the LC display 2330. The unpatterned portion of the structure may or may not be incorporated, depending upon the modulation requirements. By definition, the unpatterned retarder stack 2310 has the effect of influencing the chrominance and/or modulation characteristics of all the pixels in the display.

Figure 59:
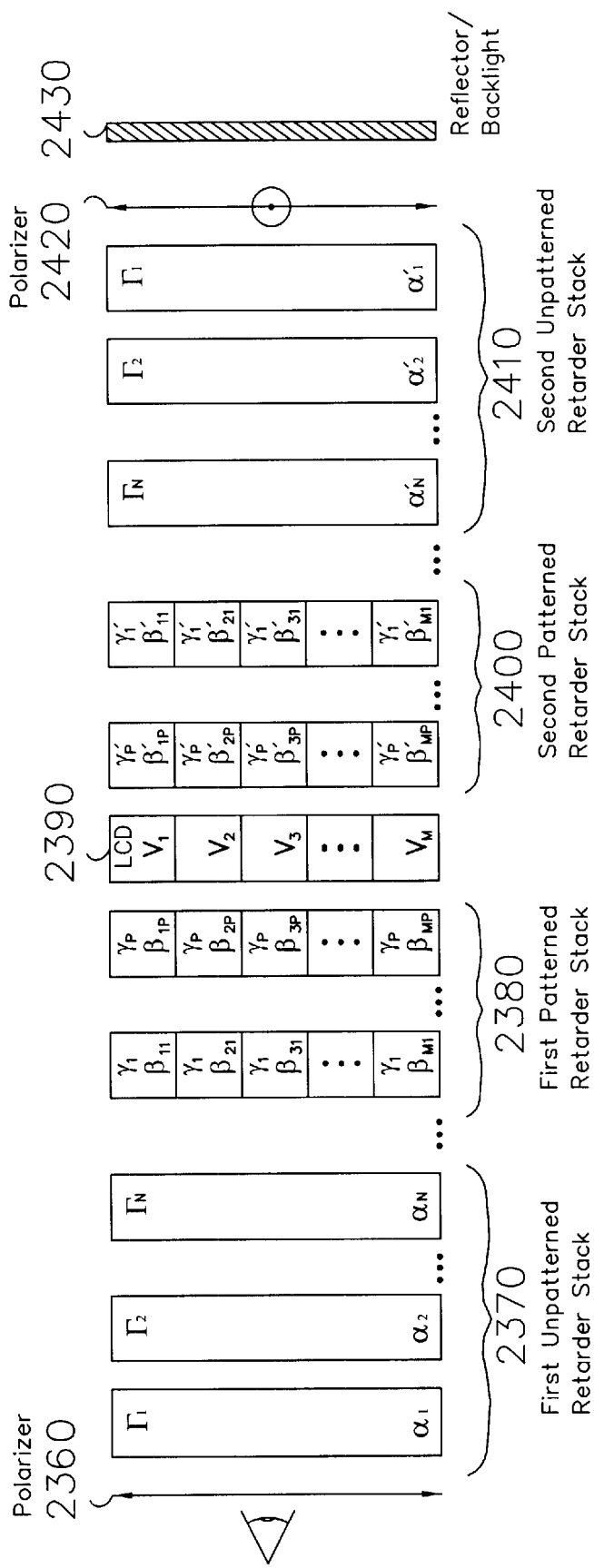
FIG. 59 shows a transmissive spatial color display device utilizing a patterned CSLM, in accordance with the present invention.

FIG. 59 shows a transmission-mode version of the spatial color display device of FIG. 58. The device comprises a first polarizer 2360, a first unpatterned retarder stack 2370, a first patterned retarder stack 2380, an LC display 2390, a second patterned retarder stack 2400, a second unpatterned retarder stack 2410, a second polarizer 2420 and a backlight/reflector combination 2430. Because unique patterned and unpatterned partial retarder stacks can be used on either side of the LC display 2390, the number of design options is greatly increased.

Applications

As discussed above, the CSLMs of the present invention can be used in front and rear projection displays, virtual displays and direct view displays. These displays can be used in a variety of applications, such as heads-up displays in transportation vehicles (e.g., automobiles and airplanes), group projectors, desktop computing, home theater, hand-held games, arcade games (3D and 2D), lap displays, handheld pagers, personal digital assistants, global positioning displays, instrumentation (e.g., oscilloscopes and spectrum analyzers), web browsers, telecommunicators, head-mounted displays, and displays brought to the eye for virtual reality, augmented reality, portable wearable computers, simulators, camcorders and display glasses, goggles or shutters.

For display applications, the multiple-pixel CSLMs of the present invention can be used in combination with emissive displays, such as cathode ray tubes, electroluminescent displays, active matrix electroluminescent displays, field emission displays and plasma displays. The CSLMs of the present invention can also be used for non-display color generation applications, including colorimetry, stage lighting, home/industrial lighting, inspection systems, color switches for lasers and light emitting diodes, and tunable sources/receivers for spectroscopy and other spectral diagnostic applications.

The CSLMs of the present invention can also be used with modulator displays, including transmissive displays (e.g., TFT-LCD and polysilicon LCD), reflective displays (e.g., liquid crystal on silicon (LCOS), digital micro-mirror devices (DMDs) and defractive grating devices), and passive matrix displays (e.g., STN and ferroelectric liquid crystal displays).

Electronic imaging applications include page fed and document scanners, internet cameras, digital cameras for studio photography, microscopy, multispectral imaging, documentation (e.g., photo-ID cameras), amateur electronic photography and other applications, including fluorescence spectrometry and medical imaging (e.g., endoscopes and other medial diagnostic equipment).

To form imaging devices, the CSLMs of the present invention can be combined with still cameras or video cameras using charged coupled devices, charge integrating devices or complementary metal oxide semiconductor single-pixel or multi-pixel imagers.

As discussed above, hybrid filters can be made using the CSLM filters of the present invention, in combination with other active or passive filters. The CSLM filters of the present invention can be combined with passive filters, such as retarder-based notch filters and dichroic filters, for blocking UV, IR or other bands of light. They can also be used with other active filters, such as polarization interference filters and switched polarizer filters.

The CSLM filters of the present invention are particularly useful in the visible spectrum as color filters. However, they can also be fabricated for use in other wavelength bands for spectroscopy, spectrometry night vision filtering, or wavelength division mulitplexing applications. The CSLM color filters of the present invention can be used in many applications, particularly in the areas of recording and displaying color images. They can be arranged in a multi-pixel array, can be spatially or temporally multiplexed and can be optically addressed.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A direct view display comprising:
    a light source that generates input light comprising a plurality of spectral components;
    an output polarizer;
    an input polarizer disposed between said light source and said output polarizer;
    a first imaging stage, disposed between said input polarizer and said output polarizer, that receives the input light and outputs first stage light having the plurality of spectral components, said first imaging stage comprising:
        a first transmissive display,
        a first retarder stack, positioned at an input side of the first transmissive display, that preconditions a polarization of the input light such that the first transmissive display can selectively interact with a subset of the plurality of spectral components, and
        a second retarder stack positioned at an output side of the first transmissive display;
    a second imaging stage, disposed between said first imaging stage and said output polarizer, that receives the first stage light and outputs second stage light having the plurality of spectral components, said second imaging stage comprising:
        a second transmissive display,
        a third retarder stack, positioned at an input side of the second transmissive display, that preconditions a polarization of the first stage light such that the second transmissive display can selectively interact with a subset of the plurality of spectral components, and
        a fourth retarder stack positioned at an output side of the second transmissive display; and
    a third imaging stage, disposed between said second imaging stage and said output polarizer, that receives the second stage light and outputs third stage light having the plurality of spectral components, said third imaging stage comprising:
        a third transmissive display,
        a fifth retarder stack, positioned at an input side of the third transmissive display, that preconditions a polarization of the second stage light such that the third transmissive display can selectively interact with a subset of the plurality of spectral components, and
        a sixth retarder stack positioned at an output side of the third transmissive display.

2. The display of claim 1, wherein the orientation of said output polarizer is orthogonal to the orientation of said input polarizer.

3. The display of claim 1, wherein the first transmissive display is driven with a first spectral image information, the second transmissive display is driven with a second spectral image information, and the third transmissive display is driven with a third spectral image information.

4. The display of claim 3, wherein the first retarder stack pre-conditions a polarization of a first spectral component of the input light for interaction with the first transmissive display, the third retarder stack pre-conditions a polarization of a second spectral component of the input light for interaction with the second transmissive display, and the fifth retarder stack pre-conditions a polarization of a third spectral component of the input light for interaction with the third transmissive display.

5. The display of claim 4, wherein the first, second, and third spectral components comprise first, second, and third color components, respectively.

6. The display of claim 5, wherein the first, second, and third color components comprise blue, green, and red color components, respectively.

7. The display of claim 1, wherein the first, second, and third transmissive displays comprise active matrix liquid crystal displays.

8. The image display apparatus of claim 1, wherein the first, second, and third transmissive displays comprise passive matrix liquid crystal displays.

9. The image display apparatus of claim 1, wherein the first, second, third, fourth, fifth, and sixth retarder stacks each comprise birefringent liquid crystal polymer.

10. A direct view display comprising:
    a light source that generates input light comprising a first spectral component, a second spectral component, and a third spectral component;
    an output polarizer;
    an input polarizer disposed between said light source and said output polarizer;
    first imaging means disposed between said input polarizer and said output polarizer that selectively manipulates said first spectral component, and that is substantially transparent to said second and third spectral components;
    second imaging means disposed between said first imaging means and said output polarizer that selectively manipulates said second spectral component and that is substantially transparent to said first and third spectral components; and,
    third imaging means disposed between said imaging second means and said output polarizer that selectively manipulates said third spectral component and is substantially transparent to said first and second spectral components.

11. The display of claim 10, wherein the first, second, and third spectral component comprise first, second, and third color components.

12. The display of claim 11, wherein each of the first, second, and third color components comprise one of a blue, green, and red component.

* * * * *